US012704943B2

(12) United States Patent
Ni et al.

(10) Patent No.: US 12,704,943 B2
(45) Date of Patent: Aug. 11, 2026

(54) HOME SCREEN LAYOUT METHOD AND RELATED DEVICE

(71) Applicant: Honor Device Co., Ltd., Shenzhen (CN)

(72) Inventors: Jing Ni, Shenzhen (CN); Liwei Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 115 days.

(21) Appl. No.: 18/692,627

(22) PCT Filed: Apr. 28, 2023

(86) PCT No.: PCT/CN2023/091665
§ 371 (c)(1),
(2) Date: Mar. 15, 2024

(87) PCT Pub. No.: WO2023/226696
PCT Pub. Date: Nov. 30, 2023

(65) Prior Publication Data

US 2024/0385732 A1 Nov. 21, 2024

(30) Foreign Application Priority Data

May 26, 2022 (CN) ........................ 202210579116.X

(51) Int. Cl.
*G06F 3/0483* (2013.01)
*G06F 3/04817* (2022.01)
(Continued)

(52) U.S. Cl.
CPC ........ *G06F 3/0483* (2013.01); *G06F 3/04817* (2013.01); *G06F 3/04842* (2013.01); *G06F 3/0485* (2013.01); *G06F 3/04883* (2013.01)

(58) Field of Classification Search
CPC ............... G06F 3/0483; G06F 3/04817; G06F 3/04842; G06F 3/0485; G06F 3/04883
See application file for complete search history.

(56) References Cited

U.S. PATENT DOCUMENTS 11,630,553 B2 * 4/2023 Ko .......................... G06F 9/451 715/810
12,039,149 B2 * 7/2024 Toudji ..................... G06F 9/451
(Continued)

FOREIGN PATENT DOCUMENTS

CN 104360798 A 2/2015
CN 106227405 A 12/2016
(Continued)

*Primary Examiner* — Tadesse Hailu
(74) *Attorney, Agent, or Firm* — Slater Matsil, LLP

(57) ABSTRACT

This application provides a home screen layout method and a related device, and the method includes: displaying a first home screen page, where the first home screen page includes an application icon and/or an application card; receiving a first sliding operation entered by a user; in response to the first sliding operation, sliding the first home screen page until a first recommended page is displayed, where the first recommended page includes a first control and a preview of a second home screen page, and the preview of the second home screen page includes an application icon and/or an application card laid out on the second home screen page; receiving a first operation of selecting the first control by the user; and updating the first home screen page to the second home screen page in response to the first operation.

20 Claims, 44 Drawing Sheets

(51) Int. Cl.

| | |
|---|---|
| ***G06F 3/04842*** | (2022.01) |
| ***G06F 3/0485*** | (2022.01) |
| ***G06F 3/04883*** | (2022.01) |

(56) References Cited

U.S. PATENT DOCUMENTS

| | | | | |
|---|---|---|---|---|
| 2010/0295789 | A1* | 11/2010 | Shin | G06F 1/1626 715/765 |
| 2014/0250391 | A1* | 9/2014 | Jong | G06F 3/0483 715/778 |
| 2015/0169183 | A1* | 6/2015 | Son | G06F 3/04817 715/765 |
| 2016/0357305 | A1* | 12/2016 | Wells | G06F 3/04842 |
| 2017/0315681 | A1 | 11/2017 | Kang et al. | |
| 2018/0335921 | A1* | 11/2018 | Karunamuni | G06F 3/04842 |
| 2018/0335939 | A1* | 11/2018 | Karunamuni | G06F 9/445 |
| 2019/0129616 | A1* | 5/2019 | Nguyen | G06F 3/0647 |
| 2020/0081592 | A1* | 3/2020 | Lin | G06F 3/0485 |
| 2020/0233568 | A1* | 7/2020 | Wang | G06F 3/04845 |
| 2022/0365640 | A1* | 11/2022 | Graham | G06F 3/04847 |

FOREIGN PATENT DOCUMENTS

| | | | |
|---|---|---|---|
| CN | 108646962 | A | 10/2018 |
| CN | 110750317 | A | 2/2020 |
| CN | 113805755 | A | 12/2021 |

* cited by examiner

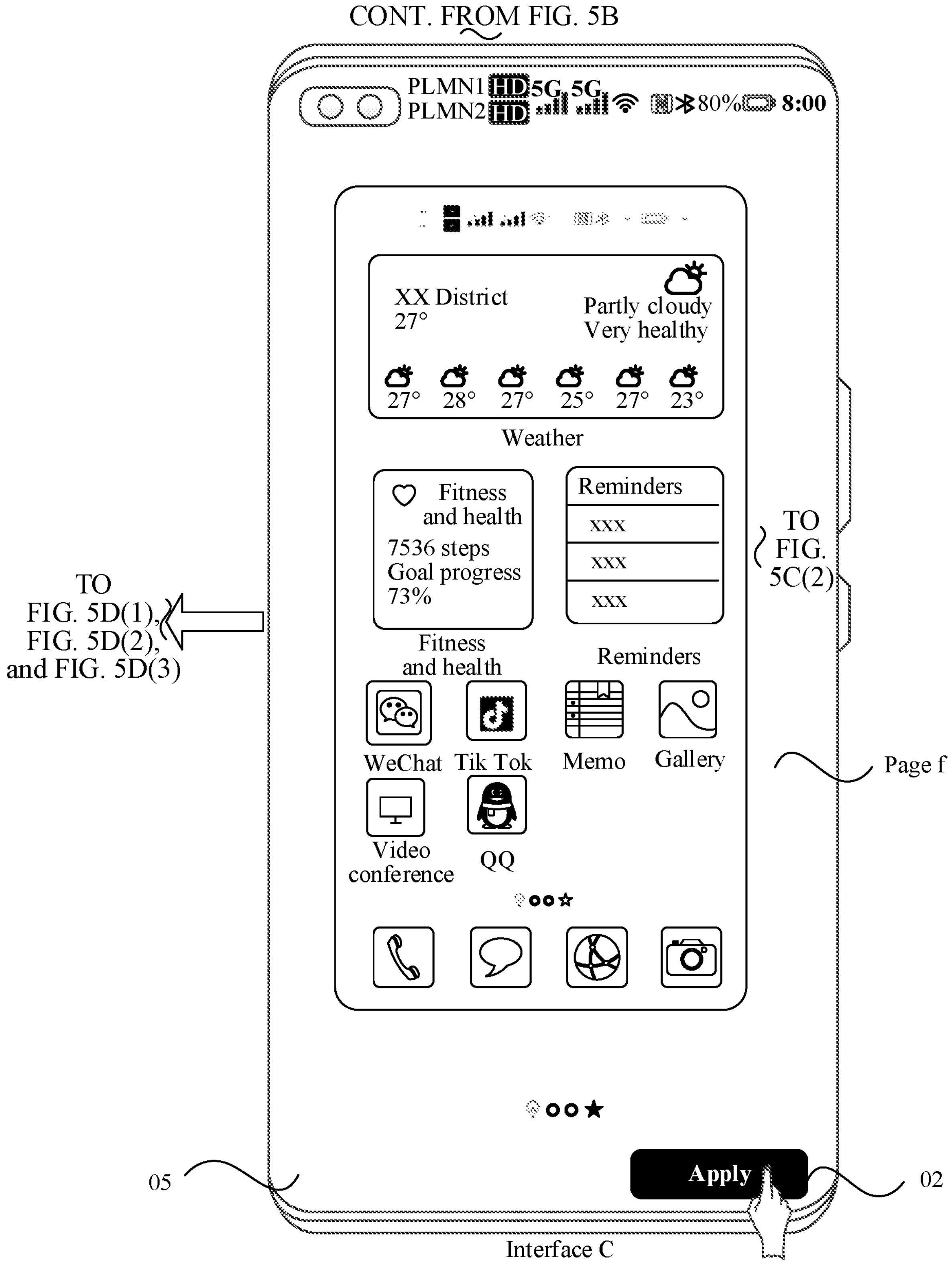
FIG. 5C(1)

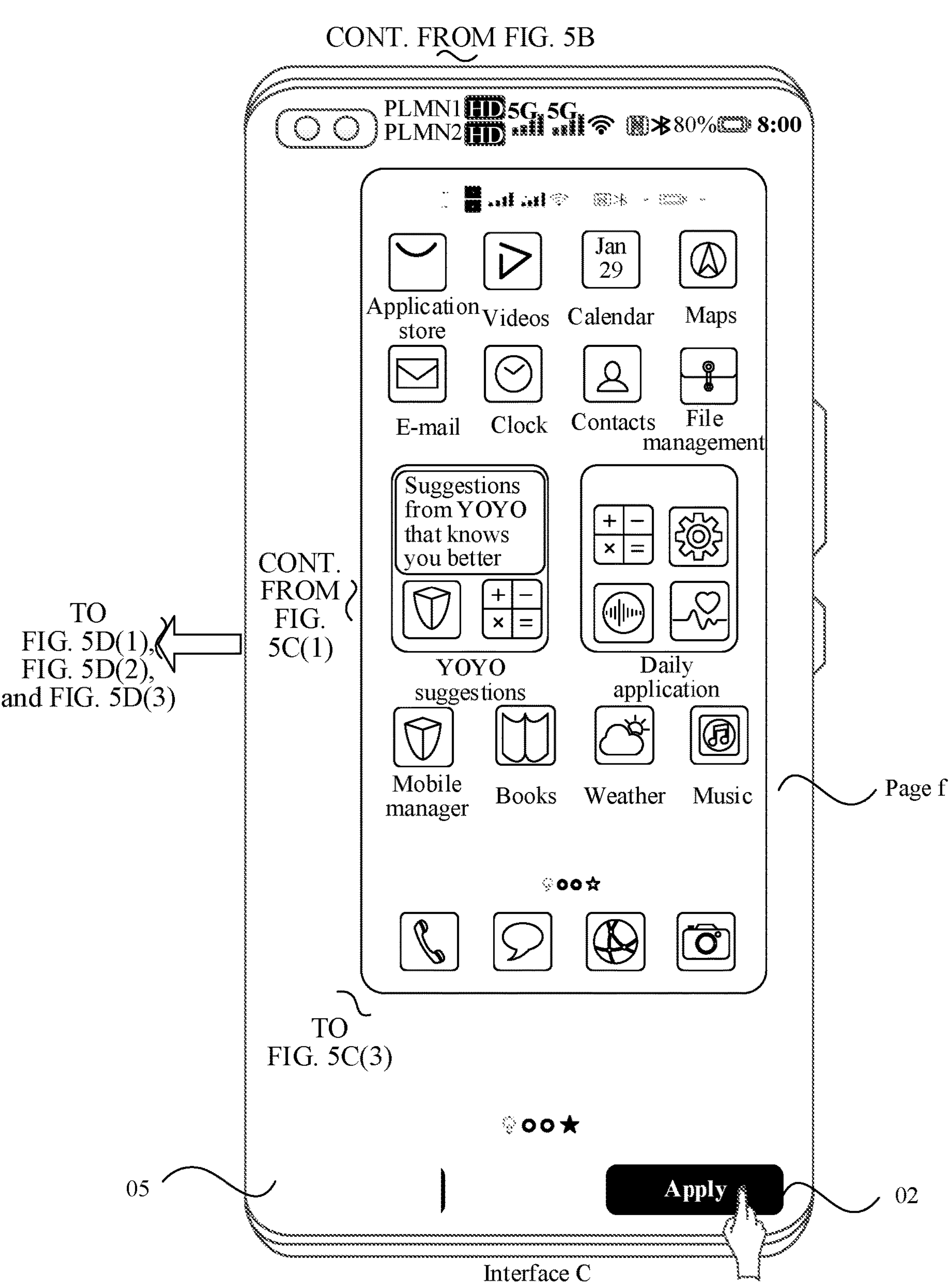
FIG. 5C(2)

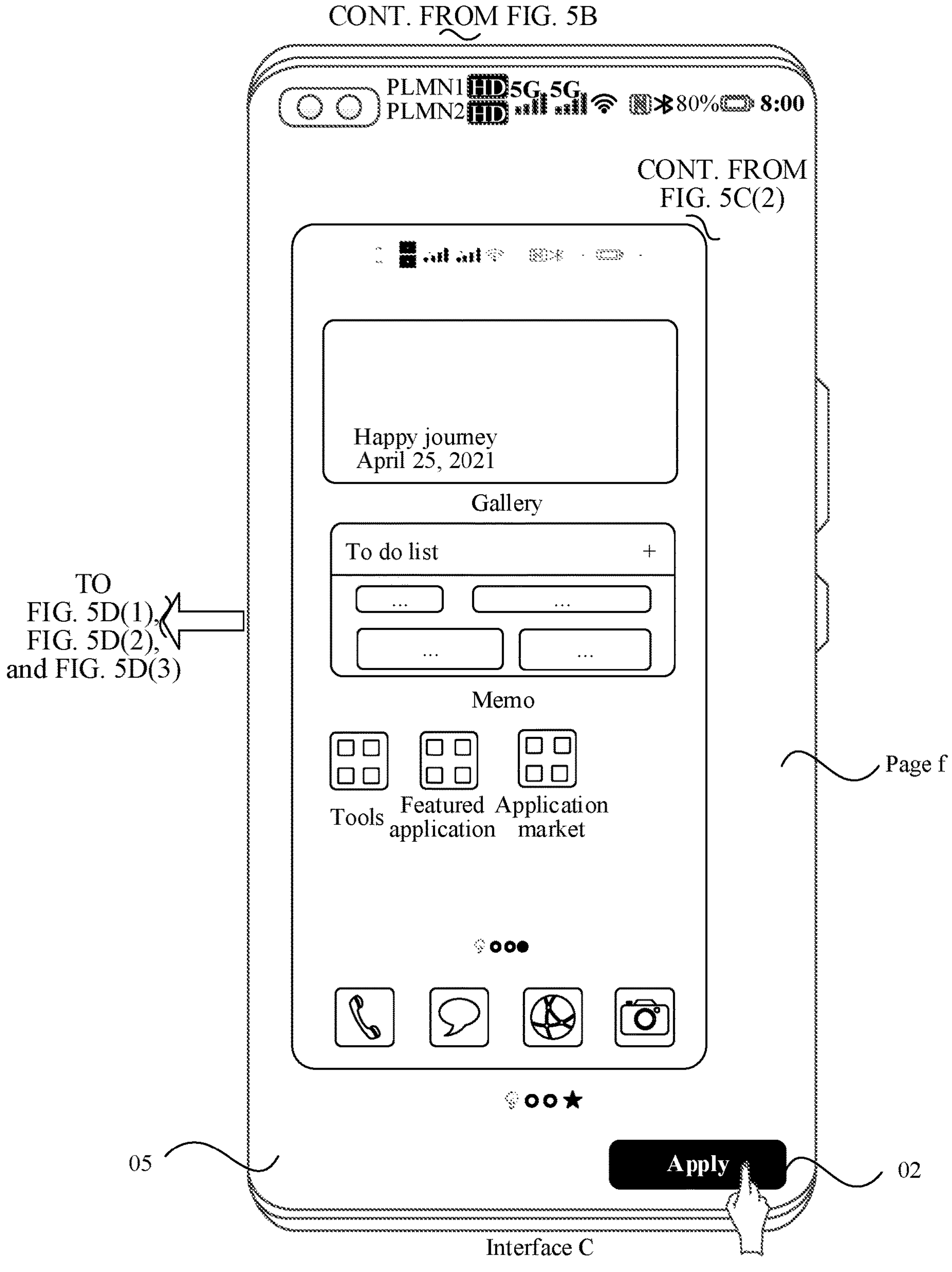
FIG. 5C(3)

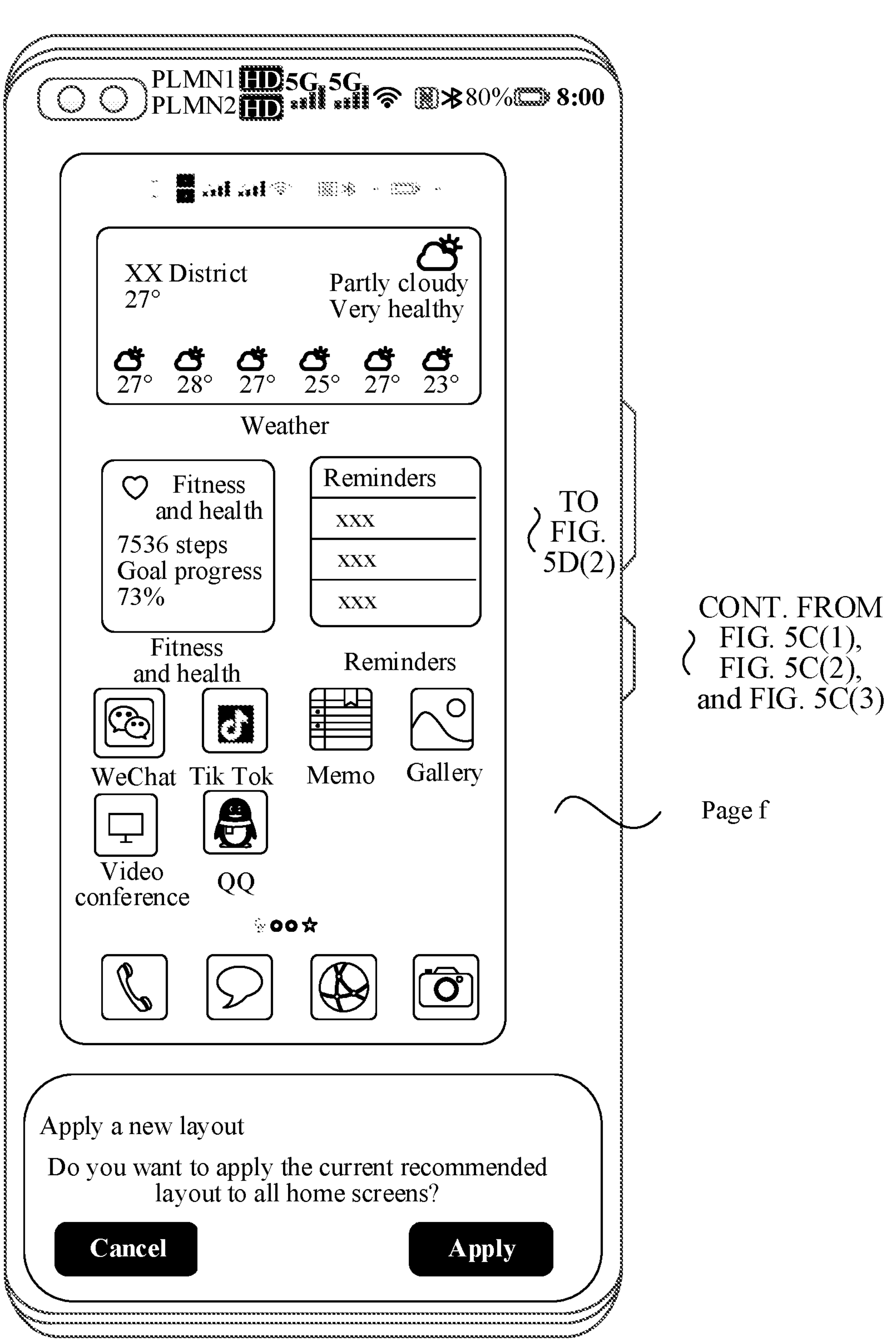
FIG. 5D(1)

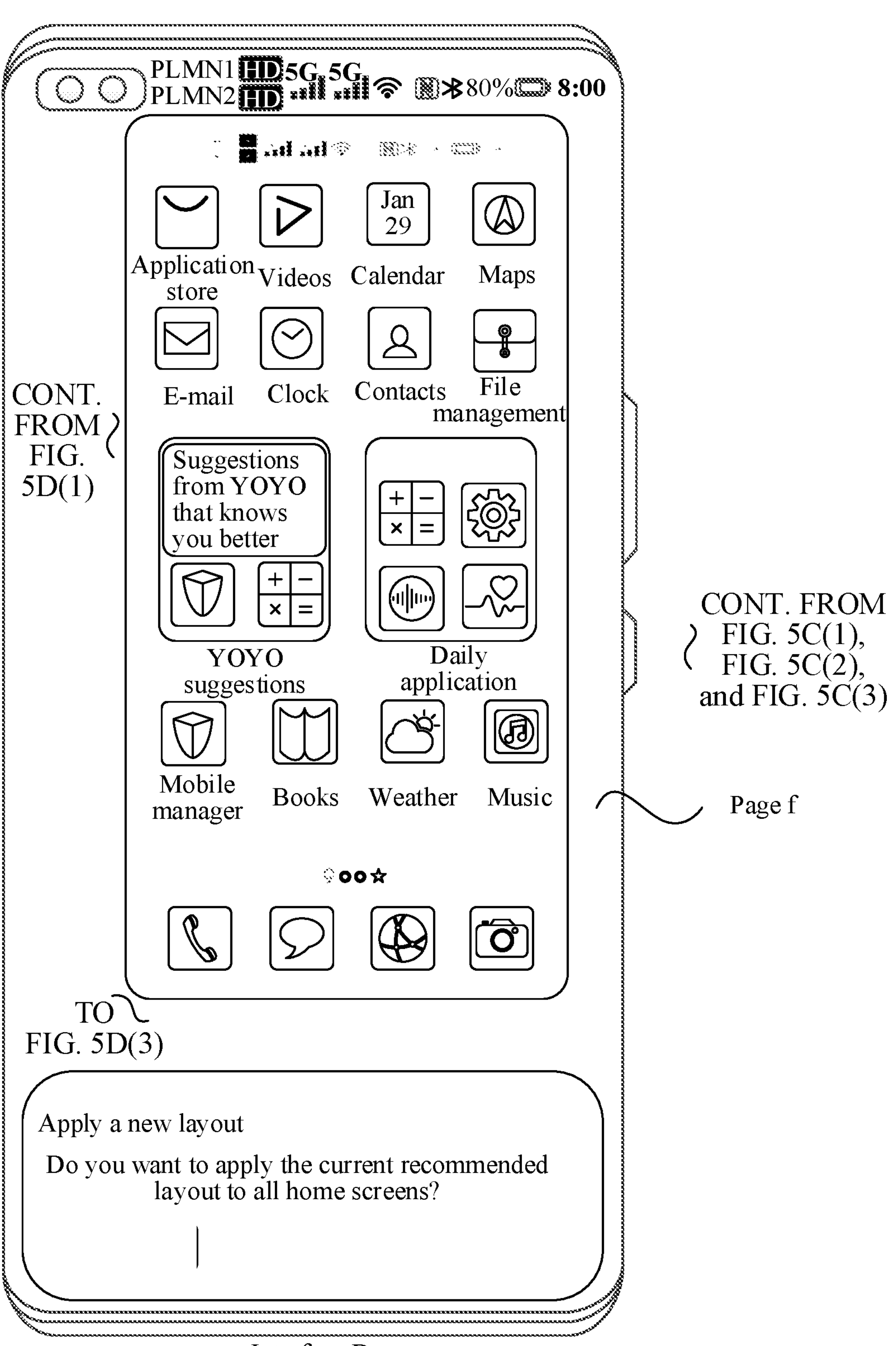
FIG. 5D(2)

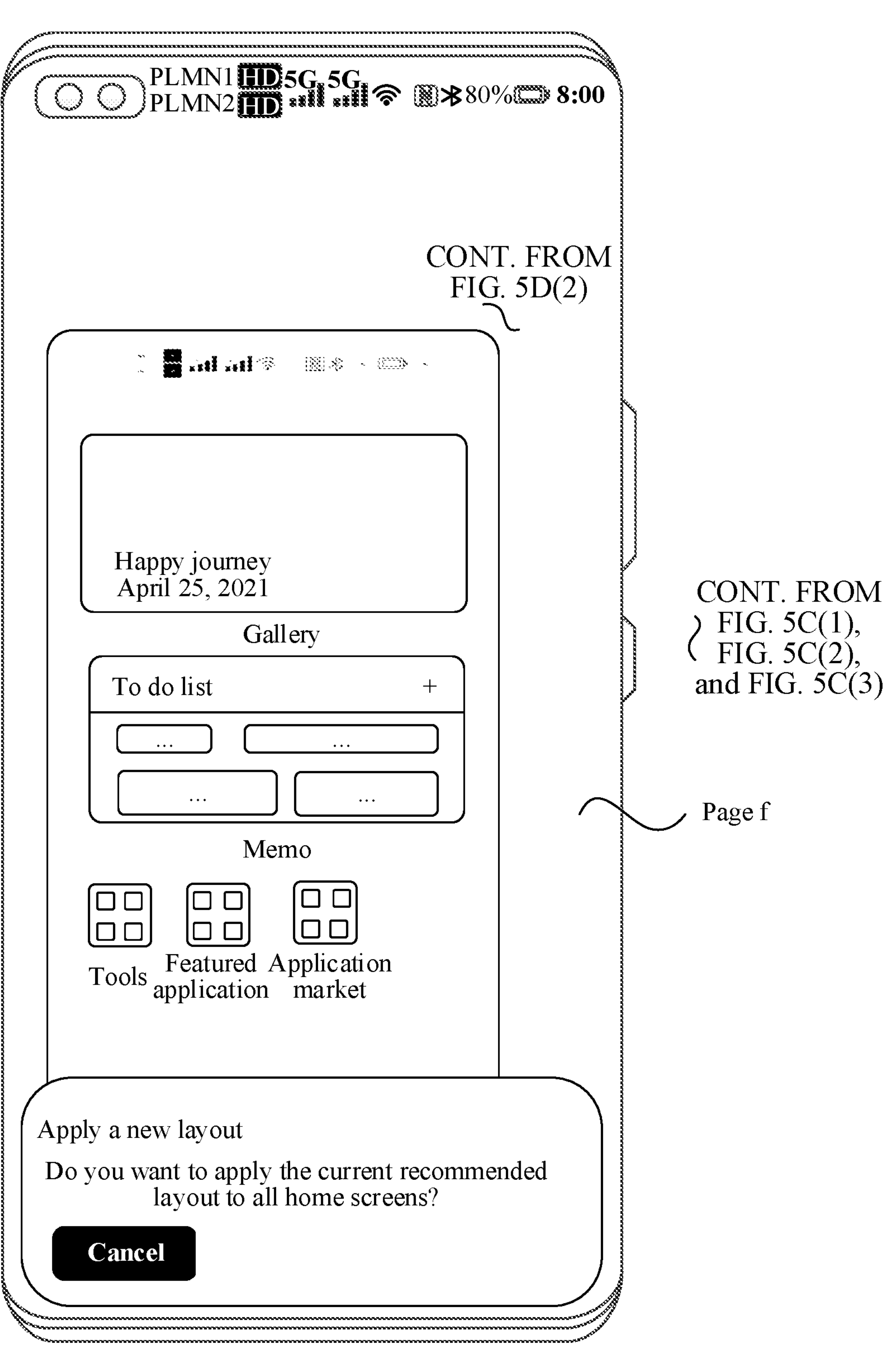
FIG. 5D(3)

CONT. FROM FIG. 6B
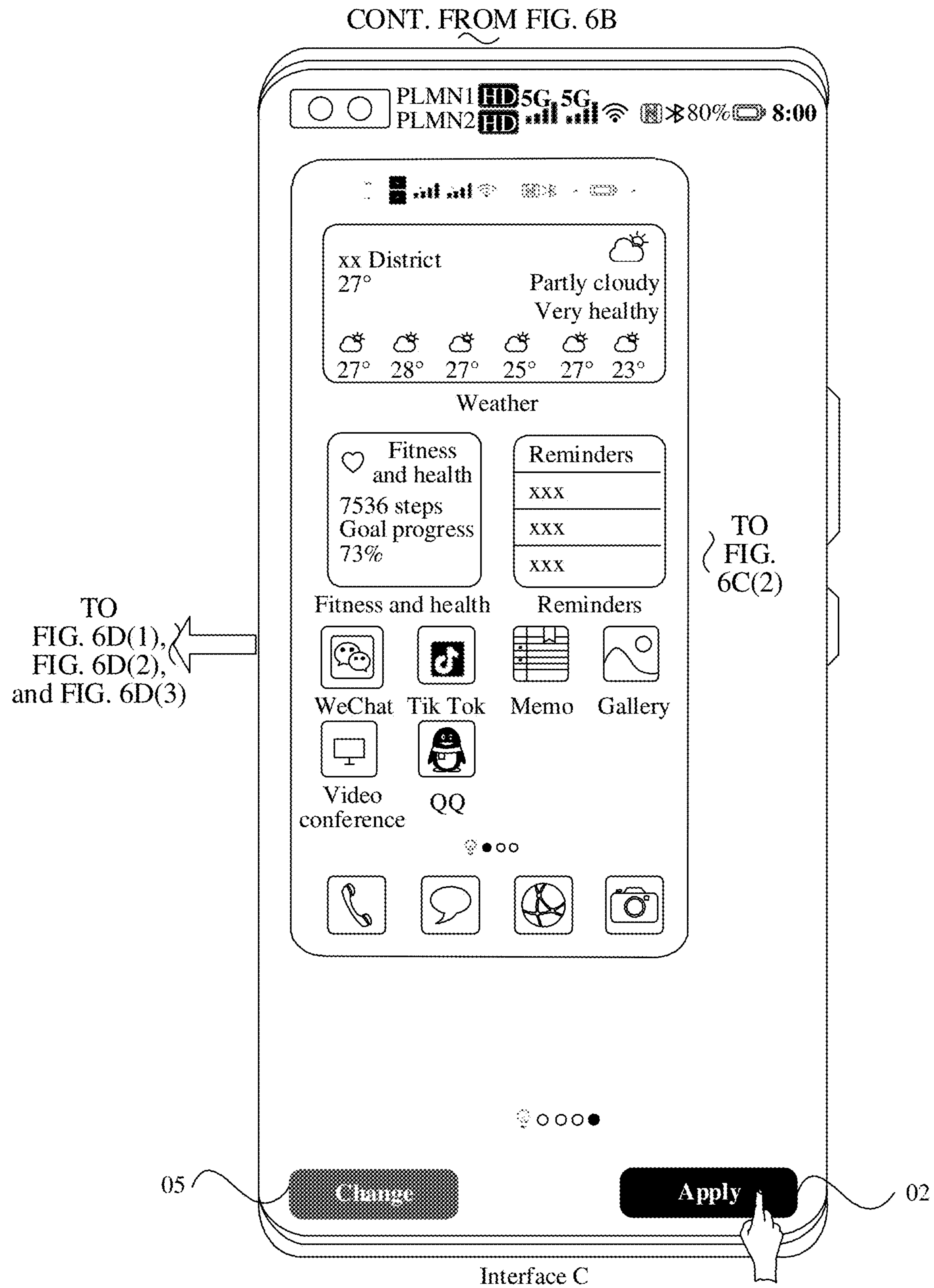
FIG. 6C(1)

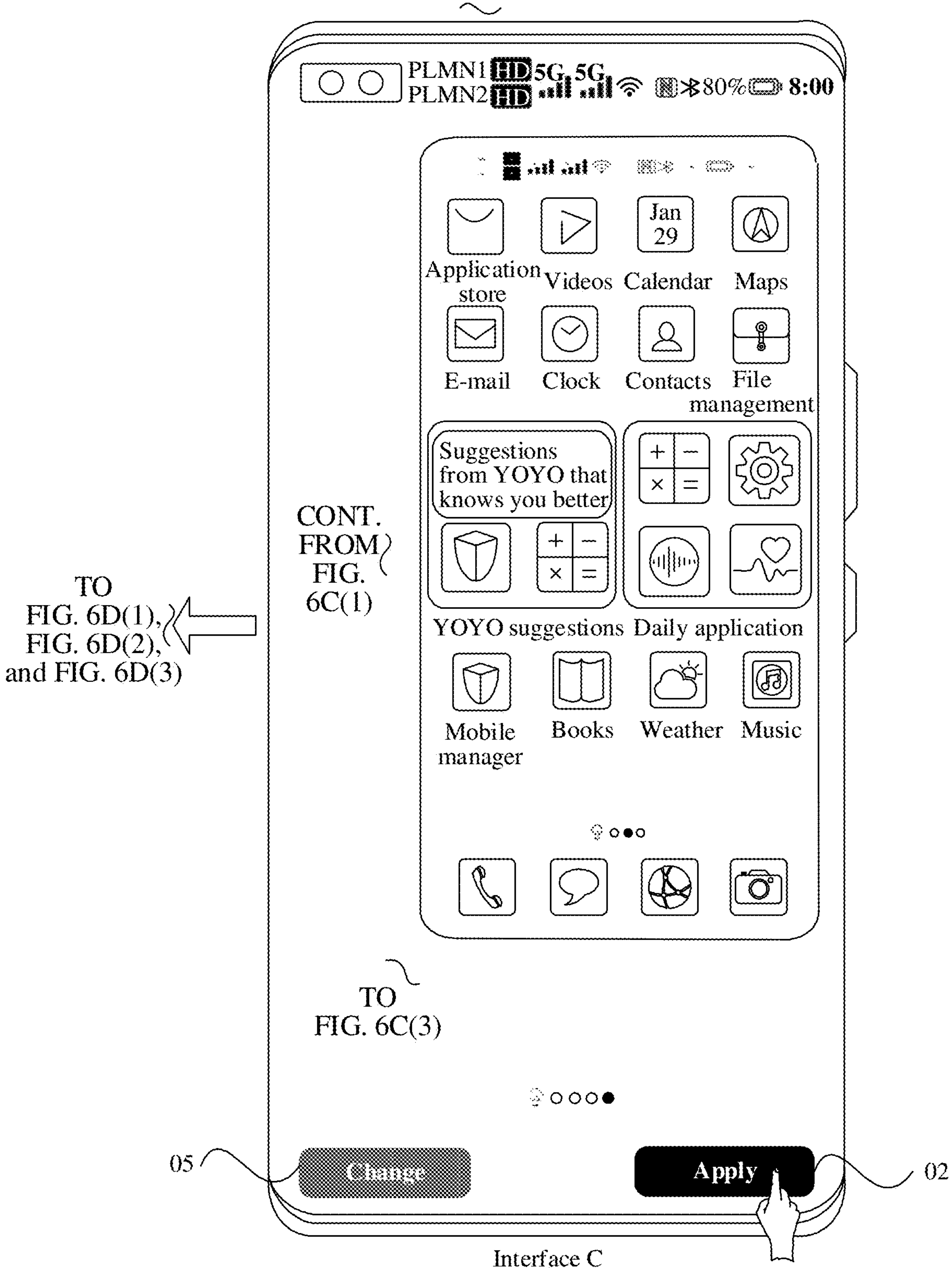
FIG. 6C(2)

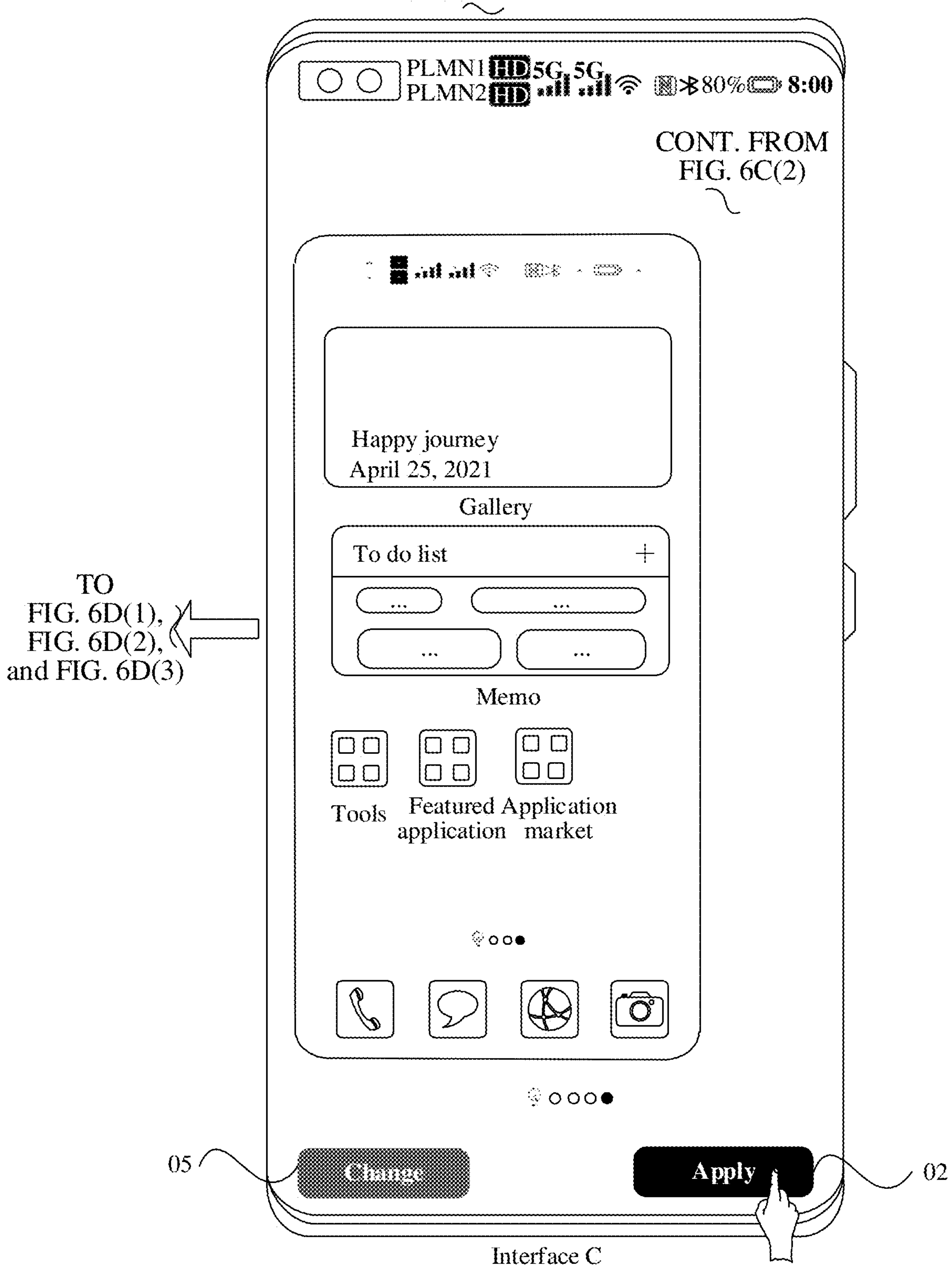
FIG. 6C(3)

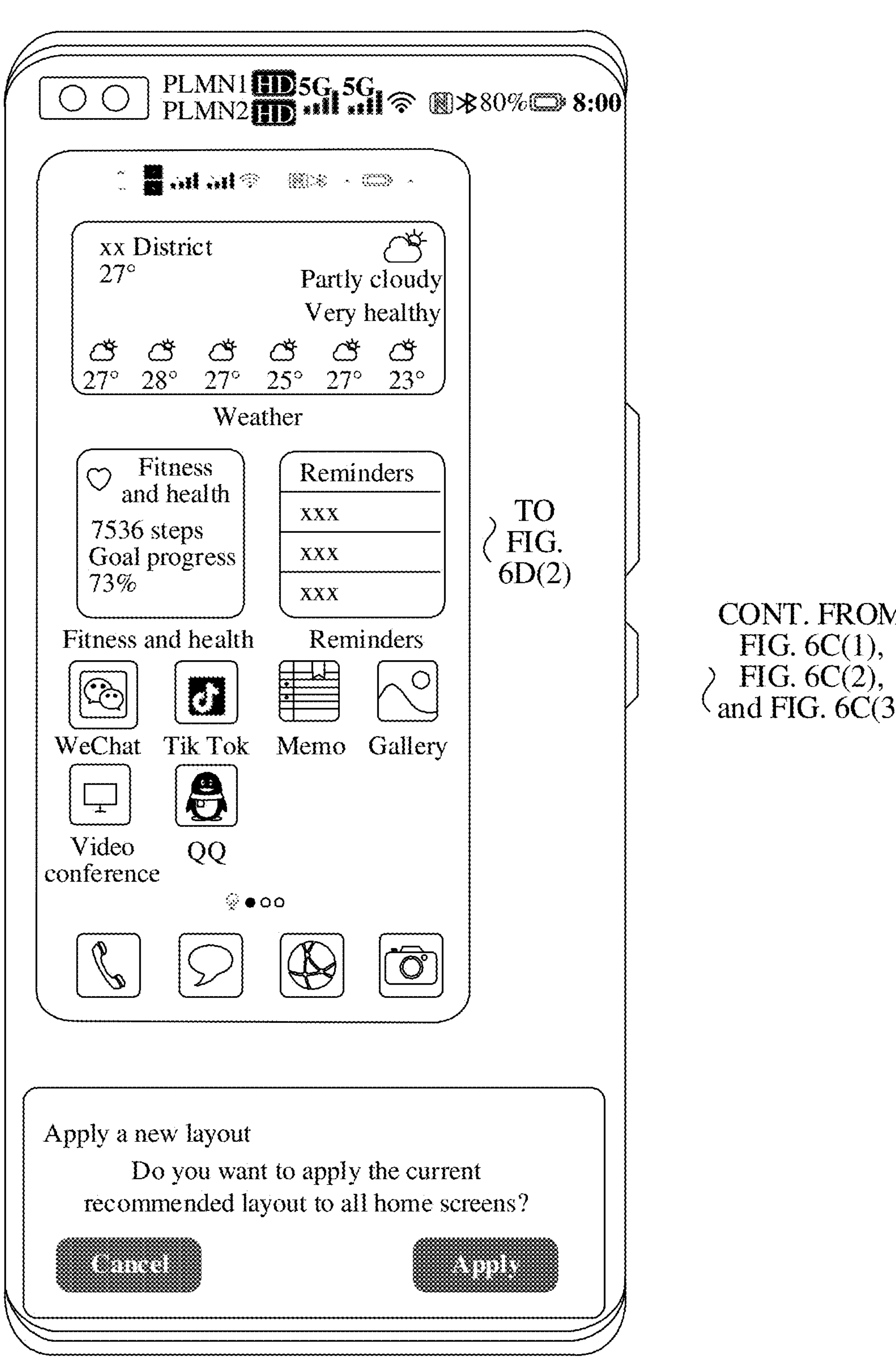
Interface D
FIG. 6D(1)

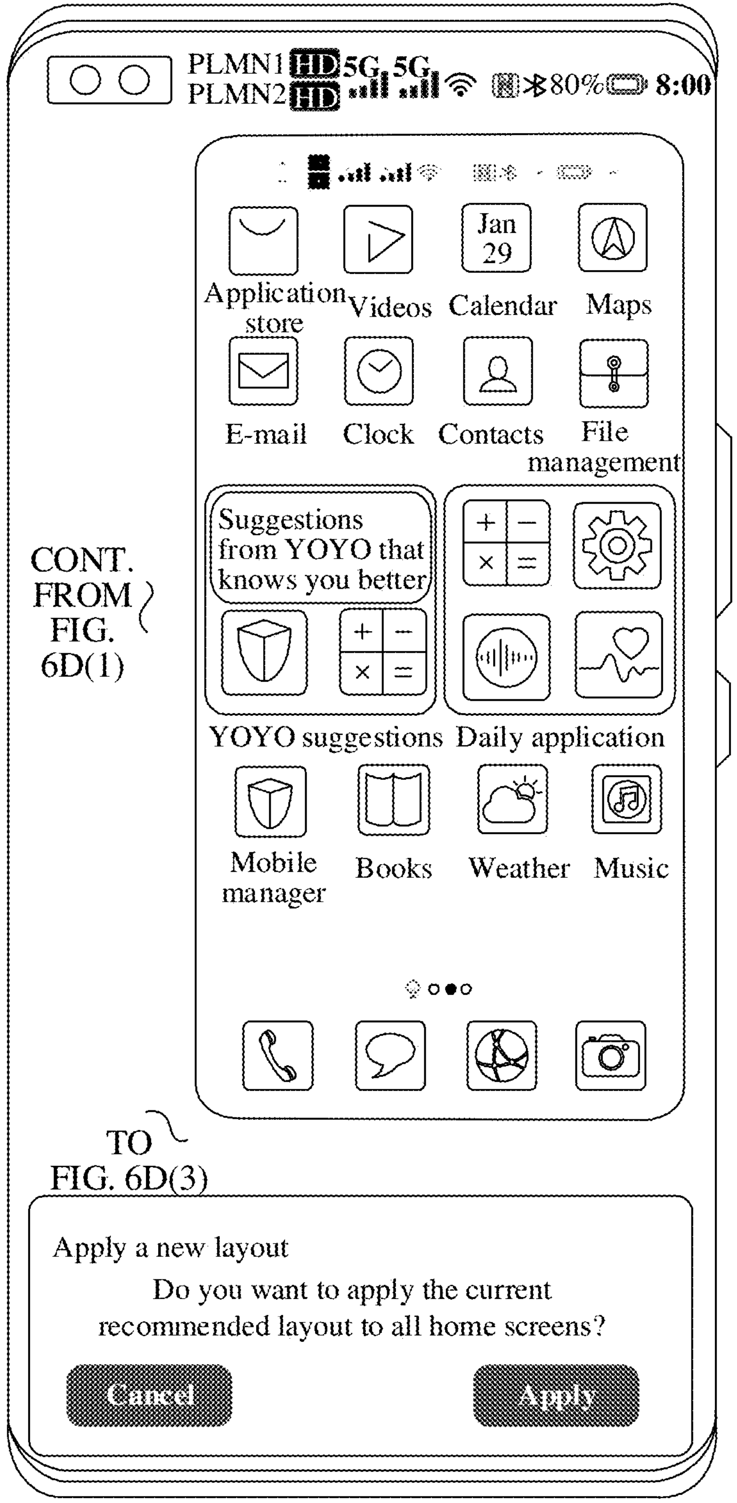
CONT. FROM FIG. 6D(1)
CONT. FROM FIG. 6C(1), FIG. 6C(2), and FIG. 6C(3)
TO FIG. 6D(3)
Interface D
FIG. 6D(2)

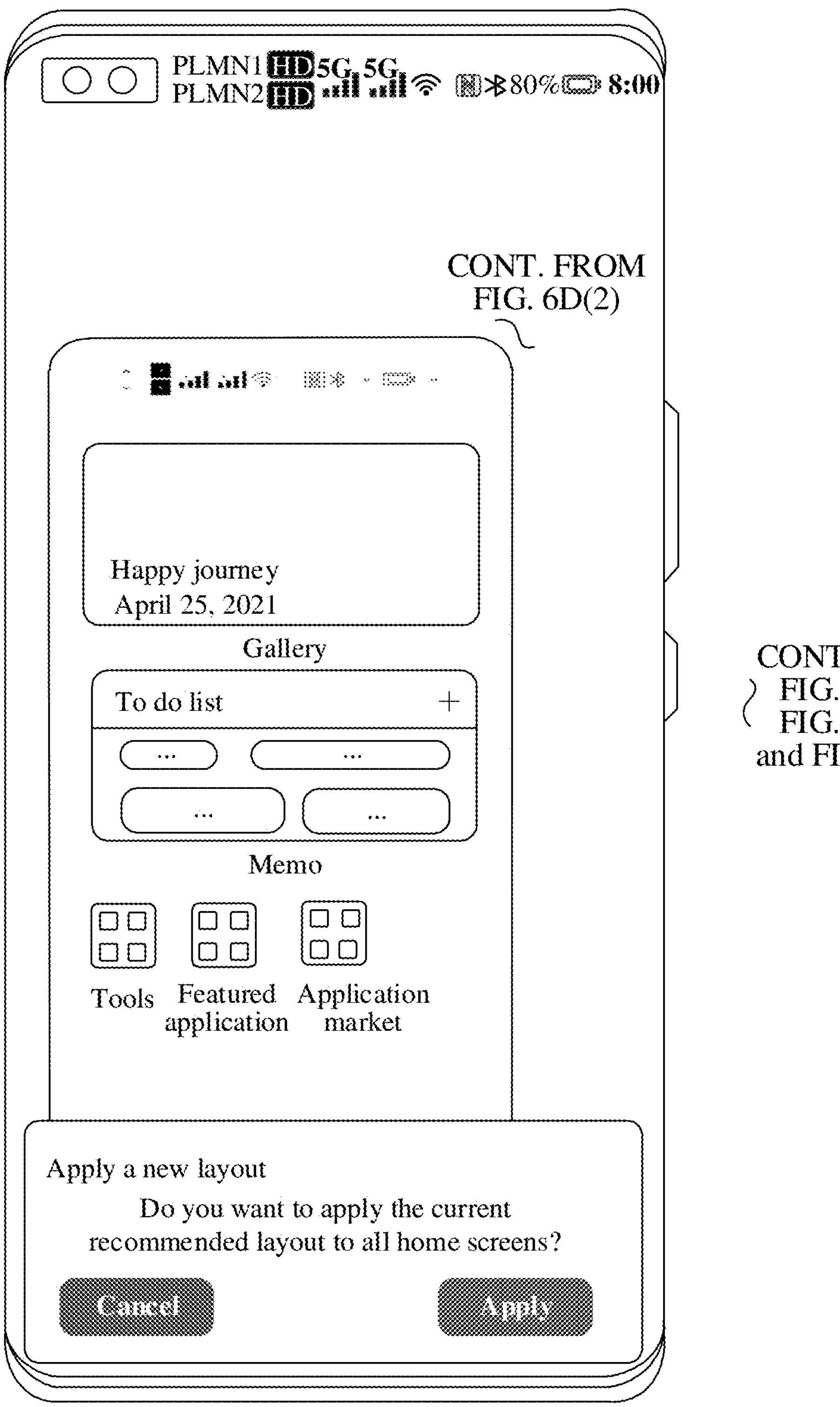
CONT. FROM FIG. 6C(1), FIG. 6C(2), and FIG. 6C(3)
FIG. 6D(3)

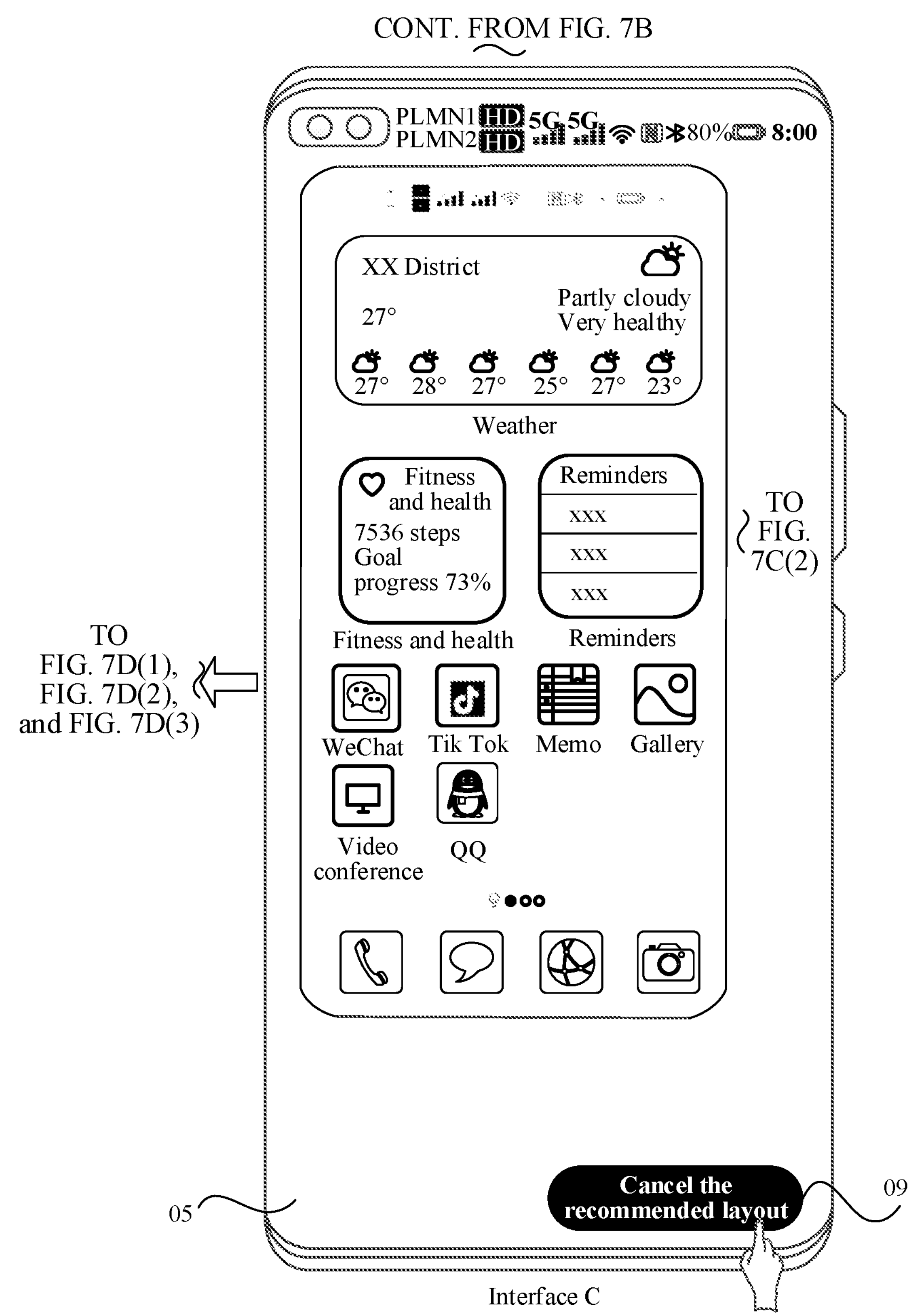
FIG. 7C(1)

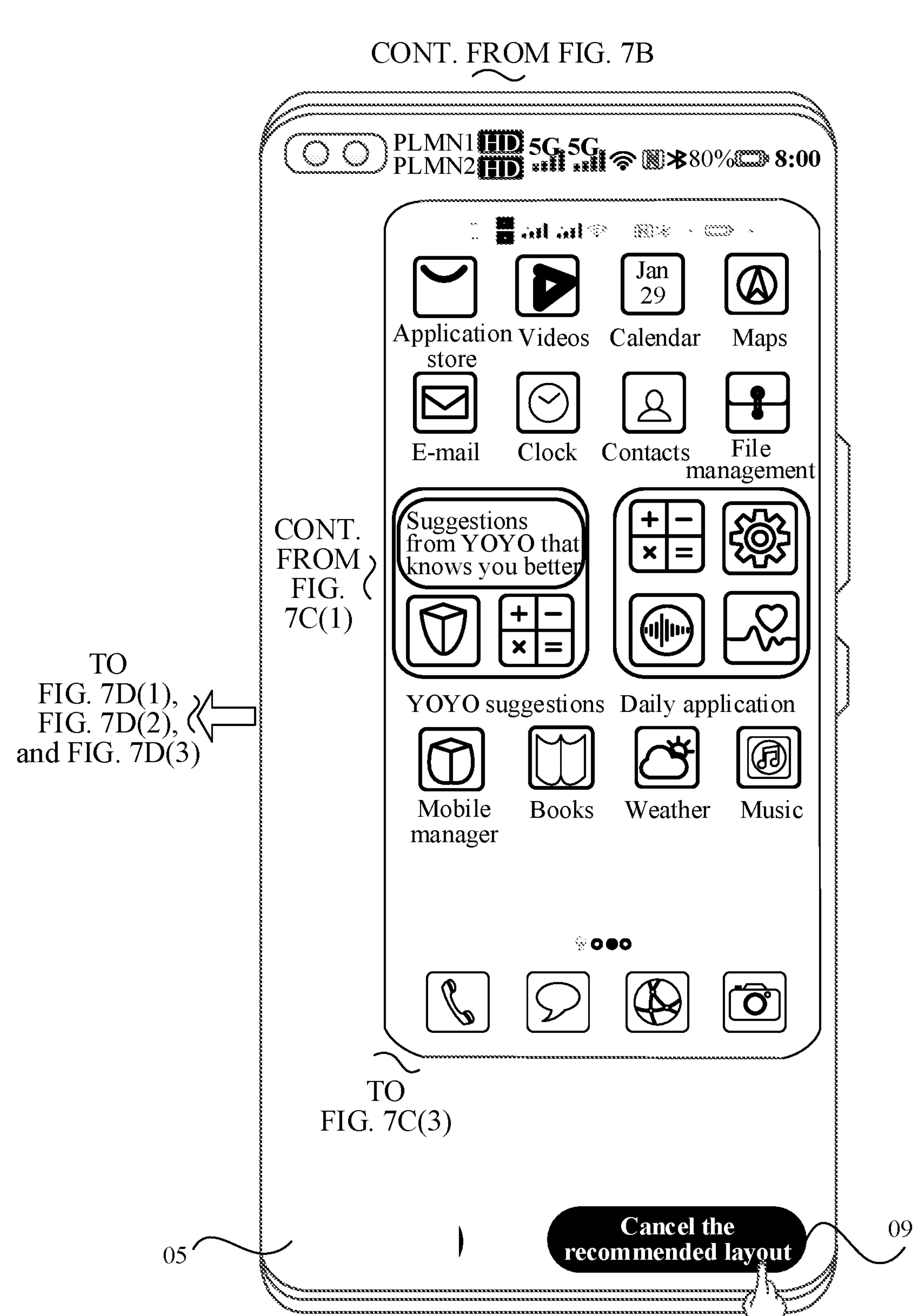
FIG. 7C(2)

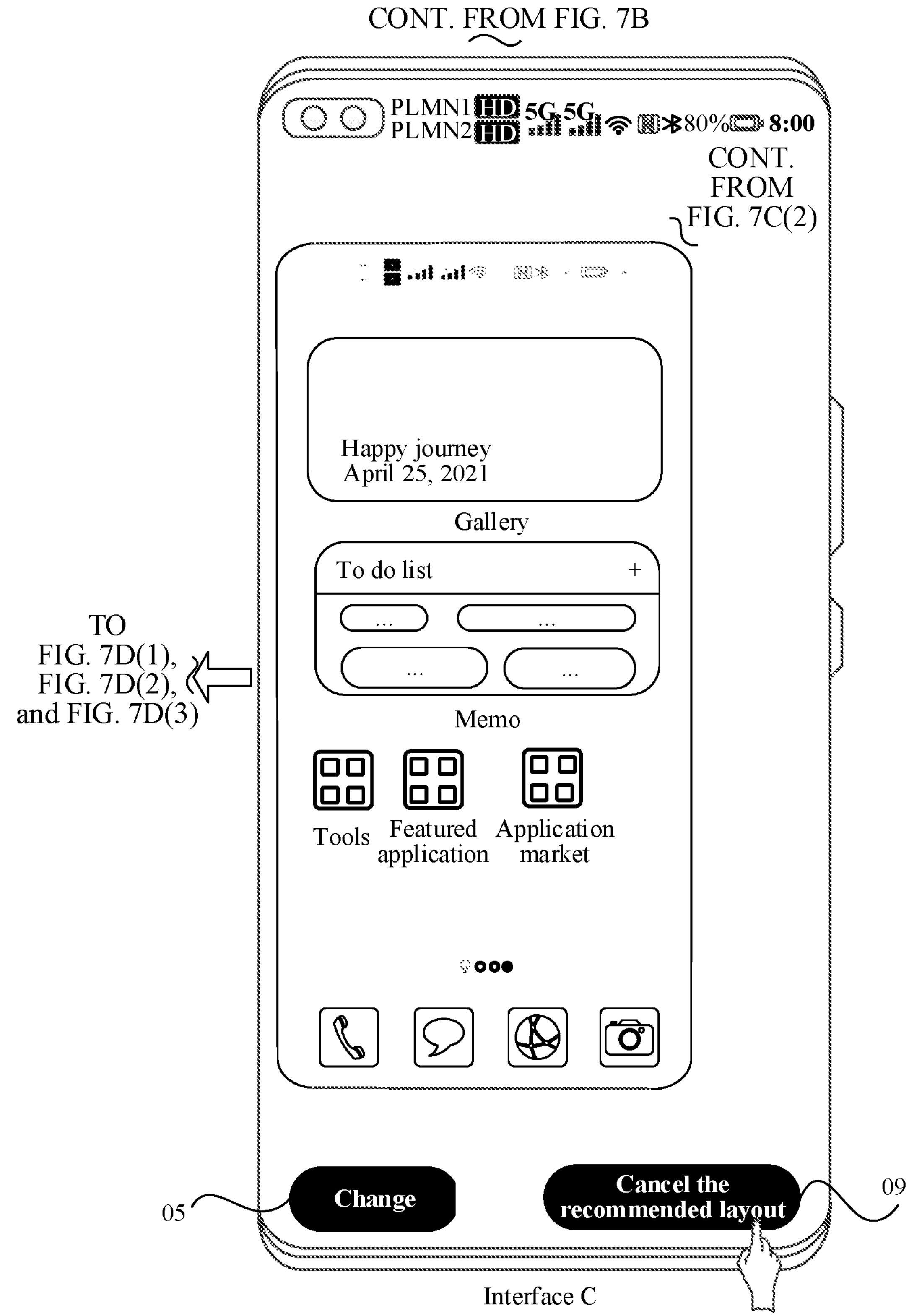
FIG. 7C(3)

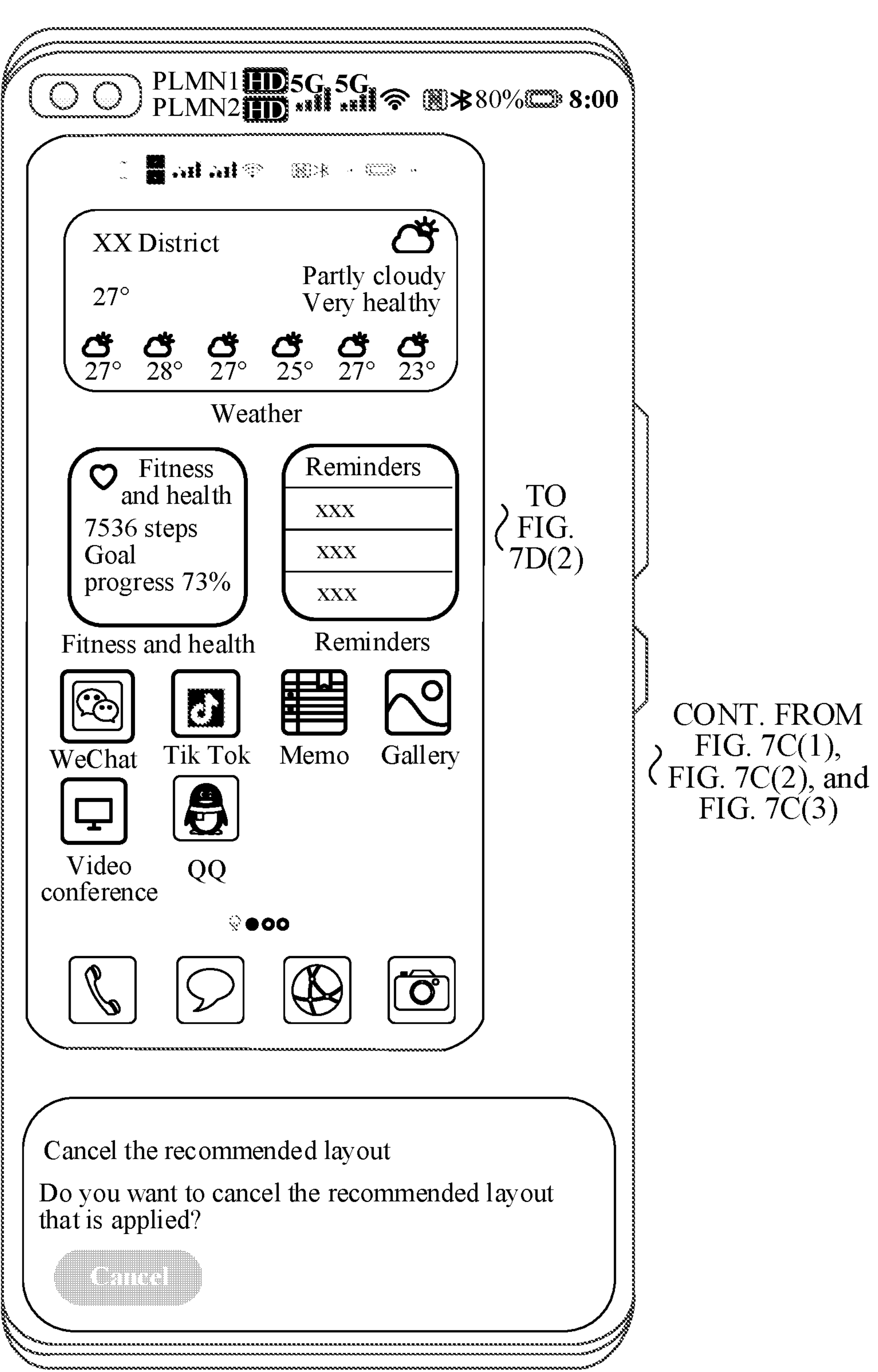
FIG. 7D(1)

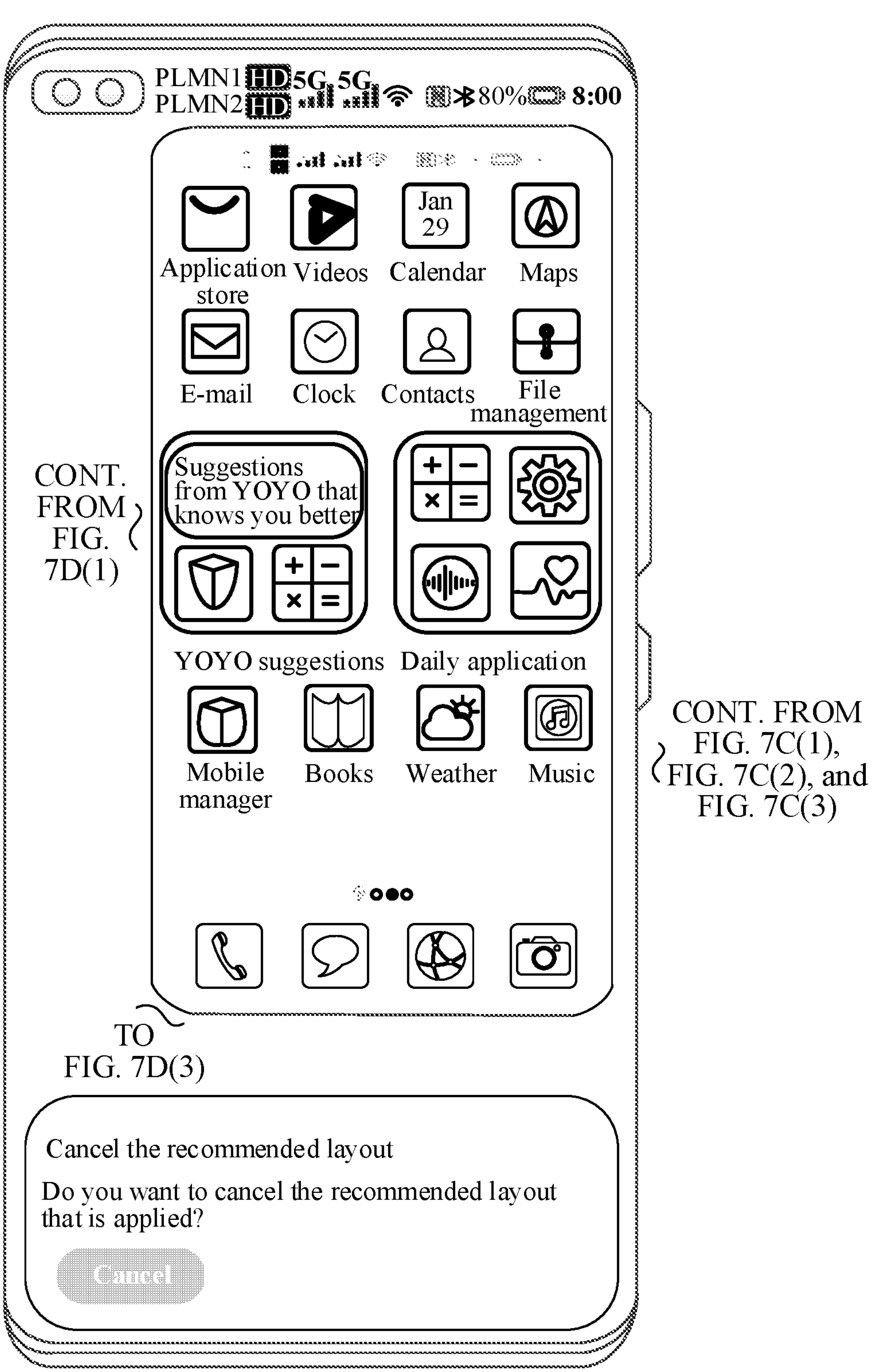
FIG. 7D(2)

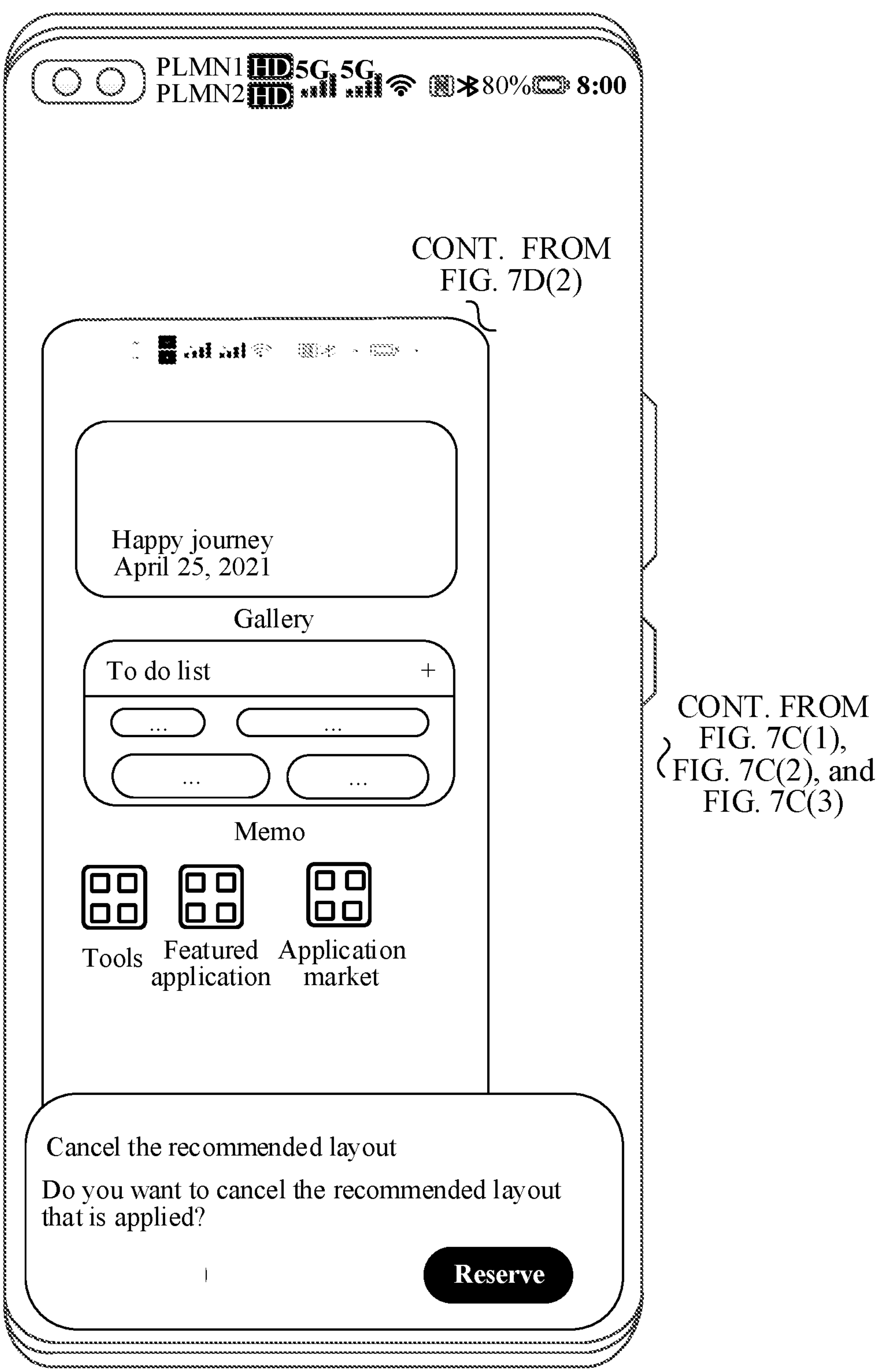
FIG. 7D(3)

CONT. FROM FIG. 8B

Interface C

CONT. FROM FIG. 8B

HOME SCREEN LAYOUT METHOD AND RELATED DEVICE

CROSS-REFERENCE TO RELATED APPLICATIONS

This application is a national stage of International Application No. PCT/CN2023/091665, filed on Apr. 28, 2023, which claims priority to Chinese Patent Application No. 202210579116.X, filed on May 26, 2022. The disclosures of both of the aforementioned applications are hereby incorporated by reference in their entireties.

TECHNICAL FIELD

This application relates to the field of terminals, and more particularly, to a home screen layout method and a related device.

BACKGROUND

With the continuous development of technology, terminal devices have more rich and interesting functions for users to experience. At present, a card home screen has become a popular trend in the industry. Users can customize layouts of application icons and application cards on home screens of mobile phones according to their own preferences.

However, there are learning costs for the users to customize the layouts of the application icons and the application cards on the home screens of the mobile phones, and the users need to learn how to operate. For some users, a process of learning a layout is difficult, and a customization process takes more time. As a result, sorting efficiency of the application icons and the application cards on the home screen is low.

SUMMARY

This application provides a home screen layout method and a related device, and is beneficial to improve sorting efficiency of application icons and application cards on a home screen.

According to a first aspect, a home screen layout method is provided. The method is applied to a terminal device, and includes: displaying a first home screen page, where the first home screen page includes an application icon and/or an application card; receiving a first sliding operation entered by a user; in response to the first sliding operation, sliding the first home screen page until a first recommended page is displayed, where the first recommended page includes a first control and a preview of a preset home screen layout recommended for the user, the preview includes a preview of a second home screen page, and the preview of the second home screen page includes an application icon and/or an application card laid out on the second home screen page; receiving a first operation of selecting the first control by the user; and updating the first home screen page to the second home screen page in response to the first operation.

In a process of using the terminal device by the user, if the user expects to replace a home screen layout, the user can slide a home screen page until the first recommended page is displayed. The first recommended page includes the preview of the preset home screen layout recommended for the user, and the user can view the preview of the preset home screen layout on the first recommended page, and apply the recommended preset home screen layout to a home screen by using the first control.

Based on the technical solutions, the terminal device can provide a layout of an application icon and an application card on a home screen of a mobile phone for the user, and the user does not need to learn how to lay out the application icon and the application card. In this way, the user can implement one-tap home screen layout replacing. This reduces time for manually adjusting the layout of the application icon and the application card on the home screen, and is beneficial to improving sorting efficiency of the application icon and the application card on the home screen by the user.

With reference to the first aspect, in some implementations of the first aspect, when the first home screen page is displayed, a first navigation identifier on the first home screen page is selected. When the first recommended page is displayed, a second navigation identifier on the first recommended page is selected.

With reference to the first aspect, in some implementations of the first aspect, the first recommended page further includes a second control. Before the receiving a first operation of selecting the first control by the user, the method further includes: receiving a second operation of selecting the second control by the user; and switching a preview of a third home screen page to the preview of the second home screen page on the first recommended page in response to the second operation.

The preview of the third home screen page includes an application icon and/or an application card laid out on the third home screen page, and a home screen layout of the third home screen page is different from a home screen layout of the second home screen page.

In this application, the terminal device may provide a plurality of different preset home screen layouts for the user, so that more choices can be provided for the user. In addition, the terminal device provides the second control for the user on the first recommended page, and the user can switch a preview of a home screen page by selecting the second control. This is beneficial to improving convenience of a user operation.

With reference to the first aspect, in some implementations of the first aspect, before the receiving a first operation of selecting the first control by the user, the method further includes: receiving a second sliding operation entered by the user; and switching a preview of a fourth home screen page to the preview of the second home screen page on the first recommended page in response to the second sliding operation.

The preview of the fourth home screen page includes an application icon and/or an application card laid out on the fourth home screen page, and a home screen layout of the fourth home screen page is different from a home screen layout of the second home screen page.

In this application, the terminal device can provide a plurality of different preset home screen layouts for the user, and the user can view different preset home screen layouts by sliding a screen, so that more choices can be provided for the user.

With reference to the first aspect, in some implementations of the first aspect, the first recommended page further includes a preview of a fifth home screen page. After the updating the first home screen page to the second home screen page in response to the first operation, the method further includes: receiving a third sliding operation entered by the user; and in response to the third sliding operation, displaying the fifth home screen page after the second home screen page is slid.

In this application, a preset home screen layout displayed on the first recommended page includes previews of a plurality of home screen pages. In response to an operation of choosing to apply the preset home screen layout to the home screen, the terminal device applies the plurality of home screen pages included in the preset home screen layout to the home screen, and the user can slide the screen to view the plurality of applied home screen layouts.

With reference to the first aspect, in some implementations of the first aspect, content of an application icon and/or an application card in the preset home screen layout is determined based on a habit of using an application by the user; and/or a position of an application icon and/or an application card in the preset home screen layout is determined based on a habit of using an application by the user.

Based on the technical solutions of this application, the terminal device can provide, for the user, a preset home screen layout that is more in line with the user habit, and is beneficial to meeting individual requirements of the user.

With reference to the first aspect, in some implementations of the first aspect, the method further includes: receiving a third operation entered by the user, where the third operation includes an operation of determining completion of out-of-box experience (out-of-box experience, OOBE) or an operation of determining completion of data migration; displaying a second recommended page in response to the third operation, where the second recommended page includes the first control and a preview of a preset home screen layout that is recommended for the user, the preview includes a preview of a sixth home screen page, and the preview of the sixth home screen page includes an application icon and/or an application card laid out on the sixth home screen page, where the application icon laid out on the sixth home screen page includes an application icon of a target application, a third control is displayed on each of the application icon of the target application and the application card, and the third control is in a selected state; receiving a fourth operation of selecting the first control by the user; and displaying the sixth home screen page on the home screen in response to the fourth operation.

In a scenario in which the user completes OOBE or data migration by using a new mobile phone, the terminal device can display the second recommended page for the user before entering the home screen. The second recommended page includes the preview of the preset home screen layout recommended for the user, so that the user does not need to learn how to lay out. In this way, the user can implement one-tap home screen layout replacing. This reduces time for manually adjusting the layout of the application icon and the application card on the home screen, and is beneficial to improving sorting efficiency of the application icon and the application card on the home screen by the user.

With reference to the first aspect, in some implementations of the first aspect, before the receiving a fourth operation of selecting the first control by the user, the method further includes: receiving a fifth operation of selecting the third control by the user; and canceling selection of the third control in response to the fifth operation.

In this application, the user can choose to cancel selection of the third control. Canceling selection of the third control means that the user does not need to use the unselected target application. In this way, after the preset home screen layout is applied to the home screen, the application icon of the unselected target application is not displayed on the home screen.

With reference to the first aspect, in some implementations of the first aspect, the target application includes a downloaded application and/or a to-be-downloaded application.

According to a second aspect, a home screen layout method is provided. The method is applied to a terminal device, and includes: displaying a seventh home screen page, where the seventh home screen page includes an application icon and/or an application card; receiving a sixth operation entered by a user on the seventh home screen page; displaying a home screen editing page in response to the sixth operation, where the home screen editing page includes a fourth control; receiving a seventh operation of selecting the fourth control by the user; displaying a third recommended page in response to the seventh operation, where the third recommended page includes a preview of a preset template of a home screen layout recommended for the user, the preview includes a preview of an eighth home screen page, and the preview of the eighth home screen page includes a plurality of preset positions of application icons and/or application cards on the eighth home screen; receiving an eighth operation of the user on the third recommended page; and displaying the eighth home screen page on a home screen in response to the eighth operation.

In a process of using a mobile phone, if the user expects to change a home screen layout, for example, to create a new home screen page, in response to an operation entered by the user, the terminal device enters a home screen editing mode, displays the home screen editing page, and provides the fourth control for the user on the home screen editing page. The terminal device can display the third recommended page by selecting the fourth control, where the third recommended page includes a preview of a preset template of a home screen layout recommended for the user. In this way, the user can add an application icon or an application card at a corresponding preset position based on the preset template of the home screen layout. This is beneficial to reducing time for the user to manually adjust the layout position of the application icon or the application card on the home screen and improving sorting efficiency of the application icon and the application card on the home screen by the user.

It should be understood that each of the first recommended page and the second recommended page according to the first aspect includes the preview of the preset home screen layout. The preset position of the application icon or the application card is preset in the preset home screen layout, and the corresponding application icon or application card is added to the preset position. The third recommended page according to the second aspect includes the preview of the preset template of the home screen layout. The preset template of the home screen layout includes a plurality of preset positions of application icons and/or application cards on the eighth home screen page, but no application icon or application card is added to the preset position.

With reference to the second aspect, in some implementations of the second aspect, the preview of the eighth home screen page further includes the application icons and/or the application cards laid out at the plurality of preset positions.

Based on the technical solutions of this application, the preview of the eighth home screen page not only includes the plurality of preset positions of the application icons and/or the application cards on the eighth home screen page, but also includes the application icons and/or the application cards laid out at the plurality of preset positions. In this way, operations of adding the application icon and/or the application card by the user at the preset position can be reduced, and sorting efficiency of the application icon and the application card on the home screen by the user can be improved.

With reference to the second aspect, in some implementations of the second aspect, the third recommended page further includes a fifth control. The receiving an eighth operation of the user on the third recommended page includes: receiving an operation of selecting a fifth control by the user on the third recommended page. The displaying the eighth home screen page on a home screen in response to the eighth operation includes: updating the seventh home screen page to the eighth home screen page in response to the operation of selecting the fifth control by the user.

In this application, the user can apply the recommended eighth home screen page to the home screen by selecting the fifth control. This is beneficial to improving sorting efficiency of the application icon and the application card on the home screen by the user.

With reference to the second aspect, in some implementations of the second aspect, the third recommended page further includes a preview of a ninth home screen page. After the displaying the eighth home screen page on a home screen in response to the eighth operation, the method further includes: receiving a fourth sliding operation entered by the user; and in response to the fourth sliding operation, displaying the ninth home screen page after the eighth home screen page is slid.

With reference to the second aspect, in some implementations of the second aspect, each of the plurality of preset positions includes a control for adding an application card or at least one application icon. The method further includes: displaying a to-be-added application icon or application card in response to an operation of the user on a control at a first preset position, where the first preset position is any one of the plurality of preset positions; and in response to selecting an application card or an application icon by the user, adding, to the first preset position, the application card or the application icon selected by the user.

In this application, each preset position includes the control for adding an application card or at least one application icon, and the user can add the application card or the application icon at the preset position by tapping the control. This is beneficial to meeting personalized requirements of the user.

With reference to the second aspect, in some implementations of the second aspect, the receiving an eighth operation of the user on the third recommended page includes: receiving a tap operation of the user in blank space of the third recommended page. The displaying the eighth home screen page on a home screen in response to the eighth operation includes: adding and displaying the eighth home screen page on the home screen in response to the tap operation of the user in the blank space of the third recommended page.

In this application, the eighth home screen page is a new home screen page created by the user. After the user creates the eighth home screen page on the third recommended page, the user can add, for display, the eighth home screen page on the home screen by tapping the third recommended page.

With reference to the second aspect, in some implementations of the second aspect, the third recommended page further includes a sixth control. Before the receiving an eighth operation of the user on the third recommended page, the method further includes: receiving a ninth operation of selecting the sixth control by the user; and switching a preview of a tenth home screen page to the preview of the eighth home screen page on the third recommended page in response to the ninth operation.

The preview of the tenth home screen page includes a plurality of preset positions of application icons and/or application cards on the tenth home screen page, and a preset template of a home screen layout of the tenth home screen page is different from a preset template of a home screen layout of the eighth home screen page.

In this application, the terminal device may recommend previews of preset templates of a plurality of home screen layouts to the user, and may provide the sixth control for the user on the third recommended page. For example, a preview of a preset template of a first home screen layout includes the preview of the tenth home screen page. If the user does not want to apply the tenth home screen page on the home screen, the terminal device switches the preview of the preset template of the first home screen layout to a preview of a preset template of a second home screen layout on the third recommended page in response to an operation of selecting the sixth control by the user. The preview of the preset template of the second home screen layout includes the preview of the eighth home screen page.

With reference to the second aspect, in some implementations of the second aspect, before the receiving an eighth operation of the user on the third recommended page, the method further includes: receiving a fifth sliding operation entered by the user; and switching a preview of an eleventh home screen page to the preview of the eighth home screen page on the third recommended page in response to the fifth sliding operation.

The preview of the eleventh home screen page includes a plurality of preset positions of application icons and/or application cards on the eleventh home screen page, and a preset template of a home screen layout of the eleventh home screen page is different from a preset template of a home screen layout of the eighth home screen page.

In this application, the user can slide a screen to enable the terminal device to switch previews of preset templates of different home screen layouts for display.

According to a third aspect, a home screen layout apparatus is provided. The apparatus includes: a module configured to perform the method according to any possible implementation of any aspect. Specifically, the apparatus includes a module configured to perform the method according to any possible implementation of any aspect.

According to a third aspect, another home screen layout apparatus is provided. The apparatus includes a processor and a memory. The processor is coupled to the memory, and the memory may be configured to store a computer program. The processor may be configured to invoke and execute the computer program in the memory, to implement the method according to any possible implementation of any aspect.

In a possible implementation, the home screen layout apparatus is a terminal device. When the home screen layout apparatus is a terminal device, a communication interface may be a transceiver, or an input/output interface.

In another implementation, the home screen layout apparatus is a chip configured in the terminal device. When the home screen layout apparatus is a chip configured in the terminal device, a communication interface may be an input/output interface.

According to a fifth aspect, a processor is provided. The processor includes: an input circuit, an output circuit, and a processing circuit. The processing circuit is configured to receive a signal by using the input circuit and transmit a signal by using the output circuit, so that the processor performs the method according to any possible implementation of any aspect.

In a specific implementation process, the foregoing processor may be a chip, the input circuit may be an input pin, the output circuit may be an output pin, and the processing circuit may be a transistor, a gate circuit, a flip-flop, various logic circuits, and the like. An input signal received by the input circuit may be received and inputted by, for example, but not limited to, a receiver, a signal outputted by the output circuit may be, for example, but not limited to, a signal outputted to a transmitter and transmitted by the transmitter. In addition, the input circuit and the output circuit may be a same circuit, the circuit is used as an input circuit and an output circuit respectively at different moments. A specific implementation of the processor and various circuits is not limited in this application.

According to a sixth aspect, a processing apparatus is provided. The apparatus includes a processor and a memory. The processor is configured to read instructions stored in the memory, and may receive a signal by using a receiver and transmit a signal by using a transmitter, to perform the method according to any possible implementation of any aspect.

Optionally, the processor may be one or more, and the memory may be one or more.

Optionally, the memory may be integrated with the processor, or the memory and the processor may be separately arranged.

In a specific implementation process, the memory may be a non-transitory (non-transitory) memory, for example, a read-only memory (read only memory, ROM), and the memory and the processor may be integrated on a same chip, or may be arranged on different chips respectively. A type of the memory and an arrangement manner of the memory and the processor are not limited in embodiments of this application.

It should be understood that, a related data interaction process, for example, sending indication information, may be a process of outputting indication information from the processor, and receiving ability information may be a process of receiving and inputting ability information by the processor. Specifically, data processed and outputted may be outputted to the transmitter, input data received by the processor may be from the receiver. The transmitter and the receiver may be collectively referred to as a transceiver.

The processing apparatus in the foregoing sixth aspect may be a chip, the processor may be implemented by hardware, or may be implemented by software, and when the processor is implemented by hardware, the processor may be a logic circuit, an integrated circuit, and the like; and when the processor is implemented by software, the processor may be a general-purpose processor and be implemented by reading software code stored in the memory, where the memory may be integrated inside the processor, or may be located outside the processor and exist independently.

According to a seventh aspect, a computer program product is provided. The computer program product includes: computer program code, where when the computer program code is run, a computer is enabled to perform the method according to any possible implementation of any aspect.

According to an eighth aspect, a computer-readable storage medium is provided. The computer-readable storage medium stores a computer program. When the computer program is run, a computer is enabled to perform the method according to any possible implementation of any aspect.

BRIEF DESCRIPTION OF THE DRAWINGS

FIG. 5A to FIG. 5D(3) are a schematic interface diagram of yet another recommended home screen layout according to an embodiment of this application;

FIG. 6A to FIG. 6D(3) are a schematic interface diagram of yet another recommended home screen layout according to an embodiment of this application;

FIG. 7A to FIG. 7D(3) are a schematic interface diagram of canceling a home screen layout according to an embodiment of this application;

DETAILED DESCRIPTION OF ILLUSTRATIVE EMBODIMENTS

The following describes technical solutions in this application with reference to the accompanying drawings.

For ease of describing the technical solutions in embodiments of this application clearly, in embodiments of this application, the terms such as "first" and "second" are used to distinguish same or similar items with a basically same function and role. For example, a first control and a second control are merely used to distinguish between different controls, and are not intended to limit a sequence thereof. A person skilled in the art may understand that, the terms such as "first" and "second" do not limit a quantity and an execution order, and the terms such as "first" and "second" are not limited to be necessarily different.

It should be noted that, in this application, the terms such as "as an example" or "for example" is used to represent giving an example, an illustration, or a description. Any embodiment or design scheme described as "as an example" or "for example" in embodiments of this application should not be explained as being more preferable or more advantageous than another embodiment or design scheme. Exactly, use of the terms such as "as an example" or "for example" is intended to present a related concept in a specific manner.

In addition, "at least one" means one or more and "a plurality of" means two or more. The term "and/or" describes an association relationship for describing associated objects and represents that three relationships may exist. For example, A and/or B may represent: Only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, and c may represent: a, b, c, a and b, a and c, b and c, or a, b, and c, where a, b, and c may be singular or plural.

Figure 1:
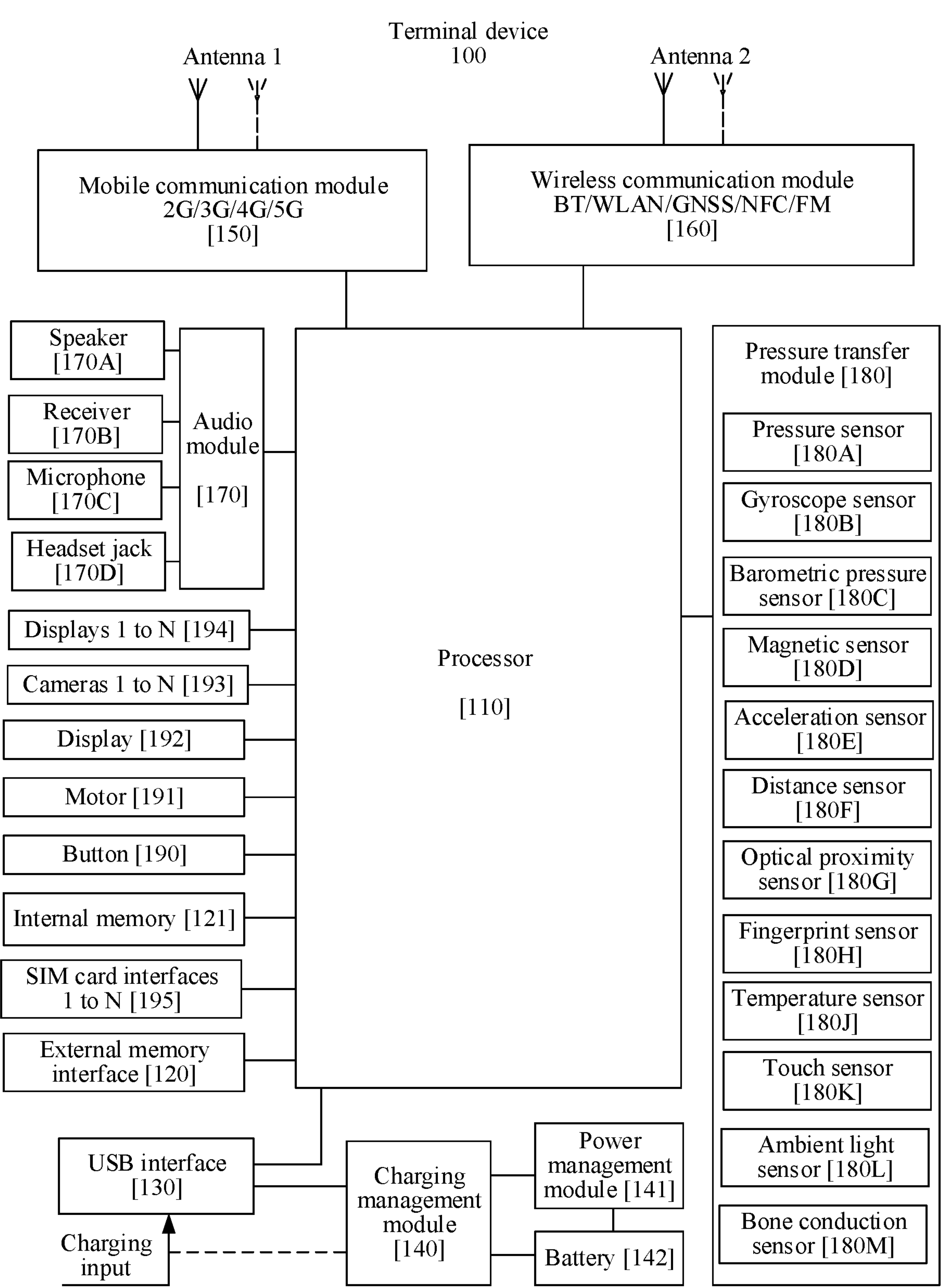
FIG. 1 is a schematic diagram of a structure of a terminal device according to an embodiment of this application.

FIG. 1 is a schematic diagram of a structure of a terminal device according to an embodiment of this application. As shown in FIG. 1, a terminal device 100 may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor 180, a button 190, a motor 191, an indicator 192, a camera 193, a display 194, a subscriber identity module (subscriber identification module, SIM) card interface 195, and the like. It may be understood that the structure illustrated in embodiments does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a display process unit (display process unit, DPU), and/or a neural-network processing unit (neural-network processing unit, NPU). Different processing units may be independent components, or may be integrated into one or more processors. In some embodiments, the terminal device 100 may further include one or more processors 110. The processor may be a nerve center and a command center of the terminal device 100. The processor may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data used or cyclically used by the processor 110. If the processor 110 needs to use the instructions or the data again, the processor may directly invoke the instructions or the data from the memory. This avoids repeated access, and reduces a waiting time of the processor 110, thereby improving efficiency of the terminal device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a USB interface, and/or the like. The USB interface 130 is an interface that conforms to a USB standard specification, and may be specifically a mini USB interface, a micro USB interface, a USB Type-C interface, or the like. The USB interface 130 may be configured to connect to the charger to charge the terminal device 100, or may be configured to perform data transmission between the terminal device 100 and a peripheral device, or may be configured to connect to a headset to play an audio by using the headset.

It may be understood that an interface connection relationship between the modules shown in embodiments of this application is an example for description, and does not constitute a limitation on the structure of the terminal device 100. In some other embodiments of this application, the terminal device 100 may alternatively use an interface connection manner different from that in the foregoing embodiment, or a combination of a plurality of interface connection manners.

A wireless communication function of the terminal device 100 may be implemented by using the antenna 1, the antenna 2, the mobile communication module 150, the wireless communication module 160, the modem processor, the baseband processor, and the like. The antenna 1 and the antenna 2 are configured to transmit and receive electromagnetic wave signals. Each antenna in the terminal device 100 may be configured to cover one or more communication frequency bands. Different antennas may be further multiplexed, to improve antenna utilization. For example, the antenna 1 may be reused as a diversity antenna in a wireless local area network. In some other embodiments, the antenna may be used in combination with a tuning switch.

The mobile communication module 150 may provide a wireless communication solution that includes 2G/3G/4G/5G or the like and that is applied to the terminal device 100. The mobile communication module 150 may include at least one filter, a switch, a power amplifier, a low noise amplifier, and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio output device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal device 100 and that includes wireless local area networks (wireless local area networks, WLAN), Bluetooth, a global navigation satellite system (global navigation satellite system, GNSS), frequency modulation (frequency modulation, FM), NFC, and an infrared (infrared, IR) technology. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal device 100, the antenna 1 and the mobile communication module 150 are coupled, and the antenna 2 and the wireless communication module 160 are coupled, so that the terminal device 100 can communicate with a network and another device by using a wireless communication technology. The wireless communication technology may include a GSM, a GPRS, CDMA, WCDMA, TD-SCDMA, LTE, a GNSS, a WLAN, NFC, FM, and/or an IR technology. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The terminal device 100 may implement a display function by using the GPU, the display 194, the application processor, and the like. The application processor may include an NPU and a DPU. The GPU is a microprocessor for image processing, and is connected to the display 194 and the application processor. The GPU is configured to: perform mathematical and geometric computation, and render an image. The processor 110 may include one or more GPUs that execute an instruction to generate or change display information. The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the terminal device 100, such as image recognition, facial recognition, voice recognition, and text understanding. The DPU is also referred to as a display sub-system (display sub-system, DSS). The DPU is configured to adjust a color of the display 194, and the DPU can adjust the color of the display by using a 3D look up table (3D look up table, 3D LUT). The DPU can also perform scaling, noise reduction, contrast enhancement, backlight brightness management, HDR processing, display parameter Gamma adjustment, or the like.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a mini-LED, a micro-LED, a micro-OLED, or quantum dot light emitting diodes (quantum dot light emitting diodes, QLED). In some embodiments, the terminal device 100 may include one or N displays 194, where N is a positive integer greater than 1.

The terminal device 100 may implement a shooting function by using an ISP, one or more cameras 193, a video codec, the GPU, one or more display screens 194, the application processor, and the like.

The external memory interface 120 may be used to connect to an external storage card, for example, a micro SD card, to extend a storage capability of the terminal device 100. The external memory card communicates with the processor 110 through the external memory interface 120, to implement a data storage function. For example, data files such as music, a picture, and a video are stored into the external storage card.

The internal memory 121 may be configured to store one or more computer programs, and the one or more computer programs include instructions. The processor 110 may run the instructions stored in the internal memory 121, to enable the terminal device 100 to perform various function applications, data processing, or the like. The internal memory 121 may include a program storage area and a data storage area. The program storage area may store an operating system. The program storage area may further store one or more applications (such as photos and contacts) or the like. The data storage area may store data (for example, photos and contacts) and the like created during use of the terminal device 100. In addition, the internal memory 121 may include a high-speed random access memory, and may further include a non-volatile memory, for example, at least one magnetic disk storage device, a flash memory device, or a universal flash storage (universal flash storage, UFS). In some embodiments, the processor 110 may run the instructions stored in the internal memory 121 and/or instructions stored in the memory set in the processor 110, to enable the terminal device 100 to perform various functional applications and data processing.

The terminal device 100 may implement audio functions, for example, music playing and recording, by using the audio module 170, the speaker 170A, the receiver 170B, the microphone 170C, the headset jack 170D, the application processor, and the like. The audio module 170 is configured to convert digital audio information into an analog audio signal, and convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110. The speaker 170A, also referred to as a "horn", is configured to convert an audio electrical signal into a sound signal. The terminal device 100 may listen to music or listen to a hands-free call by using the speaker 170A. The receiver 170B, also referred to as an "earpiece", is configured to convert an audio electrical signal into a sound signal. When the terminal device 100 answers a call or voice information, the voice may be answered by placing the receiver 170B close to an ear. The microphone 170C, also referred to as a "mike" or a "mic", is configured to convert a sound signal into an electrical signal. When making a call or sending voice information, a user may make a sound by using the mouth close to the microphone 170C, and input a sound signal to the microphone 170C. The terminal device 100 may be provided with at least one microphone 170C. In some other embodiments, two microphones 170C may be disposed in the terminal device 100, to implement a noise reduction function in addition to collecting a sound signal. In some other embodiments, three, four, or more microphones 170C may alternatively be disposed in the terminal device 100, to collect a sound signal, reduce noise, identify a sound source, implement a directional recording function, and the like. The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

In embodiments of this application, the terminal device may be a handheld device or a vehicle-mounted device having a wireless connection function, and the terminal device may also be referred to as a terminal (terminal), user equipment (user equipment, UE), a mobile station (mobile station, MS), a mobile terminal (mobile terminal, MT), or the like. At present, some examples of the terminal device are as follows: a mobile phone (mobile phone), a tablet computer, a smart television, a notebook computer, a pad (pad), a palmtop computer, a mobile Internet device (mobile Internet device, MID), a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), and the like. A specific technology applied to the terminal device and a specific device form thereof are not limited in embodiments of this application.

As an example rather than a limitation, in embodiments of this application, the terminal device may alternatively be a wearable device. The wearable device may also be referred to as a wearable smart device, and is a collective term for wearable devices developed by intelligently designing daily wearing based on a wearable technology, for example, glasses, gloves, a watch, clothing, and shoes. The wearable device is a portable device that can be directly worn on a body or integrated into clothes or an accessory of a user. A wearable device is not merely a hardware device, but is used to implement a powerful function through software support, data exchange, and cloud interaction. A generalized wearable smart device includes, for example, smartwatches or smart glasses that have full functions and large sizes and that can perform some or all functions without relying on a smartphone, and various smart bands, or smart jewelries that focus only on a specific type of application function and need to be used in cooperation with another device like a smartphone and that monitor physical signs.

It should be understood that, in embodiments of this application, the terminal device may be an apparatus configured to implement the function of the terminal device, or may be an apparatus capable of supporting the terminal device to implement the function, for example, a system on chip, and the apparatus may be installed in a terminal. In embodiments of this application, the chip system may include a chip, or may include a chip and another discrete component.

The terminal device in embodiments of this application may also be referred to as: user equipment (user equipment, UE), a mobile station (mobile station, MS), a mobile terminal (mobile terminal, MT), an access terminal, a user unit, a user station, a mobile site, a mobile station, a remote station, a remote terminal, a mobile device, a user terminal, a terminal, a wireless communication device, a user agent, a user apparatus, or the like. The following uses an example in which the terminal device is a mobile phone for description.

Embodiments of this application can be specifically applied to the following scenarios.

Scenario 1: A user gets a new mobile phone, and after the new mobile phone is turned on, and the user completes an OOBE according to guidance displayed on the new mobile phone, the mobile phone may recommend preset home screen layouts for the user to select.

The OOBE may also be referred to as boot wizard, and is a series of system settings of the user on the mobile phone when the mobile phone is turned on first time. At present, the mobile phone enters a home screen of the mobile phone after the OOBE is completed. However, in this application, the mobile phone can recommend the preset home screen layouts for the user after the OOBE is completed and before the home screen of the mobile phone is entered.

Scenario 2: When a user gets a new mobile phone, the user can migrate data on an old mobile phone to the new mobile phone through mobile phone cloning, after the data migration is completed, and the new mobile phone recommends preset home screen layouts for the user to select.

Scenario 1 and Scenario 2 may be collectively referred to as new mobile phone scenarios.

Scenario 3: When a user uses a mobile phone for a period of time, if the user expects to rearrange application icons and/or application cards on a home screen, the mobile phone can provide, for the user, an entrance for previewing a preset home screen layout, and the user can view the recommended preset home screen layout by using the entrance.

It should be noted that, in embodiments of this application, an operation of recommending the preset home screen layout for the user can be implemented by using a home screen launcher (launcher) in the mobile phone. The home screen launcher maintains preset templates of home screen layouts, a plurality of layout positions are preset in each preset template, and the home screen launcher can add application icons and application cards of a plurality of applications to the preset plurality of layout positions to obtain the preset home screen layout. After the user determines to apply the preset home screen layout, the home screen launcher can display the application icons and the application cards of the plurality of applications in the mobile phone on a home screen page according to the preset home screen layout.

At present, the mobile phone adds a function of an application card for each of a home screen and a leftmost home screen. Based on the function, key information of an application can be displayed on each of the home screen and the leftmost home screen, and the user can obtain corresponding information such as itinerary, weather, and express delivery without taping the application. The user can tap the application card to directly enter a corresponding service. This is convenient and fast.

The following first describes interfaces of recommended preset home screen layouts provided in this application for Scenario 1 or Scenario 2 with reference to FIG. 2A to FIG. 4.

Figure 2A:
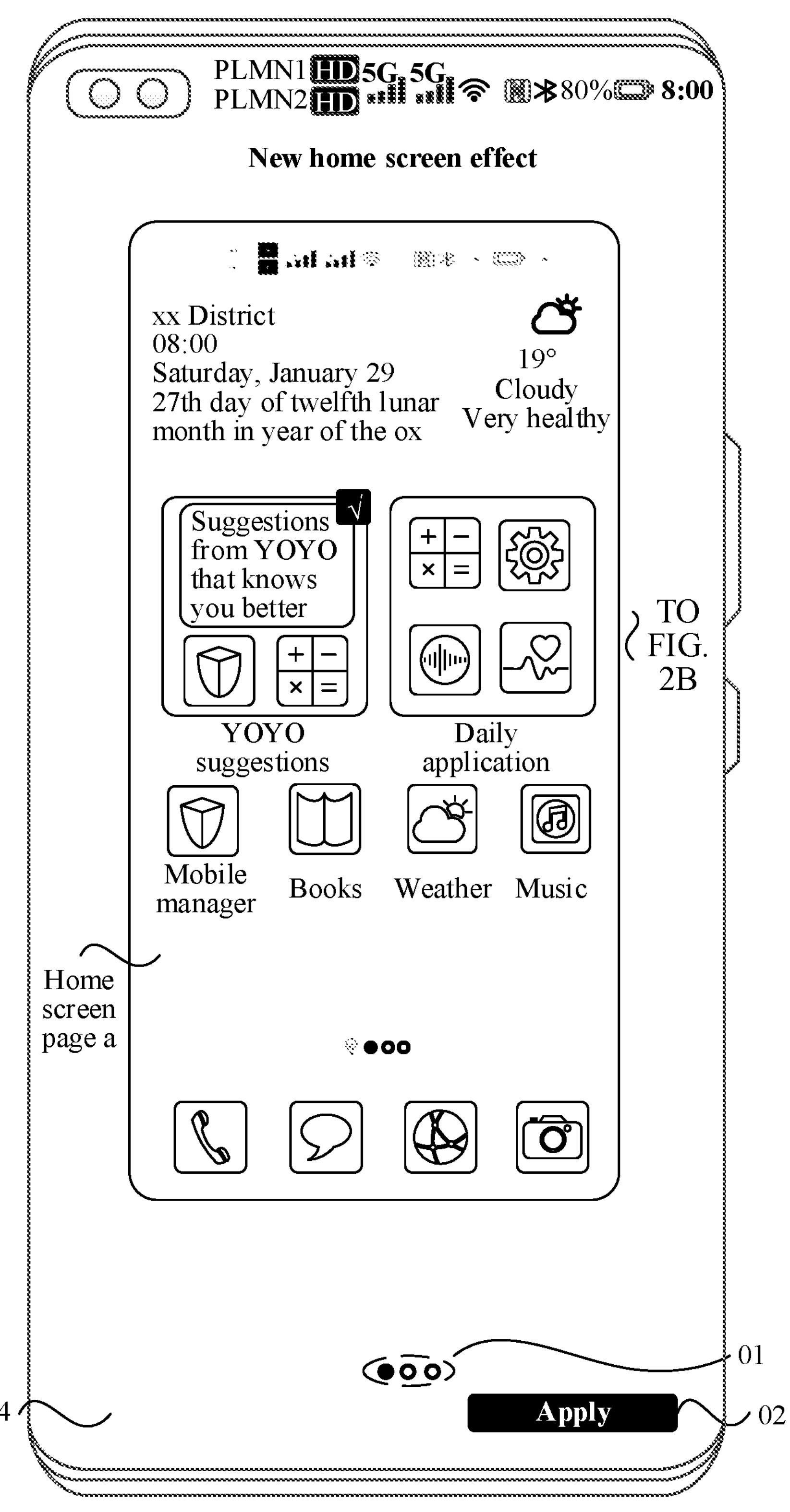
FIG. 2A to FIG. 2C are a schematic interface diagram of a recommended home screen layout according to an embodiment of this application.
Figure 2B:
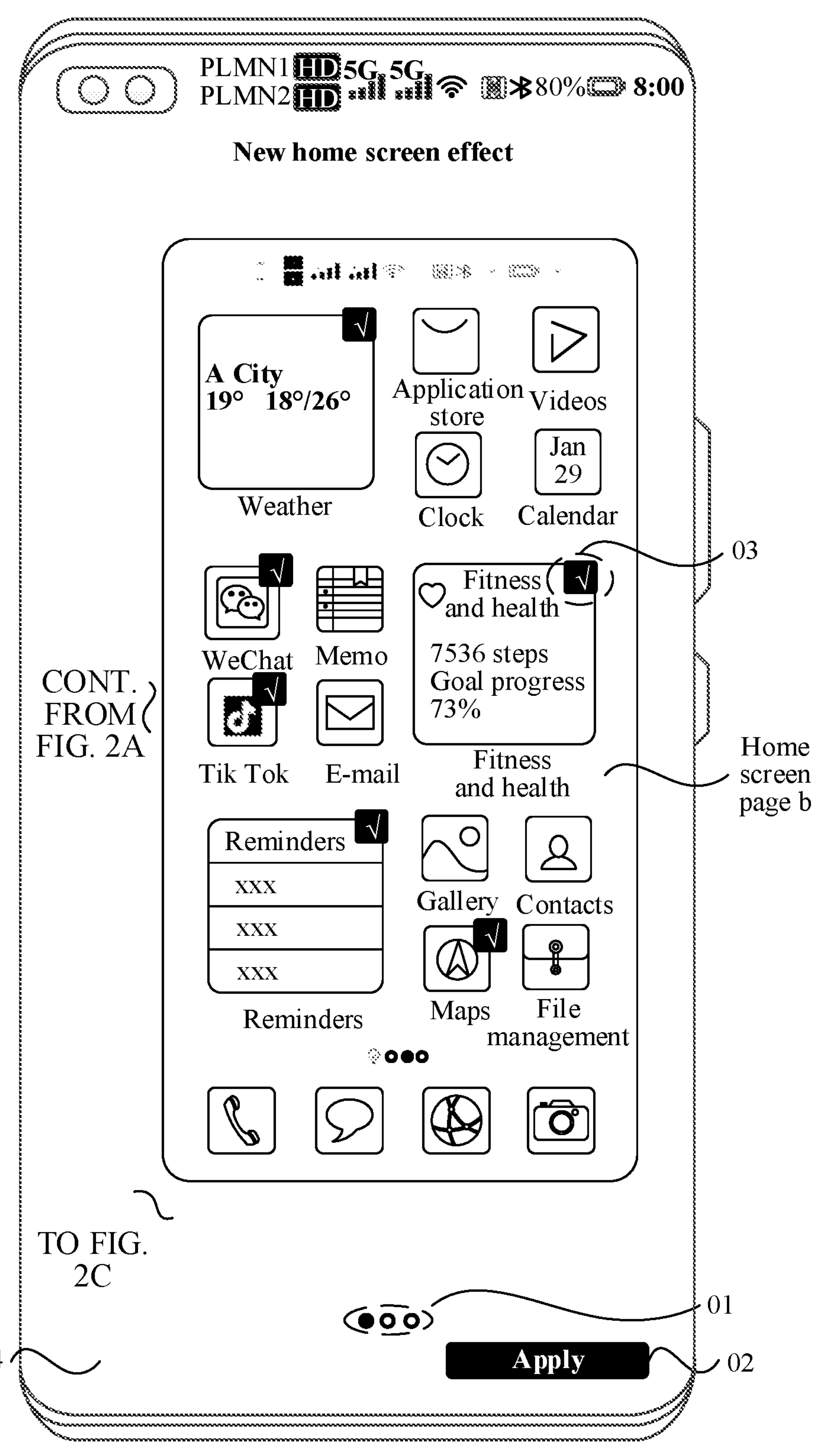
Figure 2C:
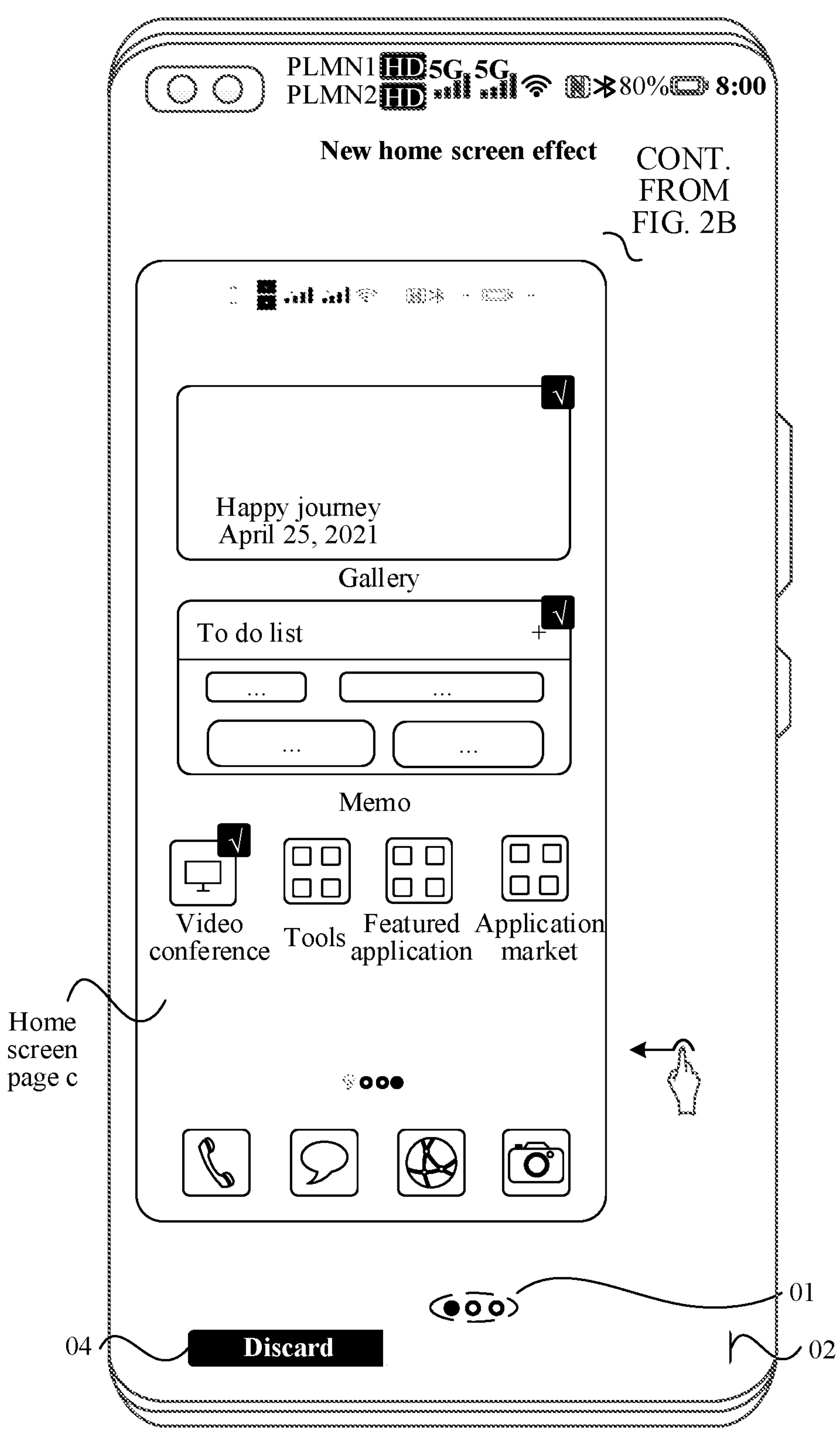

FIG. 2A to FIG. 2C are a schematic interface diagram of a recommended home screen layout according to an embodiment of this application. When detecting that an operation of a user on a mobile phone is a preset operation, the mobile phone can display a first interface as shown in FIG. 2A to FIG. 2C for the user. In Scenario 1, the preset operation includes: determining that an operation of an OOBE is completed. In Scenario 2, the preset operation includes an operation of determining that data migration is completed.

As shown in FIG. 2A to FIG. 2C, a preview of a preset home screen layout recommended for the user is displayed in the first interface, the home screen of the mobile phone may include one or more home screen pages, the preview of the preset home screen layout shown in the first interface includes previews of three home screen pages (a home screen page a, a home screen page b, and a home screen page c), and the preview of each home screen page includes an application icon and an application card laid out on each home screen page. The application icon laid out on each home screen page can be stored in a folder.

It should be noted that, a home screen launcher in the mobile phone can maintain a plurality of preset home screen layouts. FIG. 2A to FIG. 2C show a preview of one of the preset home screen layouts. A control 01 is shown in FIG. 2A to FIG. 2C, and the control 01 is used to indicate a quantity of preset home screen layouts. It can be known from the control 01 that the home screen launcher in the mobile phone provides three preset home screen layouts for the user to choose, and the user can slide a screen to view the other two preset home screen layouts.

A control 02 is also shown in FIG. 2A to FIG. 2C, and the control 02 is used to determine to apply the preset home screen layout. In response to an operation of tapping the control 02 by the user, the mobile phone applies the currently recommended preset home screen layout to a home screen. FIG. 2A to FIG. 2C are used as an example. After the mobile phone applies the currently recommended preset home screen layout to the home screen, the mobile phone enters a home screen, and displays the home screen page a. The user can slide the screen to the left to enable the mobile phone to display the home screen page b. Similarly, the user can continue to slide the screen to the left to enable the mobile phone to display the home screen page c.

The home screen page b shown in FIG. 2B is used as an example. It can be seen that application icons and application cards of a plurality of applications are laid out on the home screen page b, and controls 03 are displayed on some application icons, for example, WeChat®, Tik Tok®, and Map®. The control 03 is displayed on an application card, for example, an application card of Weather, an application card of Sports and health, or an application card of Reminders. For ease of description, an application corresponding to an application icon on which the control 03 is displayed is referred to as a target application in embodiments of this application. An application icon and an application card of the target application are in a selectable state. For example, if a "√" is displayed on the control 03, it indicates that the control 03 is in a selected state. If the user does not want to use the target application, the user can cancel selection of the application icon of the target application by tapping the control 03.

It should be noted that, the target application includes a downloaded application and/or a to-be-downloaded application. In a new mobile phone scenario, the mobile phone includes downloaded system basic functional applications and third-party applications. The system basic functional applications, for example, Calendar, Clock, and Camera, cannot be uninstalled. The third-party applications, for example, WeChat® on the home screen page b, can be uninstalled. The control 03 in the selected state is displayed on an application icon of the downloaded third-party application, and the user can tap the control 03 to cancel selection of the application icon of the downloaded third-party application, which means that the user chooses to uninstall the downloaded application.

The to-be-downloaded application may be a popular application of the mobile phone based on big data statistics, for example, Tik Tok® on the home screen page b. The mobile phone can display an application icon of the to-be-downloaded application in the preset home screen layout, and the control 03 in the selected state is displayed on the application icon of the to-be-downloaded application. The user can tap the control 03 to cancel selection of the application icon of the to-be-downloaded application, which means that the user choose to not download the to-be-downloaded application recommended for the user.

It can be seen from FIG. 2A to FIG. 2C that the controls 03 are displayed on all application cards included in the home screen page a, the home screen page b, and the home screen page c, that is, all the application cards can be deleted. The user can tap the control 03 to cancel selection of the application card. In this way, after the preset home screen layout is applied to the home screen, the application card unselected by the user is not displayed on the home screen page.

For Scenario 1, mobile phones may recommend a same preset home screen layout and/or application for different users. That is, for a user A and a user B, the preset home screen layout recommended by a mobile phone of the user A for the user A is the same as the preset home screen layout recommended by a mobile phone of the user B for the user B, and applications recommended for users in the preset home screen layout are also the same, for example, popular applications with high download volume are recommended.

For Scenario 2, default home screen layouts or applications recommended by mobile phones for different users may be different. Because Scenario 2 is a data migration scenario, a new mobile phone of the user can obtain a portrait of the user from an old mobile phone, for example, obtain frequency of using all applications by the user, display an application icon of a high-frequency application at a front position, display a low-frequency application at a back position, and store an ultra-low-frequency application in a folder. Alternatively, on the premise that the high-frequency application supports a card, the high-frequency application is presented to the user in a form of a card. For another example, a category of the high-frequency application used by the user is obtained, and an application whose category is the same as the category of the high-frequency application is recommended for the user. This manner can meet individual requirements of different users, which is beneficial to meet different usage habits of different users. Certainly, in the data migration scenario, the mobile phone can also recommend a general preset home screen layout and application for the user. This is not limited in embodiments of this application.

If the user does not want to use the preset home screen layout recommended by the mobile phone, the user can tap a control 04 in the first interface, and the control 04 is used to refuse to apply the preset home screen layout. In this way, more options can be provided for the user. In response to an operation of tapping the control 04 by the user, the mobile phone enters a traditional home screen. In the traditional home screen, for example, a home screen page includes a plurality of application icons, and the plurality of application icons are arranged in an alphabetical order, or the plurality of application icons are randomly arranged.

Figure 3A:
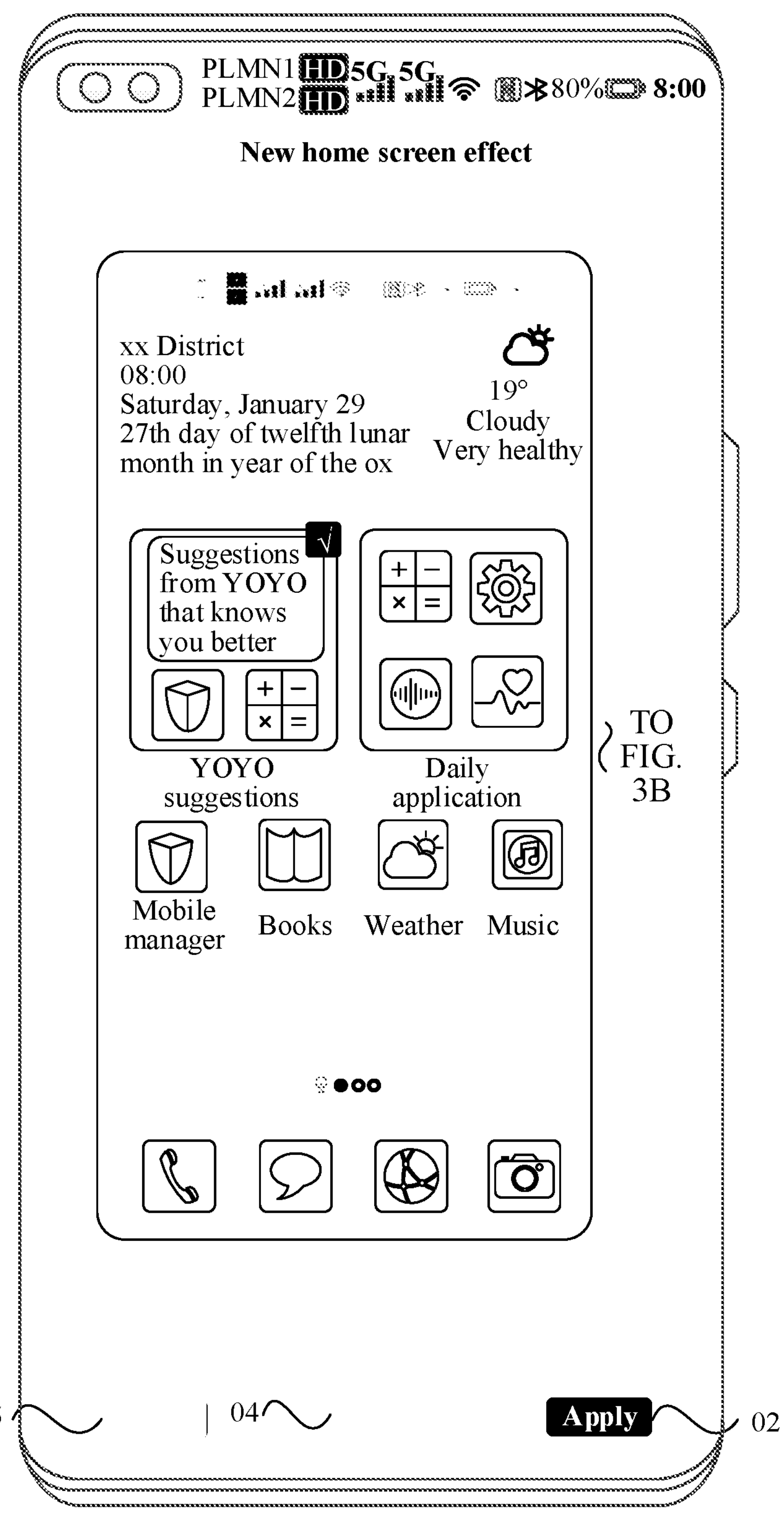
FIG. 3A to FIG. 3C are a schematic interface diagram of another recommended home screen layout according to an embodiment of this application.
Figure 3B:
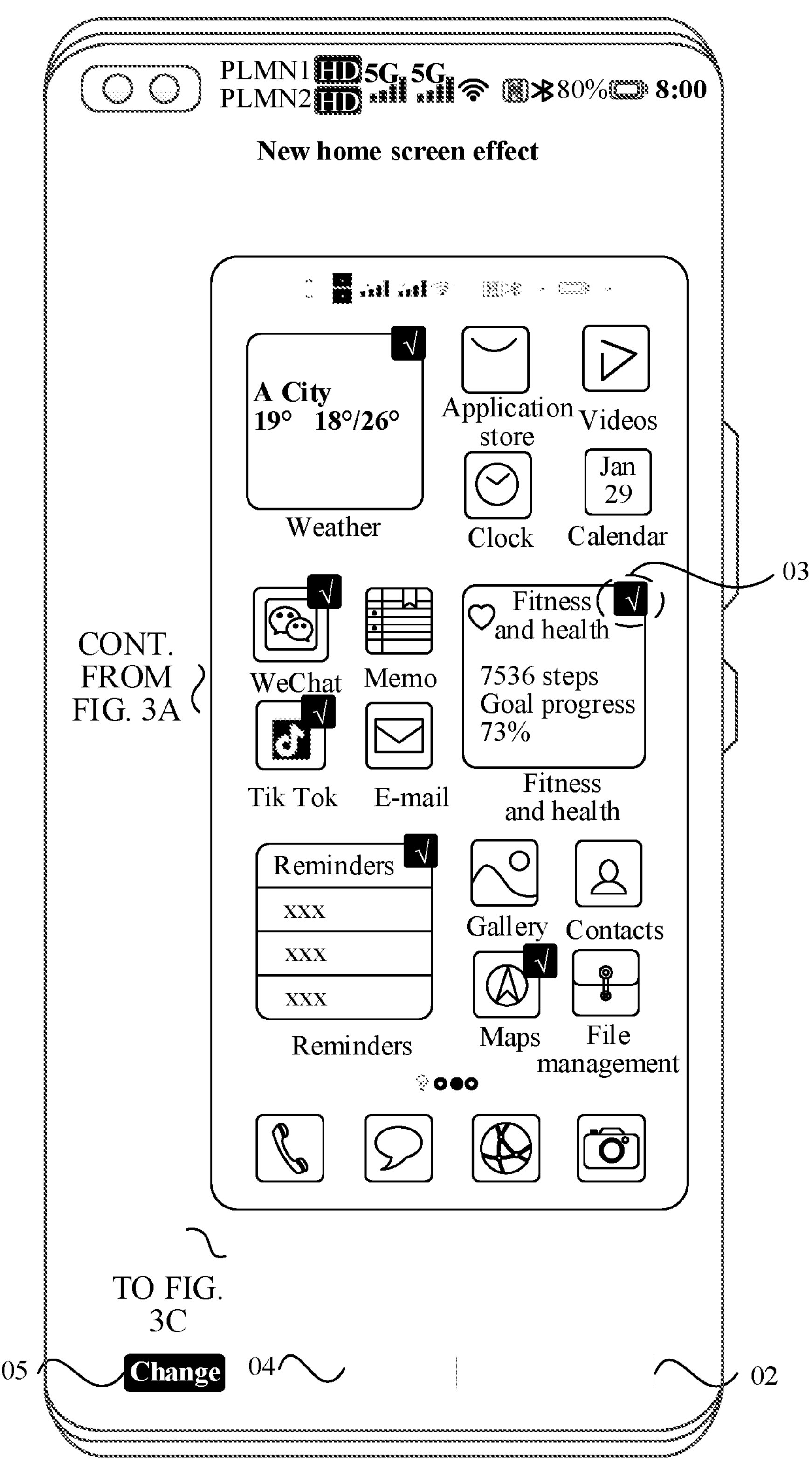
Figure 3C:
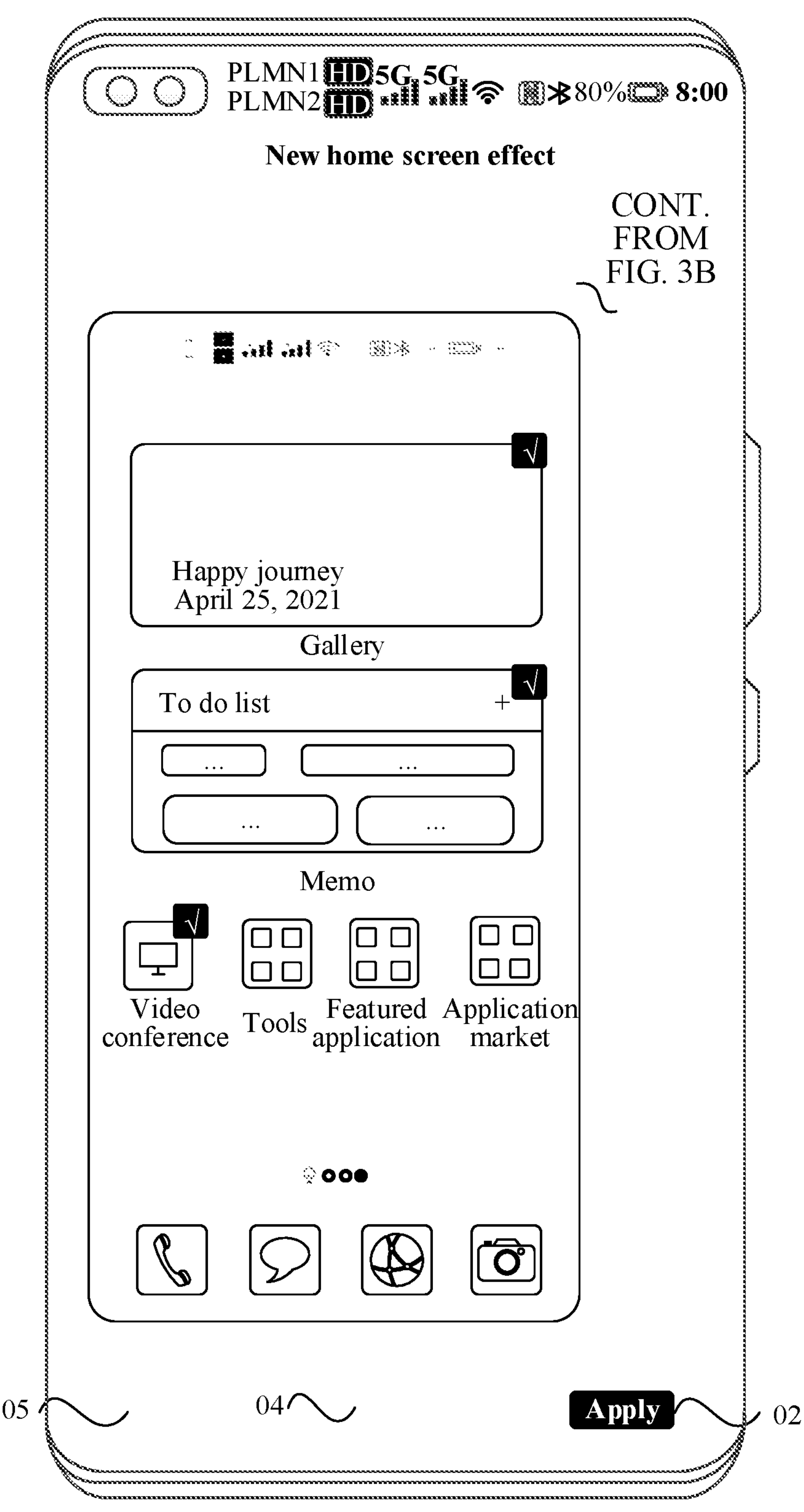

FIG. 3A to FIG. 3C are a schematic interface diagram of another recommended home screen layout according to an embodiment of this application. In a case that the mobile phone detects that a first operation of the user on the mobile phone is a first preset operation, the mobile phone can display a second interface as shown in FIG. 2A to FIG. 2C for the user. Similar to the descriptions in FIG. 2A to FIG. 2C, the mobile phone can provide a plurality of different preset home screen layouts. FIG. 3A to FIG. 3C are different from FIG. 2A to FIG. 2C in that a control 05 is displayed in the second interface in FIG. 3A to FIG. 3C, and the control 05 is used for switching the preset home screen layout. In response to an operation of tapping the control 05 by the user, the mobile phone can switch different preset home screen layouts for the user to view.

Complete previews of a plurality of home screen pages are shown for the user in the first interface shown in FIG. 2A to FIG. 2C and the second interface shown in FIG. 3A to FIG. 3C. In addition, there may be a schematic interface diagram of a recommended home screen layout as shown in FIG. 4.

Figure 4:
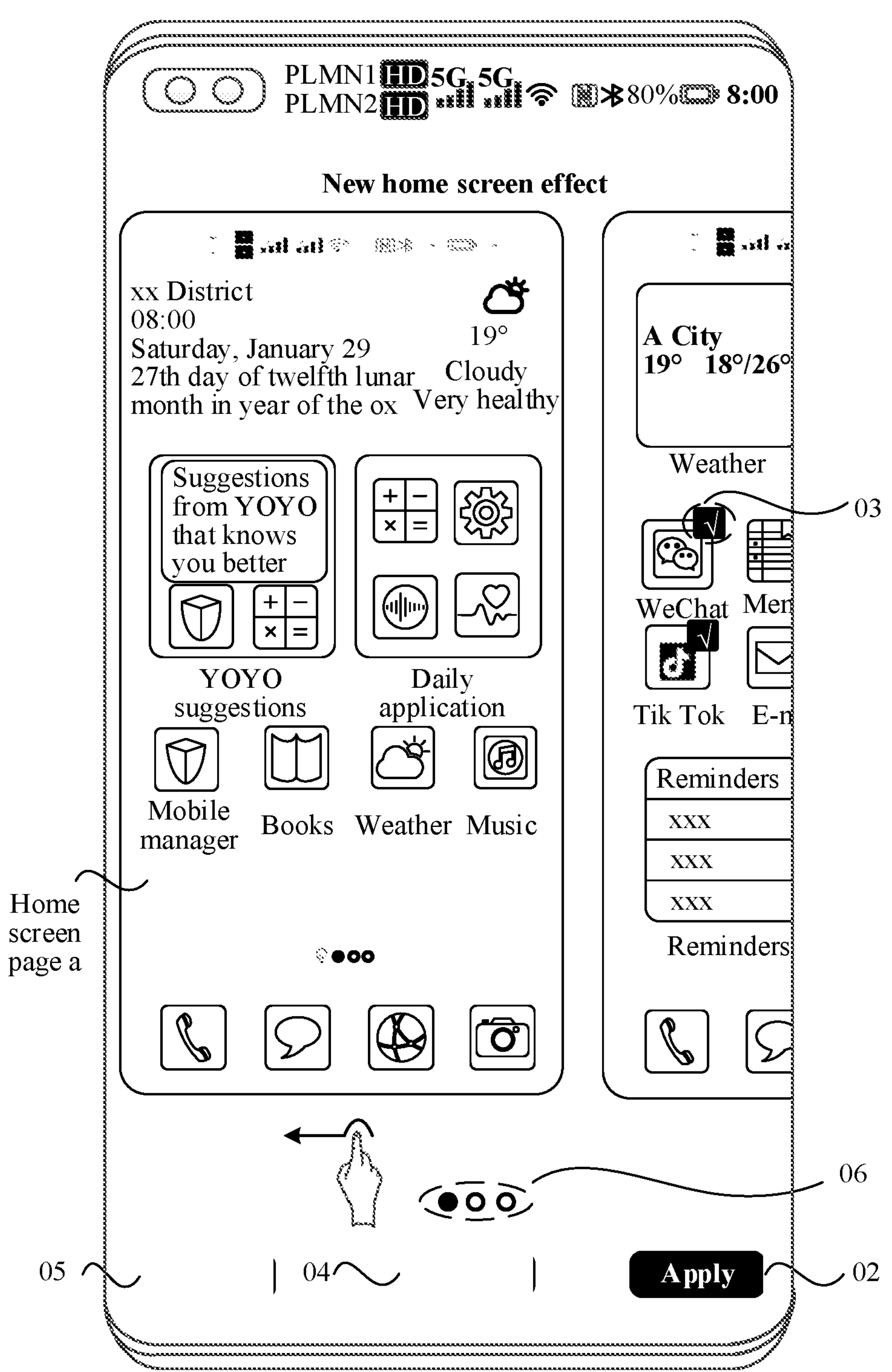
FIG. 4 is a schematic interface diagram of still another recommended home screen layout according to an embodiment of this application.
Figure 5A:
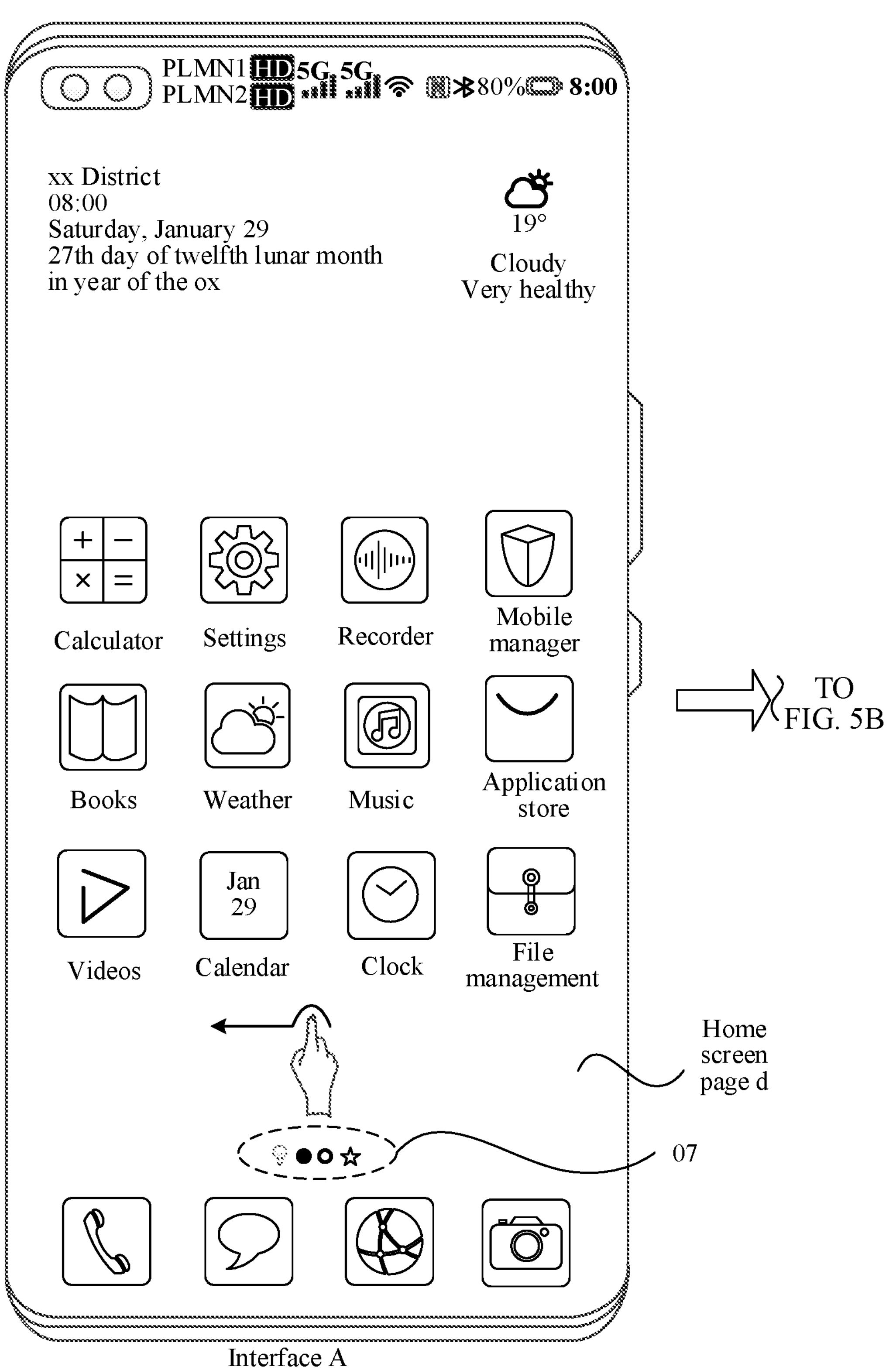
Figure 5B:
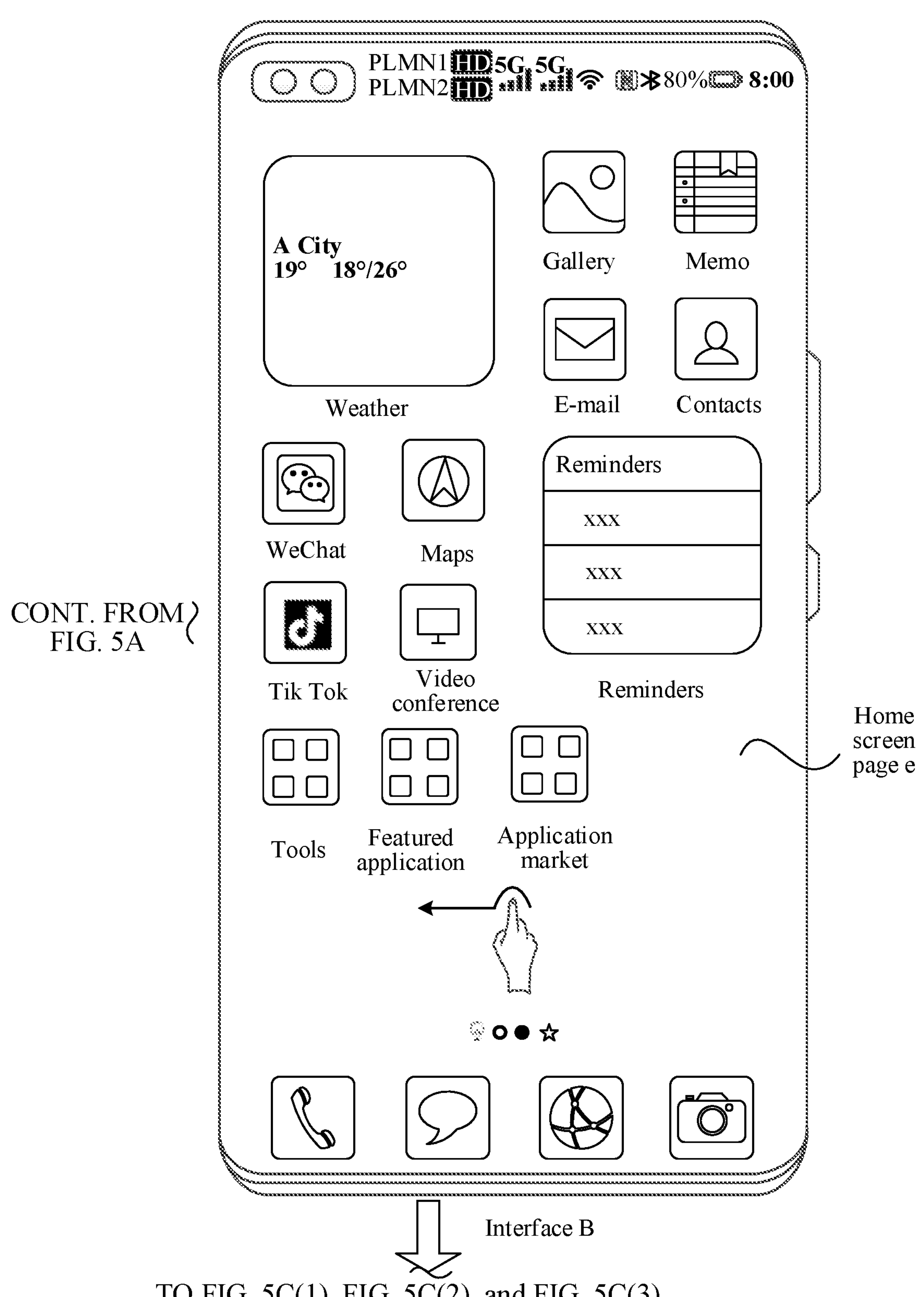

FIG. 4 is a schematic interface diagram of still another recommended home screen layout according to an embodiment of this application. In a case that the mobile phone detects that a first operation of the user on the mobile phone is a first preset operation, the mobile phone can display a third interface as shown in FIG. 4 for the user. Similar to the descriptions for FIG. 2A to FIG. 2C and FIG. 3A to FIG. 3C, the mobile phone may provide a plurality of different preset home screen layouts for the user, but a complete preview of one home screen page in at least one home screen page (namely, the home screen page a) included in one preset home screen layout is shown in the third interface in FIG. 4.

A control 06 is displayed in the third interface, and the control 06 is used for indicating a quantity of home screen pages included in the preset home screen layout recommended for the user. It can be seen from the control 06 that the preset home screen layout recommended for the user includes three home screen pages, and the user can slide the screen to view a preview of another home screen page included in the same preset home screen layout. In response to an operation of sliding the screen by the user, the mobile phone can display a preview of a remaining home screen page for the user.

Similar to the descriptions for FIG. 3A to FIG. 3C, the mobile phone may provide a control 05 for the user to switch the preset home screen layout. FIG. 4 is different from FIG. 3A to FIG. 3C in that a complete preview of a home screen page (where the home screen page a is shown in the figure) is shown in the preview in the third interface for the user, and the user can slide left and right to view the preview of the another undisplayed home screen page.

Interfaces of the recommended preset home screen layout provided in this application are described below for Scenario 3 with reference to FIG. 5A to FIG. 7D(3).

In a possible case, the user desires to change a current home screen layout while using the mobile phone, and the mobile phone can provide, for the user, a preset home screen layout recommended by a portal preview. The current home screen layout of the mobile phone may be the preset home screen layout applied by the user in the new mobile phone scenario, or a traditional home screen layout.

FIG. 5A to FIG. 5D(3) are a schematic interface diagram of yet another recommended home screen layout according to an embodiment of this application. A home screen page d is shown in an interface A in FIG. 5A. The mobile phone displays an interface B in response to an operation of sliding the home screen page d by the user, and a home screen page e is shown in the interface B in FIG. 5B. The mobile phone displays an interface C in response to an operation of sliding the home screen page e by the user. A page f is shown in the interface C in FIG. 5C(1) to FIG. 5C(3), and the page f may be referred to as a recommended page. A preview of a preset home screen layout recommended for the user is displayed in the recommended page, and the preview includes previews of three home screen pages. If the user wants to apply the recommended preset home screen layout, the user can tap the control 02 to apply the new layout. The mobile phone displays an interface D in response to an operation of tapping the control 02 by the user. A pop-up message is shown in the D interface in FIG. 5D(1) to FIG. 5D(3), and the pop-up message is used for asking the user whether the user determines to apply, to the home screen, a preset home screen layout currently recommended. The pop-up message includes an “Apply” option and a “Cancel” option. In response to an operation of selecting the “Apply” option by the user, the mobile phone applies, to the home screen, the preset home screen layout currently displayed. Accordingly, in response to an operation of selecting the “Cancel” option by the user, the mobile phone canceling application of the preset home screen layout currently displayed to the home screen.

It should be understood that the interface D in FIG. 5D(1) to FIG. 5D(3) is optional. The mobile phone can apply, to the home screen, the preset home screen layout currently displayed after the user taps the control 02, without requiring user confirmation.

As shown in FIG. 5A to FIG. 5D(3), controls 07 are displayed on the home screen page d, the home screen page e, and the page f. The control 07 includes a plurality of navigation identifiers, and a touch operation of the user may be displayed on the navigation identifier. After the user turns on a touch operation display switch, navigation identifier following effect may appear when the user touches the screen.

For example, a quantity of navigation identifiers presented as circular icons in the control 07 is used to indicate a quantity of home screen pages, and a case in which two home screen pages, namely, the home screen page d and the home screen page e, are included is shown in FIG. 5A to FIG. 5D(3), so that two navigation identifiers presented as circular icons are included in the control 07. A navigation identifier presented as a small bulb icon in the control 07 is used to indicate existence of the leftmost home screen. A navigation identifier presented as a pentagonal icon in the control 07 is used to indicate existence of the recommended page, namely, the page f. The recommended page is displayed as the preview of the preset home screen layout recommended for the user.

It can be seen from FIG. 5A to FIG. 5D(3) that, when the mobile phone displays the home screen page d, the 1st navigation identifier presented as a circular icon in the home screen page d is selected. When the mobile phone receives a sliding operation of the user and displays the home screen page e, the 2nd navigation identifier presented as a circular icon in the home screen page e is selected. When the mobile phone receives a sliding operation of the user and displays the page f, the navigation identifier presented as a pentagonal icon in the page f is selected.

It should be understood that an icon style used to indicate existence of the recommended page is only an example. This is not limited in embodiments of this application.

It should also be understood that a case of displaying of the control 07 in the page f is shown in the interface C in FIG. 5C(1) to FIG. 5C(3). In addition, the control 07 may not be displayed on the page f, and the control 07 is displayed on only each of the home screen page d and the home screen page e. This is not limited in embodiments of this application.

In the descriptions for FIG. 5A to FIG. 5D(3), the mobile phone indicates existence of the recommended page to the user by using the navigation identifier presented as the pentagonal icon in the control 07. In another possible case, the control 07 may not include a navigation identifier indicating existence of the recommended page, but only include a navigation identifier indicating the leftmost home screen and a navigation identifier indicating a home screen page. Whether the navigation identifier indicating the recommended page is included in the control 07 is not limited in embodiments of this application.

The control 05 is displayed in the interface C in FIG. 5C(1) to FIG. 5C(3). Similar to the above descriptions, the user can tap the control 05 to switch different default home screen layouts.

A possible recommended page is shown in the interface C in FIG. 5C(1) to FIG. 5C(3). In addition, in response to the operation of sliding the home screen page e by the user, the mobile phone may display an interface similar to the interface shown in FIG. 2A to FIG. 2C or similar to the interface shown in FIG. 4. When the interface similar to the interface shown in FIG. 2A to FIG. 2C is displayed, the user can slide the screen to switch different preset home screen layouts. When the interface similar to the interface shown in FIG. 4 is displayed, the user can tap the control 05 to switch different preset home screen layouts.

In Scenario 3, because the user uses the mobile phone for a period of time, the mobile phone can obtain the personal portrait of the user. Similar to the data migration scenario described above, content of an application icon and/or an application card in the preset home screen layout is determined based on a habit of using an application by the user, and/or, a position of an application icon and/or an application card in the preset home screen layout is determined based on a habit of using an application by the user.

For example, the user has a habit of viewing the weather every day. Therefore, the mobile phone can present a weather application in a form of a card, and lays out the weather application at a position, in the home screen page, convenient for the user to operate. For another example, the mobile phone can present reminder items of the user in a form of cards, which is convenient for the user to view content recorded in the reminder items. For another example, the user usually opens a video application to watch a video. Therefore, the mobile phone may lay out the video application at a position, in the home screen page, convenient for the user to operate. Recommending preset home screen layouts that meet personalized requirements of different users is beneficial for improving efficiency of human-computer interaction, thereby improving user experience.

It should be noted that, FIG. 5A to FIG. 5D(3) show a case in which the user slides left on the screen until the mobile phone displays the last home screen page (namely, the home screen page e), and then slides left to enable the mobile phone to display the recommended page (namely, the page f). In addition, the user can also slide right on the screen until the mobile phone displays the 1st home screen page (namely, the home screen page d), and then slide right to enable the mobile phone to display the recommended page (namely, the page f).

It should be noted that, FIG. 2A to FIG. 2C show a case in which the mobile phone displays the home screen page e in response to the sliding operation of the user on the home screen page d, and then displays the page f in response to the sliding operation of the user on the home screen page e. In this case, the home screen of the mobile phone includes a plurality of home screen pages. In addition, there may be a case in which the home screen of the mobile phone includes one home screen page, for example, includes the home screen page d, and does not include the home screen page e. In this case, the mobile phone displays the page fin response to the sliding operation of the user on the home screen page d.

FIG. 6A to FIG. 6D(3) are a schematic interface diagram of yet another recommended home screen layout according to an embodiment of this application. As shown in an interface A in FIG. 6A, the user can enter a home screen editing mode as shown in an interface B by pinching two fingers on a home screen page. A page shown in the interface B may be referred to as a home screen editing page. In addition, the user can press and hold blank space of the home screen for a long time to enter the home screen editing mode as shown in the B interface. A control 08 is displayed in the interface B in FIG. 6B, and the control 08 is used to provide an entrance for previewing a preset home screen layout. The mobile phone displays an interface C in response to an operation of tapping the control 08 by the user. Similar to the interface C in FIG. 5C(1) to FIG. 5C(3), a preview of a preset home screen layout recommended for the user is displayed in the interface C in FIG. 6C(1) to FIG. 6C(3), and the preview includes previews of three home screen pages. The interface D in FIG. 6D(1) to FIG. 6D(3) is similar to the interface D in FIG. 5D(1) to FIG. 5D(3). Details are not described herein again.

Similar to the foregoing descriptions, the user can tap the control 05 to switch different preset home screen layouts, or slide the screen to switch different preset home screen layouts. Details are not described herein again.

FIG. 7A to FIG. 7D(3) are a schematic interface diagram of canceling a home screen layout according to an embodiment of this application. As shown in an interface A in FIG. 7A, the user has applied a preset home screen layout. If the user expects to use a traditional home screen layout or replace a recommended preset home screen layout, the user can pinch two fingers on the home screen, and the mobile phone displays an interface B in response to the operation of pinching two fingers. A control 08 is displayed in the interface B in FIG. 7B, and the control 08 is used to provide an entrance for previewing a preset home screen layout. The mobile phone displays an interface C in response to an operation of tapping the control 08 by the user. It can be seen that a control 05 and a control 09 are displayed in the interface C in FIG. 7C(1) to FIG. 7C(3). The control 05 is used to switch different preset home screen layouts and the control 09 is used to cancel the preset home screen layout currently applied to the home screen. The mobile phone displays an interface D in response to an operation of tapping the control 09 by the user. A pop-up message is shown in the interface D in FIG. 7D(1) to FIG. 7D(3), and the pop-up message is used to ask the user whether to determine to cancel the preset home screen layout that is applied to the home screen. The pop-up message includes a "Reserve" option and a "Cancel" option. The mobile phone continues to maintain applied home screen layout effect in response to an operation of selecting the "Reserve" option by the user, and the mobile phone applies the traditional home screen layout to the home screen in response to an operation of selecting the "Cancel" option by the user.

Figure 7A:
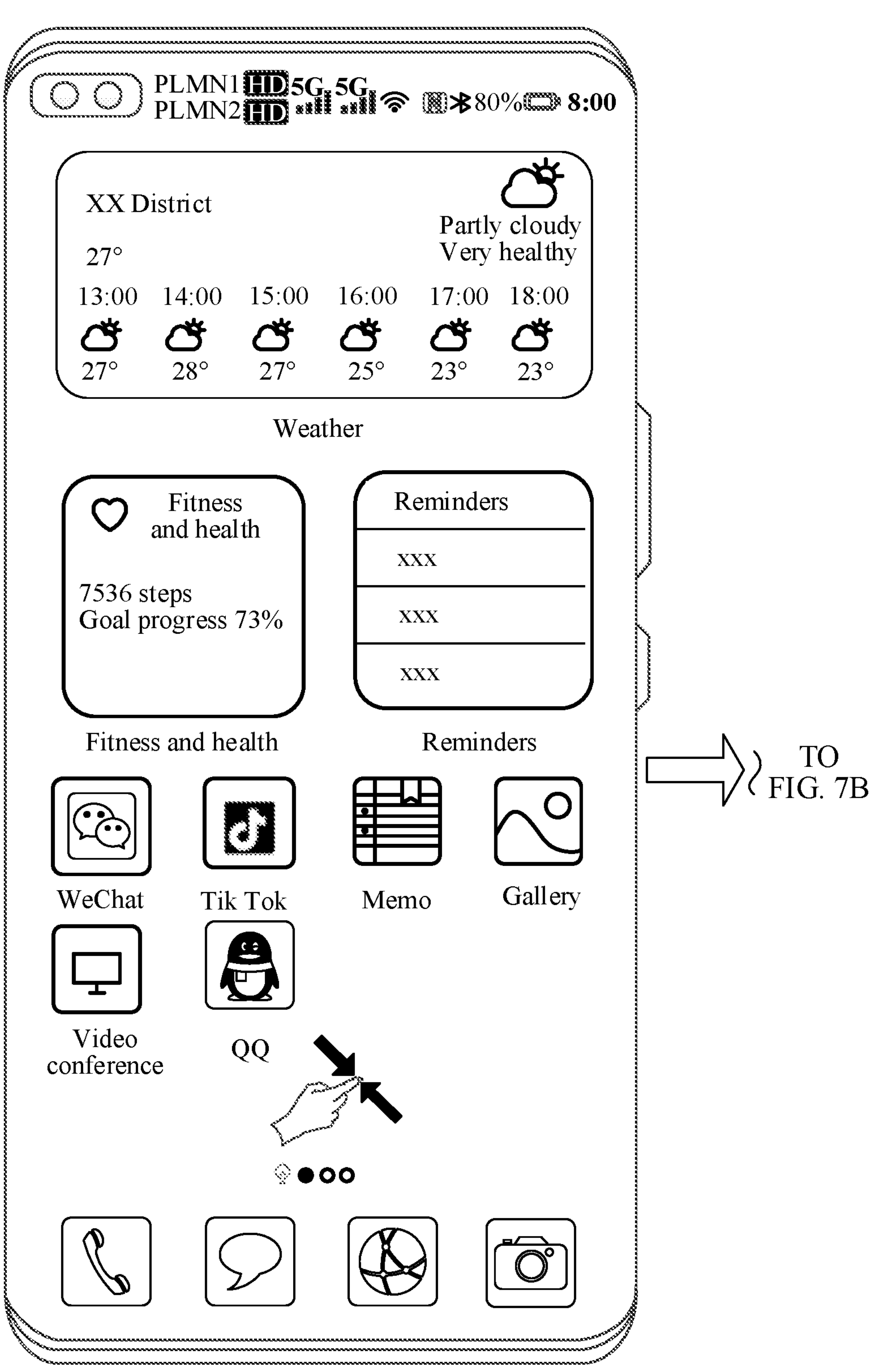
Figure 7B:
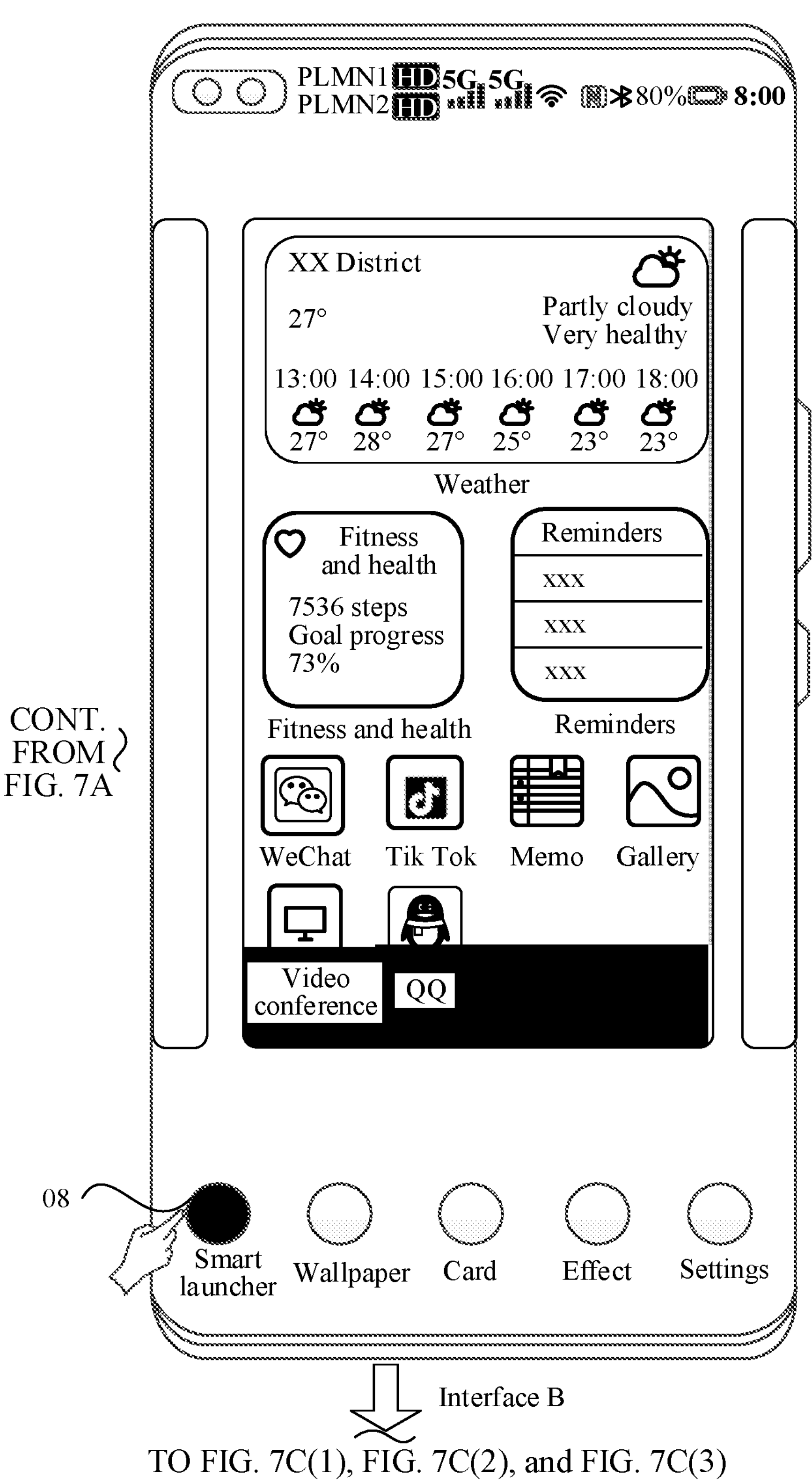

It should be understood that, before displaying the interface B in FIG. 7B, the mobile phone may first determine whether the traditional home screen layout or the preset home screen layout is applied to the home screen. When determining that the preset home screen layout is applied to the home screen, the mobile phone may provide the control 09 for the user, to make the user cancel the preset home screen layout that is applied to the home screen.

In a possible Scenario 4, the user may download a plurality of applications in a process of using the mobile phone, and an arrangement of the applications is chaotic. It takes a lot of time to sort out the plurality of applications on the home screen by the user, and it is inconvenient for the user to operate. In this case, the user may expect to create a new home screen page and lay out a high-frequency application in the newly created home screen page.

Based on this, FIG. 8A to FIG. 8D are a schematic interface diagram of yet another recommended home screen layout according to an embodiment of this application. The mobile phone enters a home screen editing mode (as shown in the interface B in FIG. 6B or FIG. 7B) in response to an operation of pinching two fingers or pressing and holding the home screen by the user. After entering the home screen editing mode, after the user slides the screen rightward to the 1$^{st}$ home screen page, and then continues to slide rightward, the mobile phone displays a home screen editing page as shown in an interface A in FIG. 8A. It can be seen that the home screen editing page shown in the interface A in FIG. 8A includes a control 10, and the control 10 is used to create a new home screen page. The mobile phone displays an interface B in FIG. 8B in response to an operation of the user on the control 10. It can be seen that a preview of a preset template of a home screen layout recommended for the user is shown in the interface B in FIG. 8B, and the preview includes a plurality of preset positions of application icons and/or application cards on the home screen page. The plurality of preset positions include a preset position for adding an application icon and a preset position for adding an application card.

Figure 8A:
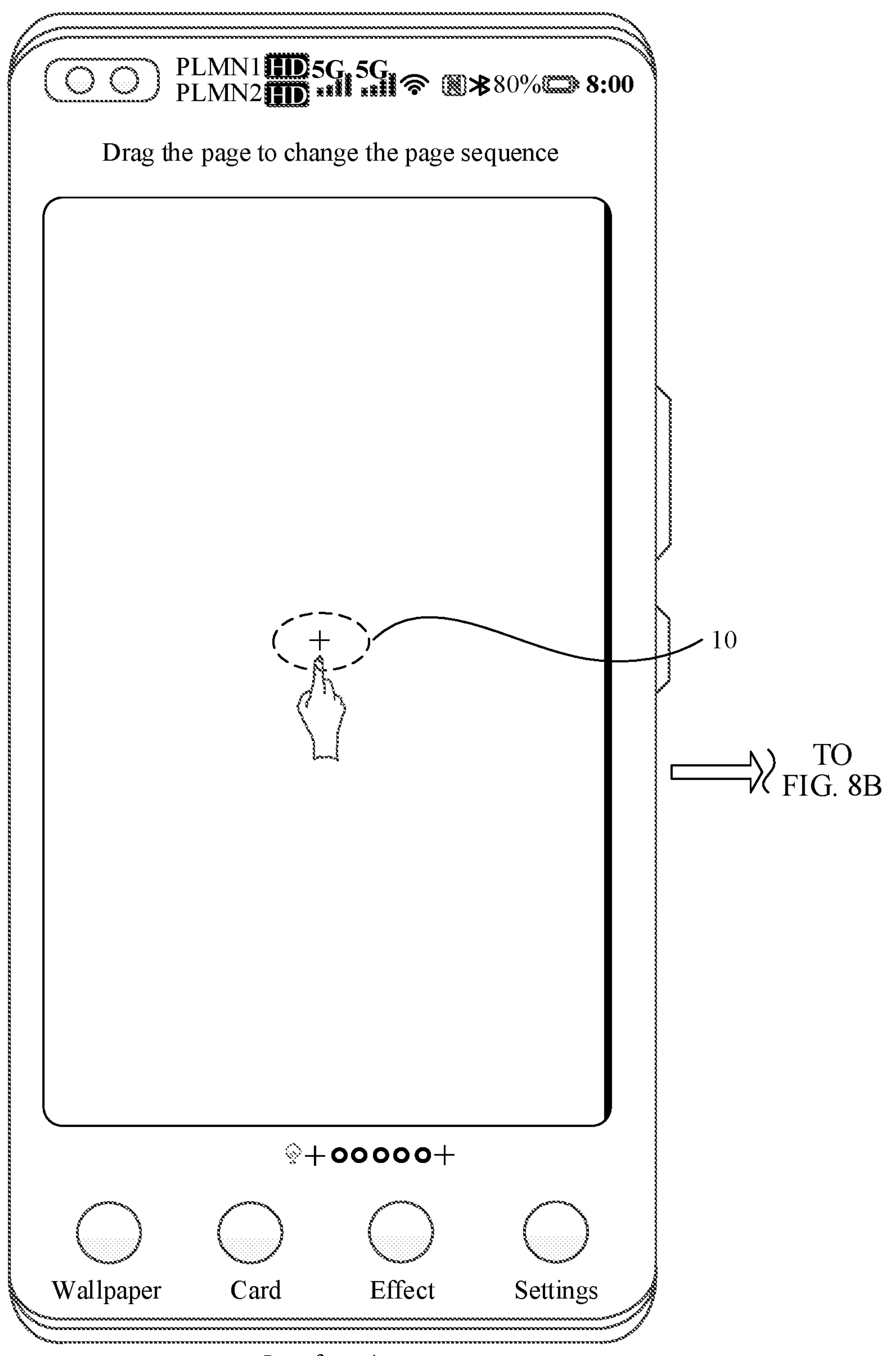
FIG. 8A to FIG. 8D are a schematic interface diagram of yet another recommended home screen layout according to an embodiment of this application.
Figure 8B:
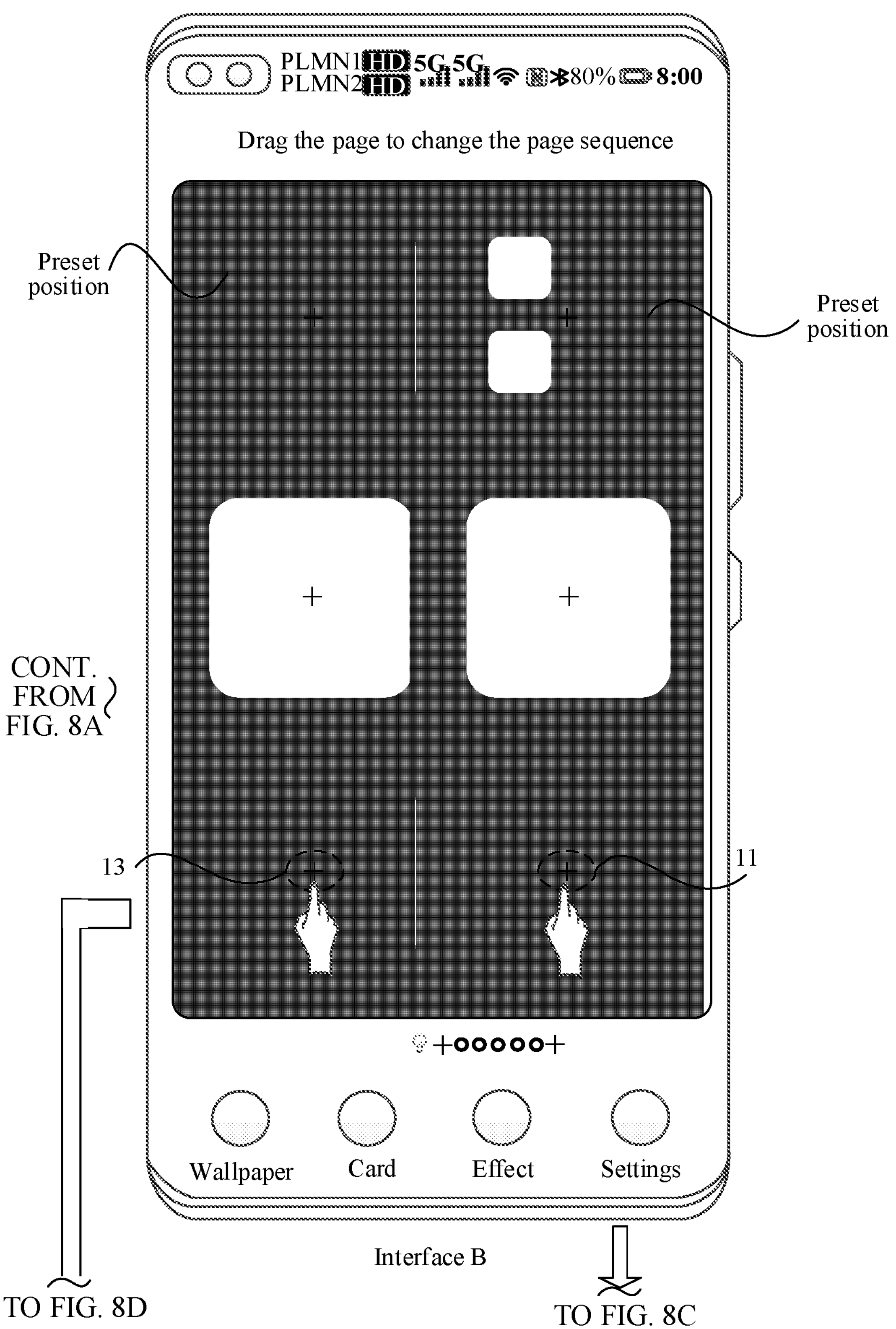
Figure 8C:
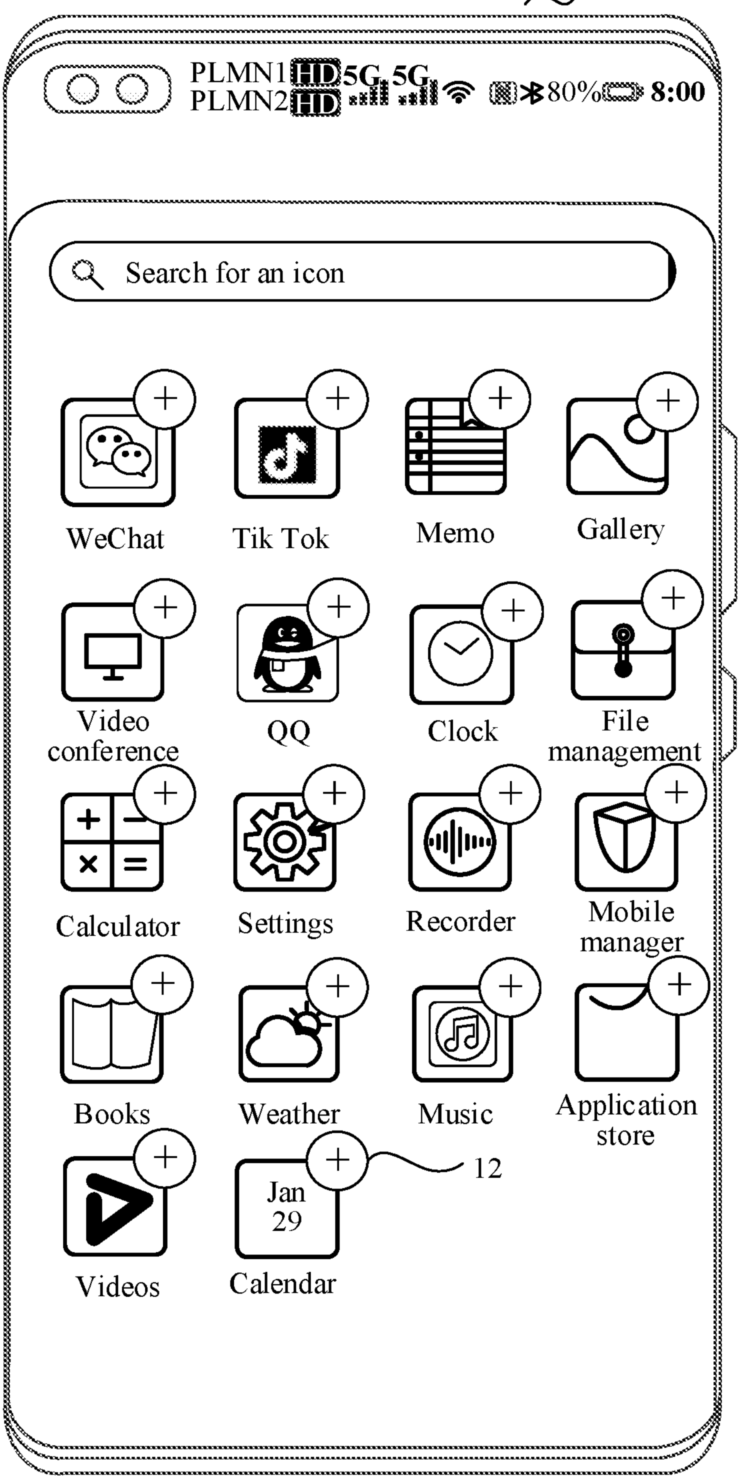

As shown in the interface B in FIG. 8B, a control 11 is displayed at the preset position for adding the application icon, and the mobile phone displays an interface C in FIG. 8C in response to an operation of tapping the control 11 by the user. It can be seen that to-be-added application icons are shown in the interface C in FIG. 8C, and a control 12 is displayed on the to-be-added application icon. In response to an operation of tapping the control 12 by the user, the mobile phone adds, to the corresponding preset position, an application icon selected by the user.

It should be noted that the to-be-added application icon shown in the interface C in FIG. 8C includes an application icon of an installed application. Optionally, the to-be-added application icons displayed in the interface C in FIG. 8C may be displayed in descending order of use frequency of the applications; or may be displayed in an alphabetical order of the applications; or may be displayed based on categories of the applications.

When the user adds an application icon of an application on the newly created home screen page, if the application icon of the application has been displayed on the existing home screen page, the mobile phone may clean the application icon of the application on the existing home screen page, and display the application icon of the application on the newly created home screen page. Alternatively, the mobile phone can simultaneously reserve the application icon of the application on the existing home screen page and the application icon of the application on the newly created home screen page.

Figure 8D:
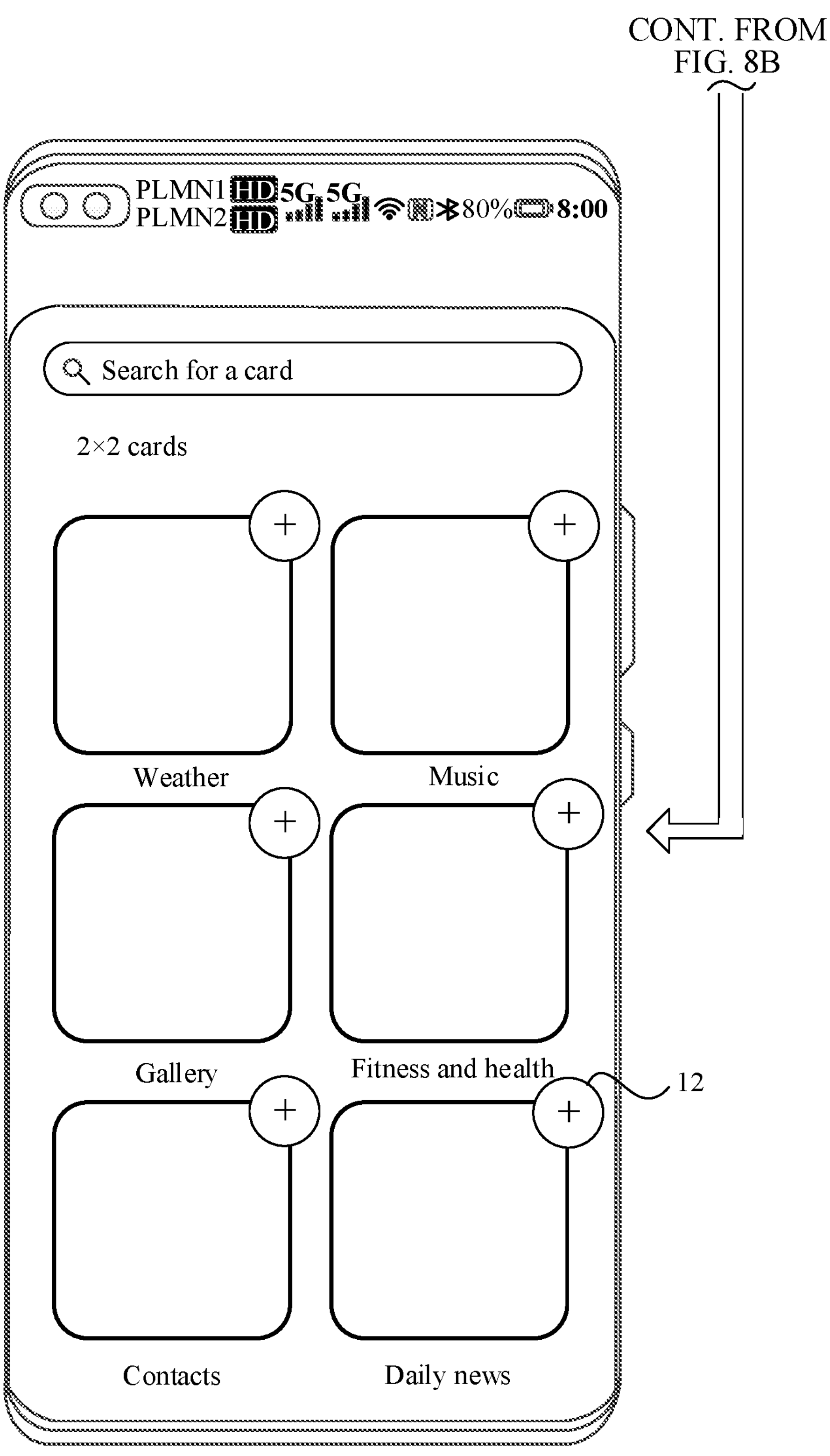

As shown in the interface B in FIG. 8B, a control 13 is displayed at the preset position for adding the application card, and the mobile phone displays an interface D in FIG. 8D in response to an operation of tapping the control 13 by the user. It can be seen that to-be-added application cards are shown in the interface D in FIG. 8D, and a control 12 is displayed on the to-be-added application icon. In response to an operation of tapping the control 12 by the user, the mobile phone adds, to the corresponding preset position, an application card selected by the user.

It should be noted that the to-be-added application card shown in the interface D in FIG. 8D includes an application card of an application that supports a card design. Optionally, the application cards displayed in the interface D in FIG. 8D may be displayed in descending order of use frequency of the applications; or may be displayed in an alphabetical order of the applications; or may be displayed based on categories of the applications.

When the user adds an application card of an application on the newly created home screen page, if the application card of the application has been displayed on the existing home screen page, the mobile phone may clean the application card of the application on the existing home screen page, and display the application card of the application on the newly created home screen page. Alternatively, the mobile phone can simultaneously reserve the application card of the application on the existing home screen page and the application card of the application on the newly created home screen page.

It should be understood that the mobile phone may provide preset templates of a plurality of home screen layouts for the user, and a preset template of one home screen layout is shown in the interface B in FIG. 8B. Similar to the foregoing descriptions, the mobile phone may also provide a control (not shown in FIG. 8A to FIG. 8D) similar to the control 05 for the user, and the user can tap the control to switch a preset template of the home screen layout. Alternatively, the user can slide the screen leftward and rightward to view the preset templates of the plurality of home screen layouts. This is not limited in embodiments of this application.

Figure 9:
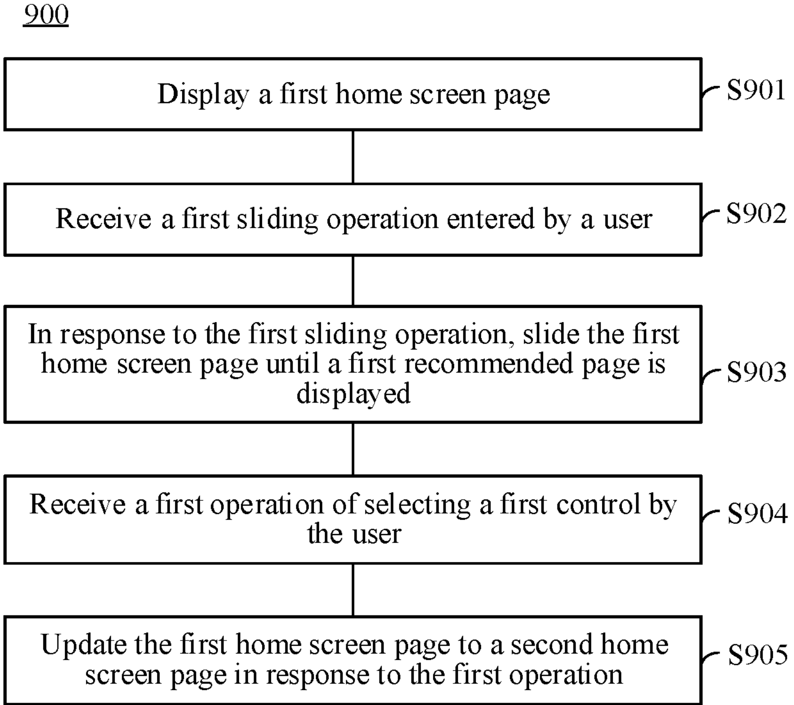
FIG. 9 to FIG. 16 are schematic flowcharts of home screen layout methods according to an embodiment of this application.

In conclusion, FIG. 9 is a schematic flowchart of a home screen layout method 900 according to an embodiment of this application. The method 900 may be applied to Scenario 3 described above. This is not limited in embodiments of this application. Steps of the method 900 may be performed by a terminal device. The method 900 includes S901 to S905, and the specific steps are as follows.

S901: Display a first home screen page, where the first home screen page includes an application icon and/or an application card.

The first home screen page is a home screen page currently displayed by the terminal device during a process of using the terminal device by a user. For details, refer to the home screen page d shown in the interface A in FIG. 5A.

S902: Receive a first sliding operation entered by the user.

In a human-computer interaction process, the terminal device can continuously detect operations of the user on the terminal device. Refer to the interface A in FIG. 5A. The user can perform a sliding operation on the home screen page d, and the terminal device receives the sliding operation of the user on the home screen page d.

S903: In response to the first sliding operation, slide the first home screen page until a first recommended page is displayed.

The first recommended page includes a first control and a preview of a preset home screen layout that is recommended for the user, the preview includes a preview of a second home screen page, and the preview of the second home screen page includes an application icon and/or an application card laid out on the second home screen page.

For the first recommended page, refer to the page f shown in the interface C in FIG. 5C(1) to FIG. 5C(3). For the first control, refer to the control 02 on the page f.

This embodiment of this application uses an example in which the first recommended page includes the second home screen page, that is, the recommended preset home screen layout includes a preview of a home screen page. Corresponding to FIG. 5A to FIG. 5D(3), that is, a preview of a home screen page is shown on the page f in FIG. 5C(1) to FIG. 5D(3).

The preview of the second home screen page may be a preview of a home screen page initially displayed on the first recommended page or a preview of a home screen page displayed after switching from a preview of another home screen page.

S904: Receive a first operation of selecting the first control by the user.

As shown in the interface C in FIG. 5C(1) to FIG. 5C(3), the first operation may correspond to the operation of tapping the control 02 by the user.

S905: Update the first home screen page to the second home screen page in response to the first operation.

The first operation of the user is an operation of applying the recommended preset home screen layout to a home screen. The terminal device updates the first home screen page to the second home screen page in response to the first operation, so that one-tap home screen page replacing can be implemented, and the user does not need to manually arrange the application card and/or the application icon on the home screen. This is beneficial to improving arrangement effect of the home screen, and brings better use experience to the user.

Figure 10:
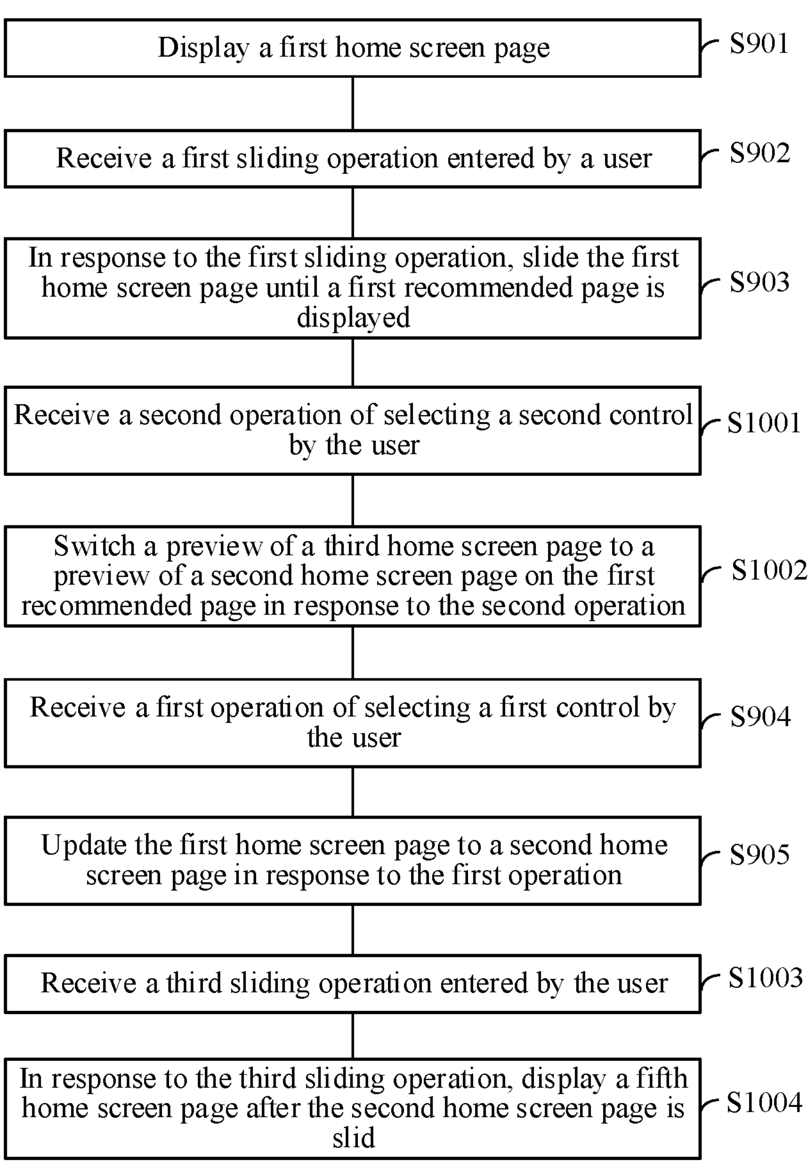

FIG. 10 is a schematic flowchart of another home screen layout method 1000 according to an embodiment of this application. Steps of the method 1000 may be performed by a terminal device and may be applied to Scenario 3 described above. This is not limited in embodiments of this application. The method 1000 includes the steps of the method 900, S1001 to S1004 are newly added, and the specific steps are as follows.

S901: Display a first home screen page, where the first home screen page includes an application icon and/or an application card.

S902: Receive a first operation entered by a user.

S903: In response to the first sliding operation, slide the first home screen page until a first recommended page is displayed.

S1001: Receive a second operation of selecting a second control by the user.

In this step, the first recommended page further includes the second control. For the second control, refer to the control 05 in the interface C in FIG. 5C(1) to FIG. 5C(3). The second operation includes an operation of tapping the control 02 by the user.

S1002: Switch a preview of a third home screen page to a preview of a second home screen page on the first recommended page in response to the second operation, where a layout of the second home screen page is different from a layout of the third home screen page.

The terminal device may switch, based on the second operation of the user, previews of different home screen pages for the user to select. In this embodiment of this application, the preview of the second home screen page is a preview of a home screen page displayed on the first recommended page after switching from the preview of the third home screen page.

S904: Receive a first operation of selecting a first control by the user.

S905: Update the first home screen page to the second home screen page in response to the first operation.

S1003: Receive a third sliding operation entered by the user.

S1004: In response to the third sliding operation, display a fifth home screen page after the second home screen page is slid.

In this step, the first recommended page further includes a preview of the fifth home screen page, and the second home screen page and the fifth home screen page are different home screen pages of a same preset home screen layout.

In this embodiment of this application, the terminal device can provide the second control for the user, and the second control may be used for switching previews of different home screen pages, so that more choices can be provided for the user. This is beneficial to improving use experience. In addition, in this embodiment of this application, the previews of the preset home screen layout shown in the first recommended interface includes previews of a plurality of home screen pages. After the user selects a preset home screen layout recommended by an application, the terminal device applies the second home screen page and the fifth home screen page to a home screen, and the user can slide a screen to view the fifth home screen page displayed after the second home screen page.

Figure 11:
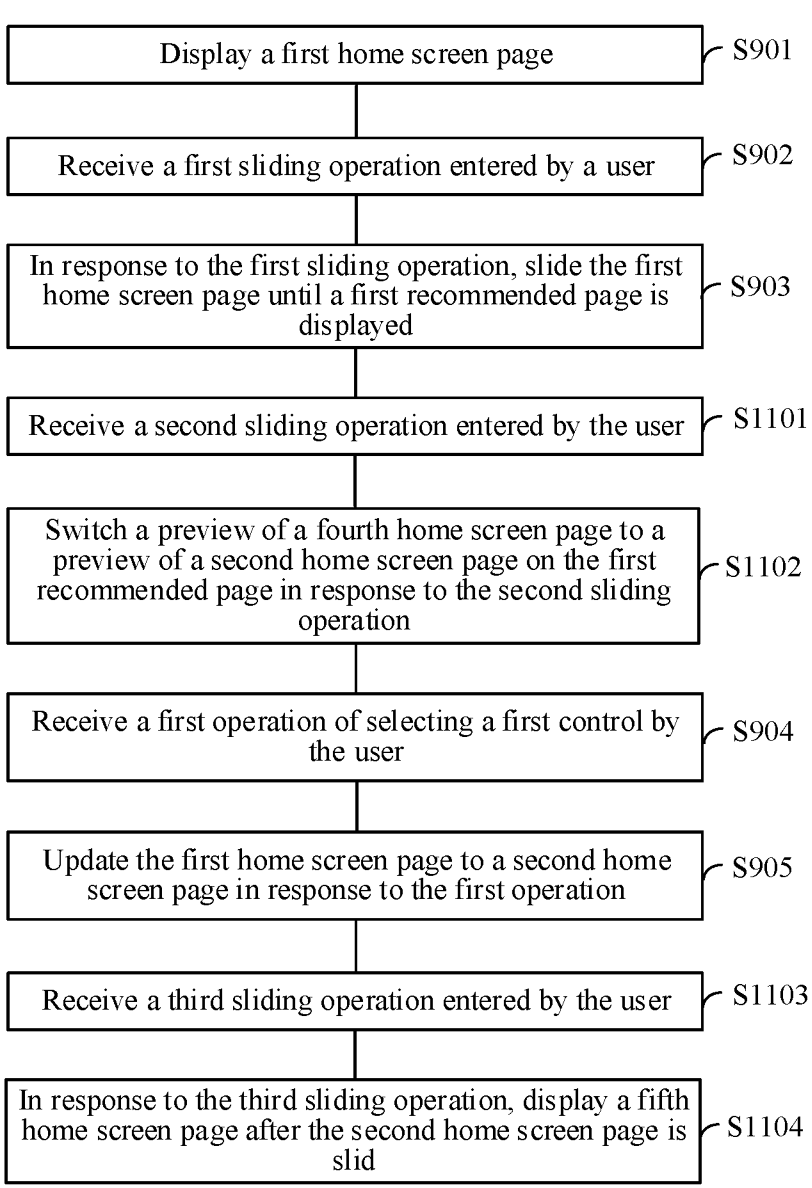

FIG. 11 is a schematic flowchart of still another home screen layout method 1100 according to an embodiment of this application. Steps of the method 1000 may be performed by a terminal device and may be applied to Scenario 3 described above. This is not limited in embodiments of this application. The method 1100 includes the steps of the method 900, S1101 to S1104 are newly added, and the specific steps are as follows.

S901: Display a first home screen page, where the first home screen page includes an application icon and/or an application card.

S902: Receive a first sliding operation entered by the user.

S903: In response to the first sliding operation, slide the first home screen page until a first recommended page is displayed.

S1101: Receive a second sliding operation entered by the user.

In this step, the terminal device may receive, on the first recommended page, the second sliding operation entered by the user.

S1102: Switch a preview of a fourth home screen page to a preview of a second home screen page on the first recommended page in response to the second sliding operation, where a layout of the fourth home screen page is different from a layout of the second home screen page.

The terminal device may switch, based on the second sliding operation of the user, previews of different home screen pages for the user to select. In this embodiment of this application, the preview of the second home screen page is a preview of a home screen page displayed on the first recommended page after switching from the preview of the fourth home screen page.

S904: Receive an operation of selecting a first control by the user.

S905: Update the first home screen page to the second home screen page in response to the first operation.

S1103: Receive a third sliding operation entered by the user.

S1104: In response to the third sliding operation, display a fifth home screen page after the second home screen page is slid.

The method 1000 and the method 1100 differ in a manner in which a preview of a home screen page is switched on the first recommended page. In the method 1000, switching is implemented by selecting the second control by the user (as shown in S1001 and S1002 in the method 1000), and in the method 1100, switching is implemented by sliding the screen by the user (as shown as in S1101 and S1102 in the method 1100).

Figure 12:
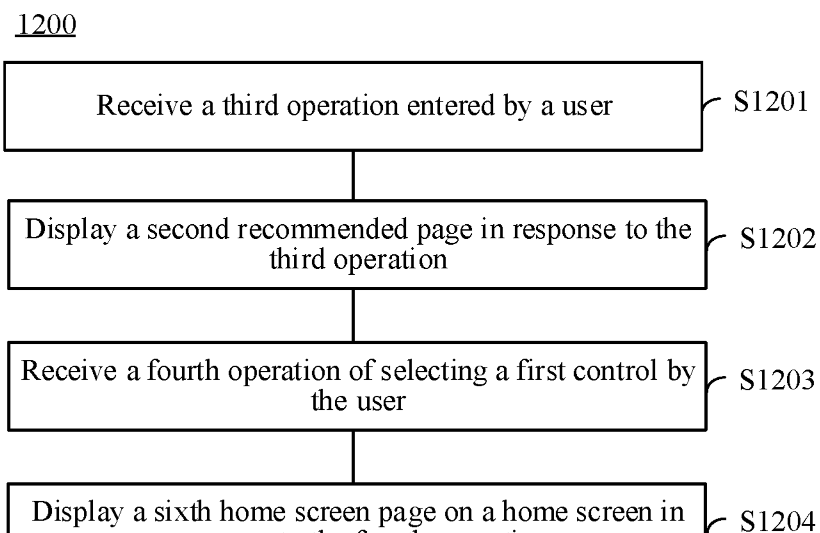

FIG. 12 is a schematic flowchart of yet another home screen layout method 1200 according to an embodiment of this application. Steps of the method 1200 may be performed by a terminal device and may be applied to Scenario 1 or Scenario 2 described above. This is not limited in embodiments of this application. The method 1200 includes S1201 to S1204, and the specific steps are as follows.

S1201: Receive a third operation entered by a user, where the third operation includes an operation of determining completion of OOBE or an operation of determining completion of data migration.

S1202: Display a second recommended page in response to the third operation, where the second recommended page includes a first control and a preview of a preset home screen layout that is recommended for the user, the preview includes a preview of a sixth home screen page, and the preview of the sixth home screen page includes an application icon and/or an application card laid out on the sixth home screen page. The application icon laid out on the sixth home screen page includes an application icon of a target application, a third control is displayed on each of the application icon of the target application and the application card, and the third control is in a selected state.

In this step, for the second recommended page, refer to the interface shown in FIG. 2A to FIG. 2C, FIG. 3A to FIG. 3C, or FIG. 4. For the first control, refer to the control 02 shown in FIG. 2A to FIG. 2C, FIG. 3A to FIG. 3C, or FIG. 4.

S1203: Receive a fourth operation of selecting the first control by the user.

S1204: Display the sixth home screen page on a home screen in response to the fourth operation.

In Scenario 1 or Scenario 2 described above, the terminal device may display the second recommended page for the user, the second recommended page includes the preview of the preset home screen layout recommended for the user, the user can preview a layout of a home screen page, and the recommended preset home screen layout is applied on the home screen in a one-tap application manner. In this way, time for the user to manually arrange the application card and/or the application icon on the home screen can be saved, and arrangement efficiency of the home screen can be improved.

Figure 13:
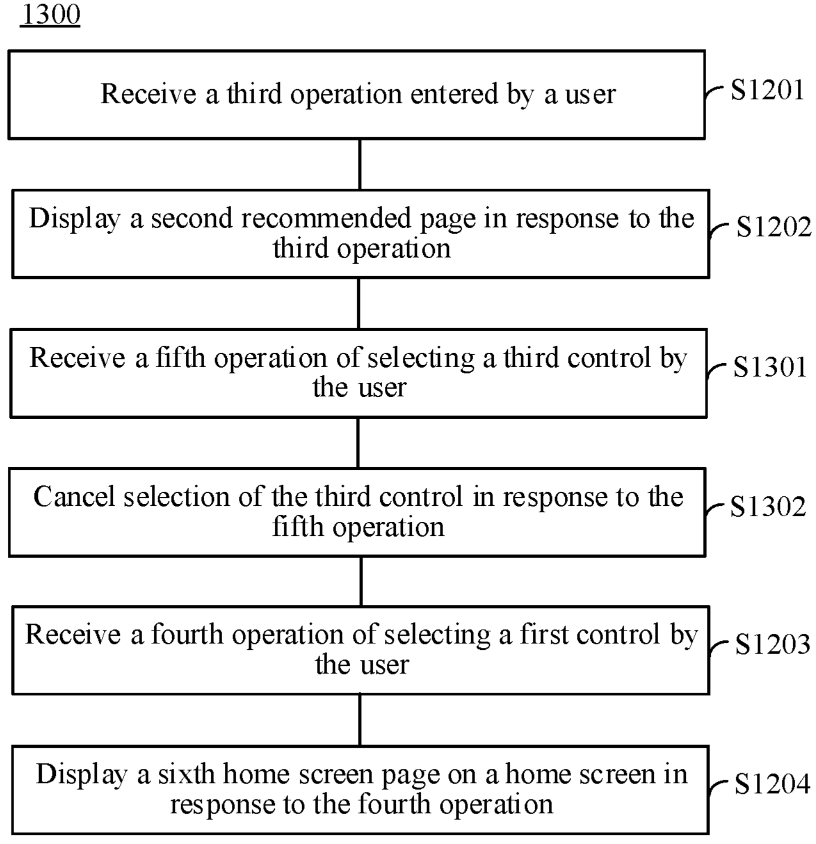

FIG. 13 is a schematic flowchart of yet another home screen layout method 1300 according to an embodiment of this application. Steps of the method 1300 may be performed by a terminal device and may be applied to Scenario 1 or Scenario 2 described above. This is not limited in embodiments of this application. The method 1300 includes the steps of the method 1200, S1301 and S1302 are newly added, and the specific steps are as follows.

S1201: Receive a third operation entered by a user, where the third operation includes an operation of determining completion of OOBE or an operation of determining completion of data migration.

S1202: Display a second recommended page in response to the third operation.

S1301: Receive a fifth operation of selecting a third control by the user.

For the third control, refer to the control 03 shown in FIG. 2A to FIG. 2C, FIG. 3A to FIG. 3C, or FIG. 4. A default state of the third control is a selected state, and the user can cancel selection of the third control.

S1302: Cancel selection of the third control in response to the fifth operation.

S1203: Receive a fourth operation of selecting a first control by the user.

For the first control, refer to the control 02 shown in FIG. 2A to FIG. 2C, FIG. 3A to FIG. 3C, or FIG. 4.

S1204: Display the sixth home screen page on a home screen in response to the fourth operation.

In this embodiment of this application, the sixth home screen page includes an application icon of a target application, and the target application includes a downloaded application and/or a to-be-downloaded application. The user can cancel selection of the third control, to indicate to unload the target application or cancel download of the target application, so as to implement free application selection.

Figure 14:
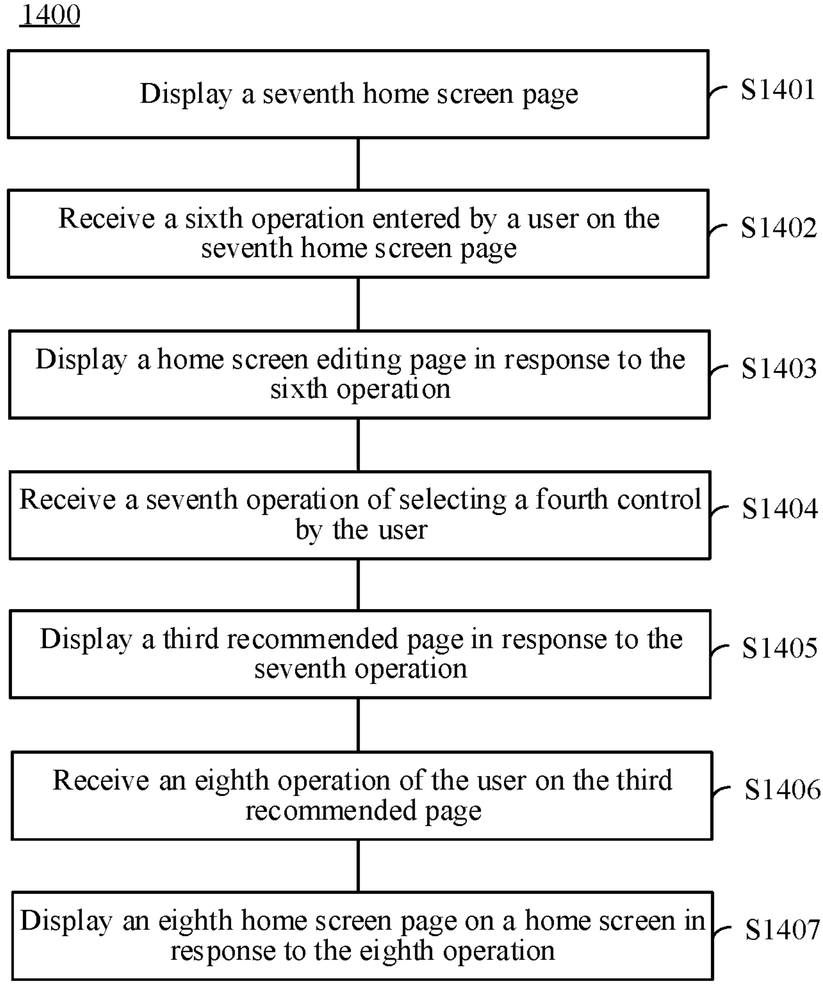

FIG. 14 is a schematic flowchart of yet another home screen layout method 1400 according to an embodiment of this application. Steps of the method 1400 may be performed by a terminal device and may be applied to Scenario 4 described above. This is not limited in embodiments of this application. The method 1400 includes S1401 to S1407, and the specific steps are as follows.

S1401: Display a seventh home screen page, where the seventh home screen page includes an application icon and/or an application card.

The seventh home screen page is a home screen page currently displayed by the terminal device during a process of using the terminal device by a user. For details, refer to the home screen page shown in the interface A in FIG. 6A.

S1402: Receive a sixth operation entered by the user on the seventh home screen page.

The sixth operation may include an operation of pinching two fingers or an operation of pressing and holding a screen by the user.

S1403: Display a home screen editing page in response to the sixth operation, where the home screen editing page includes a fourth control.

For the home screen editing page, refer to the interface A in FIG. 8A. For the fourth control, refer to the control 10 shown in the interface A in FIG. 8A.

S1404: Receive a seventh operation of selecting the fourth control by the user.

S1405: Display a third recommended page in response to the seventh operation, where the third recommended page includes a preview of a preset template of a home screen layout recommended for the user, the preview includes a preview of an eighth home screen page, and the preview of the eighth home screen page includes a plurality of preset positions of application icons and/or application cards on the eighth home screen page.

For the third recommended page, refer to the interface B in FIG. 8B. The preview of the eighth home screen page may be a preview of a home screen page initially displayed on the third recommended page or a preview of a home screen page displayed after switching from a preview of another home screen page.

S1406: Receive an eighth operation of the user on the third recommended page.

Optionally, S1406 includes: receiving a tap operation of the user in blank space of the third recommended page. In this manner, refer to the interface B in FIG. 8B. The eighth operation may be an operation of tapping blank space of a recommended page by the user.

S1407: Display the eighth home screen page on a home screen in response to the eighth operation. A layout of the eighth home screen page is different from a layout of the seventh home screen page.

Optionally, S1407 includes: adding and displaying the eighth home screen page on the home screen in response to the tap operation of the user in the blank space of the third recommended page. In this manner, the eighth home screen page is a newly added home screen page, and the home screen of the terminal device includes the seventh home screen page and the eighth home screen page.

In this embodiment of this application, the terminal device may display the third recommended page for the user, and as shown in the interface B in FIG. 8B, the third recommended page can recommend the plurality of preset positions of the application icons and/or the application cards on the eighth home screen page. In this way, time for the user to arrange the display positions of the application icons and/or the application cards on the home screen can be reduced, and efficiency for the user to arrange the home screen is improved.

Figure 15:
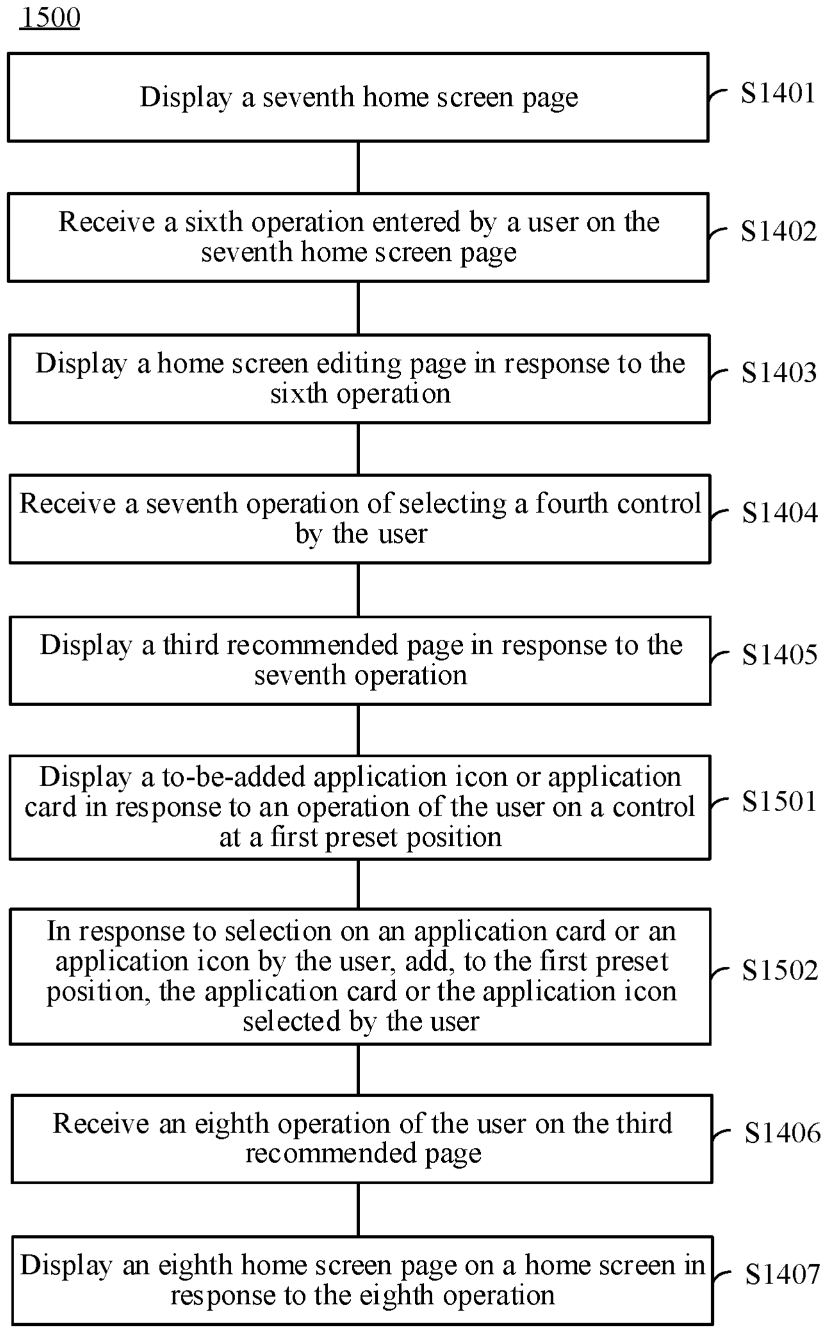

FIG. 15 is a schematic flowchart of yet another home screen layout method 1500 according to an embodiment of this application. Steps of the method 1500 may be performed by a terminal device and may be applied to Scenario 4 described above. This is not limited in embodiments of this application. The method 1500 includes the steps of the method 1400, S1501 to S1504 are newly added, and the specific steps are as follows.

S1401: Display a seventh home screen page, where the seventh home screen page includes an application icon and/or an application card.

S1402: Receive a sixth operation entered by a user on the seventh home screen page.

S1403: Display a home screen editing page in response to the sixth operation, where the home screen editing page includes a fourth control.

S1404: Receive a seventh operation of selecting the fourth control by the user.

S1405: Display a third recommended page in response to the seventh operation, where the third recommended page includes a preview of a preset template of a home screen layout recommended for the user, the preview includes a preview of an eighth home screen page, and the preview of the eighth home screen page includes a plurality of preset positions of application icons and/or application cards on the eighth home screen page.

In this step, the preview of the eighth home screen page is a preview of a home screen page displayed after switching from a preview of another home screen page.

Optionally, a preview of a tenth home screen page is initially displayed on the third recommended page, and the third recommended page further includes a sixth control. The terminal device may receive a ninth operation of selecting the sixth control by the user. The terminal device switches the preview of the tenth home screen page to the preview of the eighth home screen page on the third recommended page in response to the ninth operation. In this case, the third recommended page includes the preview of the eighth home screen page.

The preview of the tenth home screen page includes a plurality of preset positions of application icons and/or application cards on the tenth home screen page, and a preset template of a home screen layout of the tenth home screen page is different from a preset template of a home screen layout of the eighth home screen page.

For the sixth control, refer to the control 05 in FIG. 3A to FIG. 3C. The user can tap the control 05 to switch previews of different home screen pages.

Optionally, a preview of an eleventh home screen page is initially displayed on the third recommended page, and the terminal device may receive a fifth sliding operation entered by the user. The terminal device switches the preview of the eleventh home screen page to the preview of the eighth home screen page on the third recommended page in response to the fifth sliding operation. In this case, the third recommended page includes the preview of the eighth home screen page.

The preview of the eleventh home screen page includes a plurality of preset positions of application icons and/or application cards on the eleventh home screen page, and a preset template of a home screen layout of the eleventh home screen page is different from a preset template of a home screen layout of the eighth home screen page.

S1501: Display a to-be-added application icon or application card in response to an operation of the user on a control at a first preset position, where the first preset position is any one of the plurality of preset positions, and each of the plurality of preset positions includes a control for adding an application card or at least one application icon.

For the preset position, refer to the interface B in FIG. 8B. For the control at the first preset position, refer to the control 11 or the control 13 shown in the interface B in FIG. 8B.

S1502: In response to selecting an application card or an application icon by the user, add, to the first preset position, the application card or the application icon selected by the user.

Refer to the interface C in FIG. 8C. That the user selects the control 12 on the application icon means that the user selects the corresponding application icon. Refer to the interface D in FIG. 8D. That the user selects the control 12 on the application card means that the user selects the corresponding application card.

S1406: Receive an eighth operation of the user on the third recommended page.

S1407: Display the eighth home screen page on the home screen in response to the eighth operation. A layout of the eighth home screen page is different from a layout of the seventh home screen page.

In this embodiment of this application, when creating a new home screen page, the terminal device may provide, to the user, a preset template for adding an application icon and an application card. In response to tapping a control on the application card or the application icon by the user, the terminal device may add the application card or the application icon to a corresponding preset position for display. This manner can meet individual needs of the user, and improve user experience.

In a case that the preview of the eighth home screen page further includes application icons and/or application cards laid out at the plurality of preset positions, for the eighth home screen page, refer to the interface C in FIG. 6C(1) to FIG. 6C(3). The terminal device not only recommends the application icons and/or the application cards at the plurality of preset positions on the eighth home screen page for the user, but also recommends content of the application icons and/or the application card that can be displayed at the preset positions, for example, recommends displaying WeChat® at the first preset position and displaying Tik Tok® at a second preset position.

Figure 16:
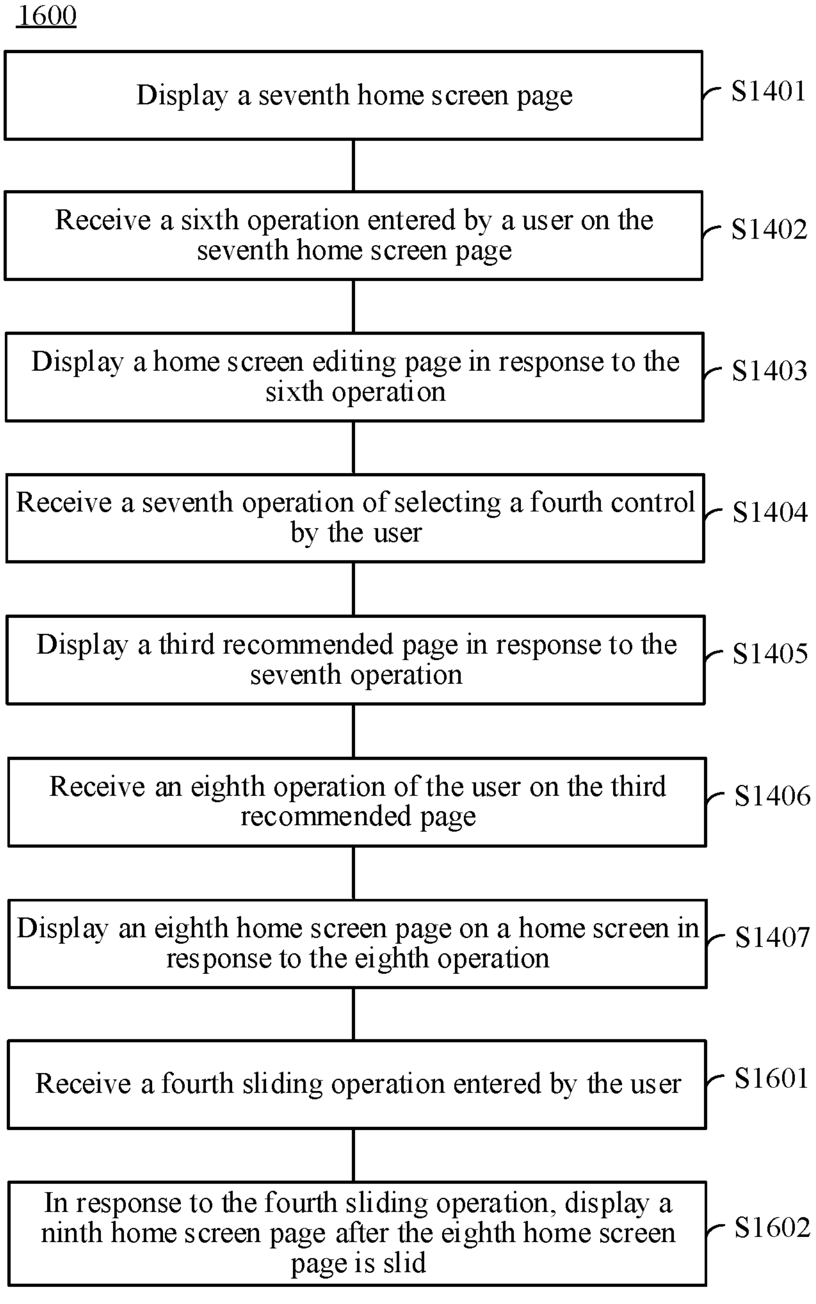

FIG. 16 is a schematic flowchart of yet another home screen layout method 1600 according to an embodiment of this application. Steps of the method 1600 may be performed by a terminal device and may be applied to Scenario 3 described above. This is not limited in embodiments of this application. The method 1600 includes the steps of the method 1400, S1601 and S1602 are newly added, and the specific steps are as follows.

S1401: Display a seventh home screen page, where the seventh home screen page includes an application icon and/or an application card.

Figure 6A:
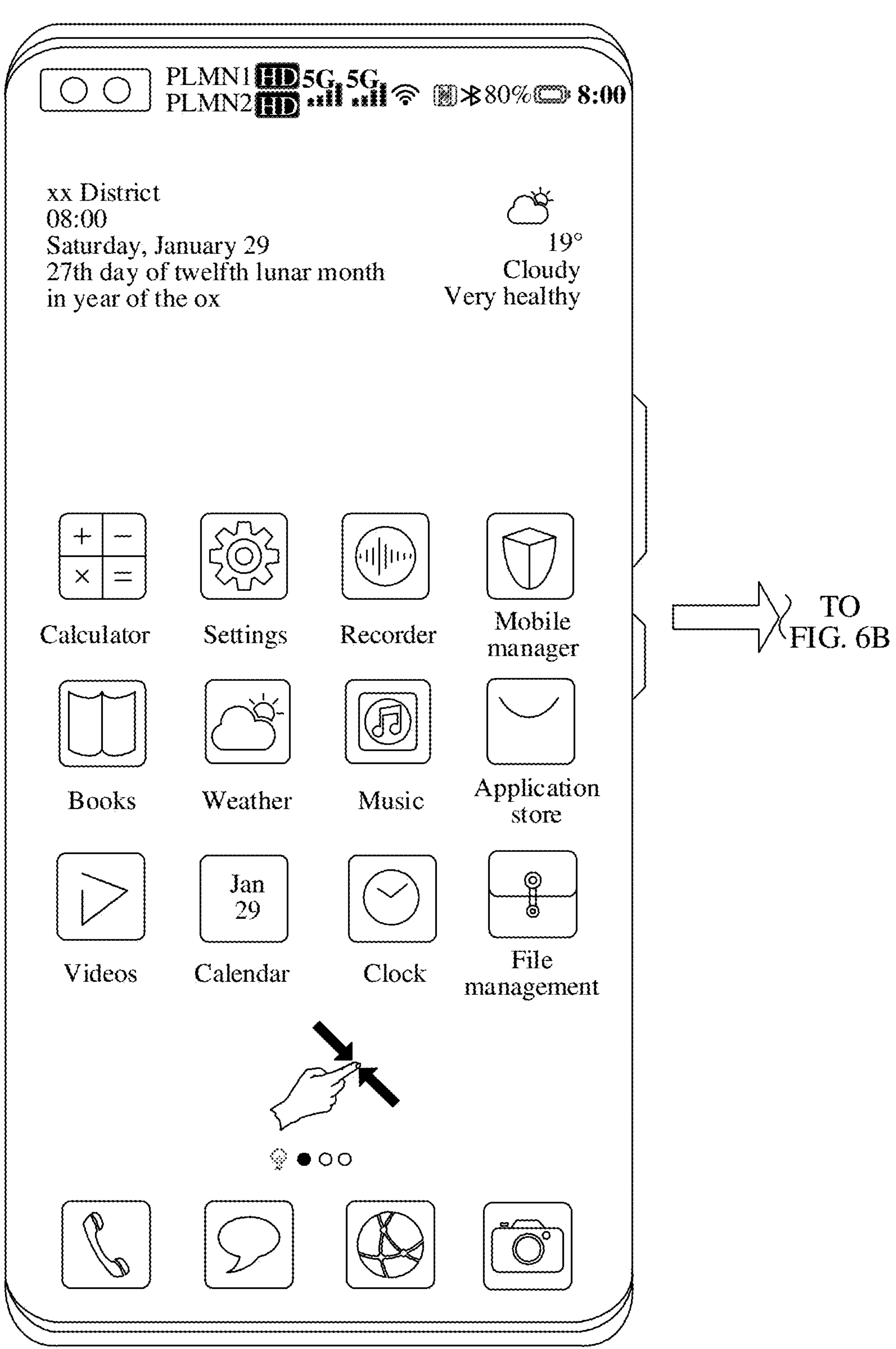

For the seventh home screen page, refer to the interface A in FIG. 6A.

S1402: Receive a sixth operation entered by a user on the seventh home screen page.

S1403: Display a home screen editing page in response to the sixth operation, where the home screen editing page includes a fourth control.

Figure 6B:
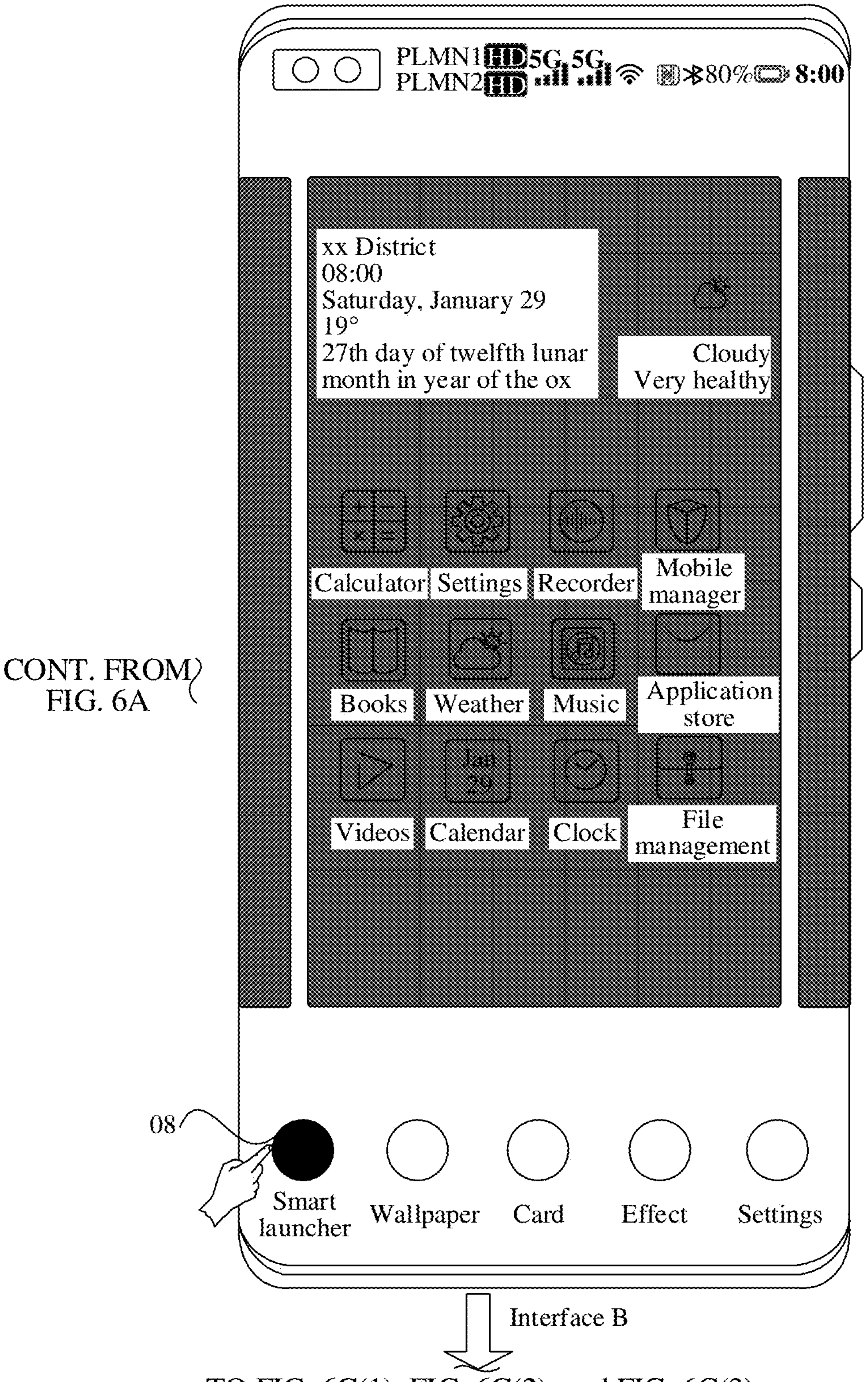

For the home screen editing page, refer to the interface B in FIG. 6B. For the fourth control, refer to the control 08 shown in the interface B in FIG. 6B.

S1404: Receive a seventh operation of selecting the fourth control by the user.

S1405: Display a third recommended page in response to the seventh operation.

For the third recommended page, refer to the interface C in FIG. 6C(1) to FIG. 6C(3). The third recommended page includes a preview of a preset template of a home screen layout recommended for the user, the preview includes a preview of an eighth home screen page, and the preview of the eighth home screen page includes a plurality of preset positions of application icons and/or application cards on the eighth home screen page.

It should be noted that the preview of the eighth home screen page described in the method 1600 differs from the preview of the eighth home screen page described in the method 1400 in that the preview of the eighth home screen page described in the method 1600 further includes the application icons and/or application cards laid out at the plurality of preset positions.

It should be understood that the preview that is of the recommended preset home screen layout and that includes three home screen pages is shown in the interface C in FIG. 6C(1) to FIG. 6C(3). This embodiment of this application is described by using a preview that is of a recommended preset home screen layout and that includes the eighth home screen page as an example.

S1406: Receive an eighth operation of the user on the third recommended page.

Optionally, S1406 includes: receiving an operation of selecting a fifth control by the user on the third recommended page. In this manner, refer to the interface C in FIG. 6C(1) to FIG. 6C(3). The fifth control may be the control 02, and the eighth operation may be an operation of tapping the control 02 by the user.

S1407: Display the eighth home screen page on the home screen in response to the eighth operation.

Optionally, S1407 includes: updating the seventh home screen page to the eighth home screen page in response to the operation of selecting the fifth control by the user. S1601: Receive a fourth sliding operation entered by the user.

S1602: In response to the fourth sliding operation, display a ninth home screen page after the eighth home screen page is slid.

In this embodiment of this application, the third recommended page further includes a preview of the ninth home screen page, that is, a preset home screen layout recommended by the third recommended page includes the preview of the eighth home screen page and the preview of the ninth home screen page, and the eighth home screen page and the ninth home screen page are pages of two different pages of a home screen. After applying a preset home screen layout including a plurality of home screen pages, the user can slide a screen to view the ninth home screen page displayed after the eighth home screen page.

It may be understood that sequence numbers of the foregoing processes do not indicate an execution sequence, and the execution sequence of the processes shall be determined based on functions and internal logic thereof, and shall constitute no limitation on an implementation process of embodiments of this application.

The home screen layout method according to embodiments of this application is described in detail with reference to FIG. 2A to FIG. 16. A home screen layout apparatus according to embodiments of this application is described in detail with reference to FIG. 17 and FIG. 18.

Figure 17:
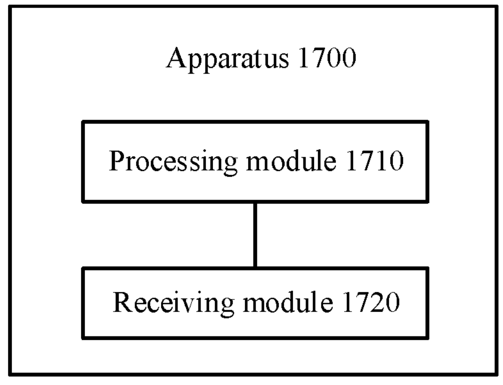
FIG. 17 is a schematic block diagram of a home screen layout apparatus according to an embodiment of this application.

FIG. 17 is a schematic block diagram of a home screen layout apparatus 1700 according to an embodiment of this application. The apparatus 1700 includes a processing module 1710 and a receiving module 1720.

In an embodiment, the processing module 1710 is configured to: display a first home screen page, where the first home screen page includes an application icon and/or an application card. The receiving module 1720 is configured to: receive a first sliding operation entered by a user. The processing module 1710 is further configured to: in response to the first sliding operation, slide the first home screen page until a first recommended page is displayed, where the first recommended page includes a first control and a preview of a preset home screen layout recommended for the user, the preview includes a preview of a second home screen page, and the preview of the second home screen page includes an application icon and/or an application card laid out on the second home screen page. The receiving module 1720 is further configured to: receive a first operation of selecting the first control by the user. The processing module 1710 is further configured to: update the first home screen page to the second home screen page in response to the first operation.

Optionally, when the first home screen page is displayed, a first navigation identifier on the first home screen page is selected, and when the first recommended page is displayed, a second navigation identifier on the first recommended page is selected.

Optionally, the first recommended page further includes a second control. The receiving module 1720 is configured to: receiving a second operation of selecting the second control by the user. The processing module 1710 is configured to: switch a preview of a third home screen page to the preview of the second home screen page on the first recommended page in response to the second operation. The preview of the third home screen page includes an application icon and/or an application card laid out on the third home screen page, and a home screen layout of the third home screen page is different from a home screen layout of the second home screen page.

Optionally, the receiving module 1720 is configured to: receive a second sliding operation entered by the user. The processing module 1710 is configured to: switch a preview of a fourth home screen page to the preview of the second home screen page on the first recommended page in response to the second sliding operation. The preview of the fourth home screen page includes an application icon and/or an application card laid out on the fourth home screen page, and a home screen layout of the fourth home screen page is different from a home screen layout of the second home screen page.

Optionally, the first recommended page further includes a preview of a fifth home screen page. The receiving module 1720 is configured to: receive a third sliding operation entered by the user. The processing module 1710 is configured to: in response to the third sliding operation, display the fifth home screen page after the second home screen page is slid.

Optionally, content of an application icon and/or an application card in the preset home screen layout is determined based on a habit of using an application by the user; and/or a position of an application icon and/or an application card in the preset home screen layout is determined based on a habit of using an application by the user.

Optionally, the receiving module 1720 is configured to: receive a third operation entered by the user, where the third operation includes an operation of determining completion of OOBE or an operation of determining completion of data migration. The processing module 1710 is configured to: display a second recommended page in response to the third operation, where the second recommended page includes the first control and a preview of a preset home screen layout that is recommended for the user, the preview includes a preview of a sixth home screen page, and the preview of the sixth home screen page includes an application icon and/or an application card laid out on the sixth home screen page. The application icon laid out on the sixth home screen page includes an application icon of a target application, a third control is displayed on each of the application icon of the target application and the application card, and the third control is in a selected state. The receiving module 1720 is further configured to: receive a fourth operation of selecting the first control by the user. The processing module 1710 is further configured to: display the sixth home screen page on a home screen in response to the fourth operation.

Optionally, the receiving module 1720 is configured to: receive a fifth operation of selecting the third control by the user. The processing module 1710 is configured to: cancel selection of the third control in response to the fifth operation.

Optionally, the target application includes a downloaded application and/or a to-be-downloaded application.

In another embodiment, the processing module 1710 is configured to: display a seventh home screen page, where the seventh home screen page includes an application icon and/or an application card. The receiving module 1720 is configured to: receive a sixth operation entered by the user on the seventh home screen page. The processing module 1710 is configured to: display a home screen editing page in response to the sixth operation, where the home screen editing page includes a fourth control. The receiving module 1720 is further configured to: receive a seventh operation of selecting the fourth control by the user. The processing module 1710 is further configured to: display a third recommended page in response to the seventh operation, where the third recommended page includes a preview of a preset template of a home screen layout recommended for the user, the preview includes a preview of an eighth home screen page, and the preview of the eighth home screen page includes a plurality of preset positions of application icons and/or application cards on the eighth home screen page. The receiving module 1720 is further configured to: receive an eighth operation of the user on the third recommended page. The processing module 1710 is further configured to: display the eighth home screen page on the home screen in response to the eighth operation.

Optionally, the preview of the eighth home screen page further includes the application icons and/or the application cards laid out at the plurality of preset positions.

Optionally, the third recommended page further includes a fifth control. The receiving module 1720 is configured to: receive an operation of selecting a fifth control by the user on the third recommended page. The processing module 1710 is configured to: update the seventh home screen page to the eighth home screen page in response to the operation of selecting the fifth control by the user.

Optionally, the third recommended page further includes a preview of a ninth home screen page. The receiving module 1720 is configured to: receive a fourth sliding operation entered by the user. The processing module 1710 is configured to: in response to the fourth sliding operation, display the ninth home screen page after the eighth home screen page is slid.

Optionally, each of the plurality of preset positions includes a control for adding an application card or at least one application icon. The processing module 1710 is configured to: display a to-be-added application icon or application card in response to an operation of the user on a control at a first preset position, where the first preset position is any one of the plurality of preset positions; and in response to selecting an application card or an application icon by the user, add, to the first preset position, the application card or the application icon selected by the user.

Optionally, the receiving module 1720 is configured to: receive a tap operation of the user in blank space of the third recommended page. The processing module 1710 is configured to: add and display the eighth home screen page on the home screen in response to the tap operation.

Optionally, the third recommended page further includes a sixth control. The receiving module 1720 is configured to: receive a ninth operation of selecting the sixth control by the user. The processing module 1710 is configured to: switch a preview of a tenth home screen page to the preview of the eighth home screen page on the third recommended page in response to the ninth operation. The preview of the tenth home screen page includes a plurality of preset positions of application icons and/or application cards on the tenth home screen page, and a preset template of a home screen layout of the tenth home screen page is different from a preset template of a home screen layout of the eighth home screen page.

Optionally, the receiving module 1720 is configured to: receive a fifth sliding operation entered by the user. The processing module 1710 is configured to: switch a preview of an eleventh home screen page to the preview of the eighth home screen page on the third recommended page in response to the fifth sliding operation. The preview of the eleventh home screen page includes a plurality of preset positions of application icons and/or application cards on the eleventh home screen page, and a preset template of a home screen layout of the eleventh home screen page is different from a preset template of a home screen layout of the eighth home screen page.

In an optional example, a person skilled in the art may understand that the apparatus 1700 may be specifically the terminal device in the foregoing embodiments, or that the function of the terminal device in the foregoing embodiments may be integrated into the apparatus 1700. The function may be implemented by hardware, or may be implemented by hardware executing corresponding software. The hardware or software includes one or more modules corresponding to the function. The apparatus 1700 may be configured to perform the processes and/or steps corresponding to the terminal device in the foregoing method embodiments.

It should be understood that the apparatus 1700 is represented in a form of a functional module. The term "module" herein may be an application specific integrated circuit (application specific integrated circuit, ASIC), an electronic circuit, a processor (for example, a shared processor, a dedicated processor, or a packet processor) configured to execute one or more software or firmware programs, a memory, a combined logical circuit, and/or another suitable component that supports the described function. In an embodiment of this application, the apparatus 1700 in FIG. 17 may alternatively be a chip or a chip system, for example, a system on chip (SoC).

Figure 18:
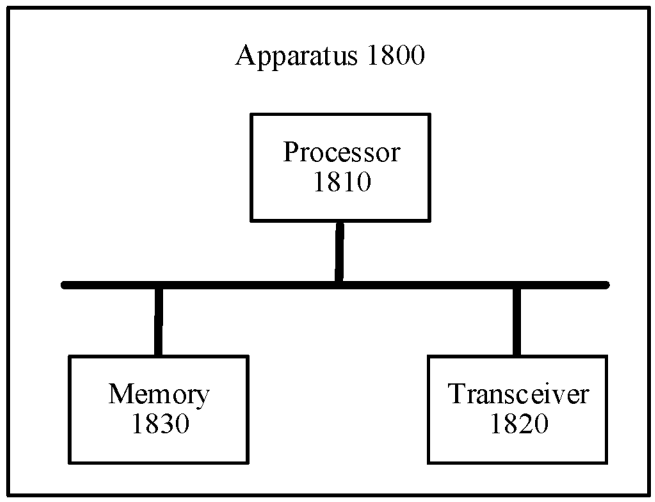
FIG. 18 is a schematic block diagram of another home screen layout apparatus according to an embodiment of this application.

FIG. 18 is a schematic block diagram of another home screen layout apparatus 1800 according to an embodiment of this application. The apparatus 1800 includes a processor 1810, a transceiver 1820, and a memory 1830. The processor 1810, the transceiver 1820, and the memory 1830 communicate with each other through an internal connection path, the memory 1830 is configured to store instructions, and the processor 1810 is configured to execute the instructions stored in the memory 1830, to control the transceiver 1820 to send and/or receive signals.

It should be understood that the apparatus 1800 may be specifically the terminal device in the foregoing embodiments, or that the function of the terminal device in the foregoing embodiments may be integrated into the apparatus 1800. The apparatus 1800 may be configured to perform the steps and/or processes corresponding to the terminal device in the foregoing method embodiments. Optionally, the memory 1830 may include a read-only memory and a random access memory, and provide instructions and data to the processor. A part of the memory may further include a non-volatile random access memory. For example, the memory may further store information about a device type. The processor 1810 may be configured to execute the instructions stored in the memory, and when the processor executes the instructions, the processor may perform the steps and/or processes corresponding to the electronic device in the foregoing method embodiments.

It should be understood that, in this embodiment of this application, the processor 1810 may be a central processing unit (central processing unit, CPU), or may be another general-purpose processor, a digital signal processor (digital signal processor, DSP), an application specific integrated circuit (application specific integrated circuit, ASIC), a field programmable gate array (field programmable gate array, FPGA), or another programmable logic device, a discrete gate or a transistor logic device, a discrete hardware component, or the like. The general-purpose processor may be a microprocessor, or the processor may be any conventional processor or the like.

This application further provides a computer-readable storage medium. The computer-readable storage medium stores computer-executable instructions, and when the computer-executable instructions are executed by the processor, the method performed by the terminal device according to any one of the foregoing method embodiments is implemented.

An embodiment of this application further provides a computer program product including a computer program. When the computer program is executed by the processor, the method performed by the terminal device according to any one of the foregoing method embodiments is implemented.

In an implementation process, the steps of the foregoing methods may be implemented by using an integrated logic circuit of hardware in the processor, or by using instructions in a form of software. The steps of the methods disclosed with reference to embodiments of this application may be directly performed and completed by using a hardware processor, or may be performed and completed by using a combination of hardware and software modules in the processor. The software module may be located in a storage medium that is mature in the art, for example, a random access memory, a flash memory, a read-only memory, a programmable read-only memory, an electrically erasable programmable memory, or a register. The storage medium is located in the memory. The processor reads the instructions in the memory and completes the steps of the methods in combination with hardware thereof. To avoid repetition, details are not described herein again.

A person of ordinary skill in the art may be aware that, in combination with the examples described in embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and module, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions of embodiments.

In addition, functional modules in embodiments of this application may be integrated into one processing module, each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The storage medium includes: any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A home screen layout method, comprising:

displaying a first home screen page, wherein the first home screen page comprises an application icon and/or an application card;

receiving a first sliding operation entered by a user;

in response to the first sliding operation, sliding the first home screen page until a first recommended page is displayed, wherein the first recommended page comprises a first control and a preview of a second home screen page, and the preview of the second home screen page comprises an application icon and/or an application card laid out on the second home screen page;

receiving a first operation of selecting the first control by the user;

updating the first home screen page to the second home screen page in response to the first operation;

receiving a third operation entered by the user, wherein the third operation comprises an operation of determining completion of out-of-box experience (OOBE) or an operation of determining completion of data migration;

displaying a second recommended page in response to the third operation, wherein the second recommended page comprises the first control and a preview of a sixth home screen page, and the preview of the sixth home screen page comprises an application icon and/or an application card laid out on the sixth home screen page, wherein the application icon laid out on the sixth home screen page comprises an application icon of a target application, a third control is displayed on each of the application icon of the target application and the application card laid out on the sixth home screen page, and the third control is in a selected state;

receiving a fourth operation of selecting the first control on the second recommended page by the user; and displaying the sixth home screen page on a home screen in response to the fourth operation.

2. The method according to claim 1, wherein when the first home screen page is displayed, a first navigation identifier on the first home screen page is selected; and when the first recommended page is displayed, a second navigation identifier on the first recommended page is selected.

3. The method according to claim 1, wherein the first recommended page further comprises a second control; and before receiving the first operation of selecting the first control by the user, the method further comprises:

receiving a second operation of selecting the second control by the user; and switching a preview of a third home screen page to the preview of the second home screen page on the first recommended page in response to the second operation, wherein the preview of the third home screen page comprises an application icon and/or an application card laid out on the third home screen page, and a home screen layout of the third home screen page is different from a home screen layout of the second home screen page.

4. The method according to claim 1, wherein before receiving the first operation of selecting the first control by the user, the method further comprises:

receiving a second sliding operation entered by the user; and switching a preview of a fourth home screen page to the preview of the second home screen page on the first recommended page in response to the second sliding operation, wherein the preview of the fourth home screen page comprises an application icon and/or an application card laid out on the fourth home screen page, and a home screen layout of the fourth home screen page is different from a home screen layout of the second home screen page.

5. The method according to claim 1, wherein the first recommended page further comprises a preview of a fifth home screen page, and the preview of the fifth home screen page comprises an application icon and/or an application card laid out on the fifth home screen page; and after updating the first home screen page to the second home screen page in response to the first operation, the method further comprises:

receiving a third sliding operation entered by the user; and in response to the third sliding operation, displaying the fifth home screen page after the second home screen page is slid.

6. The method according to claim 1, wherein content of the application icon and/or the application card laid out on the second home screen page in the preview of the second home screen page is determined based on a habit of using an application by the user; and/or a position of the application icon and/or the application card laid out on the second home screen page in the preview of the second home screen page is determined based on a habit of using an application by the user.

7. The method according to claim 1, wherein before receiving the fourth operation of selecting the first control by the user, the method further comprises:

receiving a fifth operation of selecting the third control by the user; and canceling selection of the third control in response to the fifth operation.

8. The method according to claim 1, wherein the target application comprises a downloaded application and/or a to-be-downloaded application.

9. The method according to claim 1, wherein the method further comprises:

displaying a seventh home screen page, wherein the seventh home screen page comprises an application icon and/or an application card laid out on the seventh home screen page;

receiving a sixth operation entered by a user on the seventh home screen page;

displaying a home screen editing page in response to the sixth operation, wherein the home screen editing page comprises a fourth control;

receiving a seventh operation of selecting the fourth control by the user;

displaying a third recommended page in response to the seventh operation, wherein the third recommended page comprises a preview of a preset template of a home screen layout recommended for the user, the preview comprises a preview of an eighth home screen page, and the preview of the eighth home screen page comprises a plurality of preset positions of application icons and/or application cards on the eighth home screen page;

receiving an eighth operation of the user on the third recommended page; and displaying the eighth home screen page on a home screen in response to the eighth operation.

10. The method according to claim 9, wherein the preview of the eighth home screen page further comprises the application icons and/or the application cards laid out at the plurality of preset positions.

11. The method according to claim 10, wherein the third recommended page further comprises a fifth control;

wherein receiving the eighth operation of the user on the third recommended page comprises:

receiving an operation of selecting the fifth control by the user on the third recommended page; and wherein displaying the eighth home screen page on the home screen in response to the eighth operation comprises:

updating the seventh home screen page to the eighth home screen page in response to the operation of selecting the fifth control by the user.

12. The method according to claim 10, wherein the third recommended page further comprises a preview of a ninth home screen page; and after the displaying the eighth home screen page on a home screen in response to the eighth operation, the method further comprises:

receiving a fourth sliding operation entered by the user; and in response to the fourth sliding operation, displaying the ninth home screen page after the eighth home screen page is slid.

13. The method according to claim 10, wherein each of the plurality of preset positions comprises a control for adding an application card or at least one application icon; and the method further comprises:

displaying a to-be-added application icon or application card in response to an operation of the user on a control at a first preset position, wherein the first preset position is any one of the plurality of preset positions; and in response to selecting an application card or an application icon by the user, adding, to the first preset position, the application card or the application icon selected by the user.

14. The method according to claim 13, wherein receiving the eighth operation of the user on the third recommended page comprises:

receiving a tap operation of the user in blank space of the third recommended page; and wherein displaying the eighth home screen page on the home screen in response to the eighth operation comprises:

adding and displaying the eighth home screen page on the home screen in response to the tap operation.

15. The method according to claim 9, wherein the third recommended page further comprises a sixth control; and wherein before receiving the eighth operation of the user on the third recommended page, the method further comprises:

receiving a ninth operation of selecting the sixth control by the user; and switching a preview of a tenth home screen page to the preview of the eighth home screen page on the third recommended page in response to the ninth operation, wherein the preview of the tenth home screen page comprises a plurality of preset positions of application icons and/or application cards on the tenth home screen page, and a preset template of a home screen layout of the tenth home screen page is different from a preset template of a home screen layout of the eighth home screen page.

16. The method according to claim 9, wherein before the receiving an eighth operation of the user on the third recommended page, the method further comprises:

receiving a fifth sliding operation entered by the user; and switching a preview of an eleventh home screen page to the preview of the eighth home screen page on the third recommended page in response to the fifth sliding operation, wherein a preview of the eleventh home screen page comprises a plurality of preset positions of application icons and/or application cards on the eleventh home screen page, and a preset template of a home screen layout of the eleventh home screen page is different from a preset template of a home screen layout of the eighth home screen page.

17. A home screen layout apparatus, comprising: a processor and a memory, wherein the memory to stores a computer program; and the processor is configured to invoke and execute the computer program, to enable the apparatus to perform the following steps:

displaying a first home screen page, wherein the first home screen page comprises an application icon and/or an application card;

receiving a first sliding operation entered by a user;

in response to the first sliding operation, sliding the first home screen page until a first recommended page is displayed, wherein the first recommended page comprises a first control and a preview of a second home screen page, and the preview of the second home screen page comprises an application icon and/or an application card laid out on the second home screen page;

receiving a first operation of selecting the first control by the user;

updating the first home screen page to the second home screen page in response to the first operation;

receiving a third operation entered by the user, wherein the third operation comprises an operation of determining completion of out-of-box experience (OOBE) or an operation of determining completion of data migration;

displaying a second recommended page in response to the third operation, wherein the second recommended page comprises the first control and a preview of a sixth home screen page, and the preview of the sixth home screen page comprises an application icon and/or an application card laid out on the sixth home screen page, wherein the application icon laid out on the sixth home screen page comprises an application icon of a target application, a third control is displayed on each of the application icon of the target application and the application card laid out on the sixth home screen page, and the third control is in a selected state;

receiving a fourth operation of selecting the first control on the second recommended page by the user; and displaying the sixth home screen page on a home screen in response to the fourth operation.

18. A non-transitory computer-readable storage medium, wherein the non-transitory computer-readable storage medium stores a computer program, and when the computer program is run on a computer, the computer is enabled to perform the following steps:

displaying a first home screen page, wherein the first home screen page comprises an application icon and/or an application card;

receiving a first sliding operation entered by a user;

in response to the first sliding operation, sliding the first home screen page until a first recommended page is displayed, wherein the first recommended page comprises a first control and a preview of a second home screen page, and the preview of the second home screen page comprises an application icon and/or an application card laid out on a second home screen page;

receiving a first operation of selecting the first control by the user;

updating the first home screen page to the second home screen page in response to the first operation;

receiving a third operation entered by the user, wherein the third operation comprises an operation of determining completion of out-of-box experience (OOBE) or an operation of determining completion of data migration;

displaying a second recommended page in response to the third operation, wherein the second recommended page comprises the first control and a preview of a sixth home screen page, and the preview of the sixth home screen page comprises an application icon and/or an application card laid out on the sixth home screen page, wherein the application icon laid out on the sixth home screen page comprises an application icon of a target application, a third control is displayed on each of the application icon of the target application and the application card laid out on the sixth home screen page, and the third control is in a selected state;

receiving a fourth operation of selecting the first control on the second recommended page by the user; and displaying the sixth home screen page on a home screen in response to the fourth operation.

19. The apparatus according to claim 17, wherein:

when the first home screen page is displayed, a first navigation identifier on the first home screen page is selected; and when the first recommended page is displayed, a second navigation identifier on the first recommended page is selected.

20. The non-transitory computer-readable storage medium according to claim 18, wherein:

when the first home screen page is displayed, a first navigation identifier on the first home screen page is selected; and when the first recommended page is displayed, a second navigation identifier on the first recommended page is selected.

* * * * *